S. SCHIFF.
PACKAGE WRAPPING MACHINE.
APPLICATION FILED JUNE 5, 1913.
1,192,351.
Patented July 25, 1916.
19 SHEETS—SHEET 9.
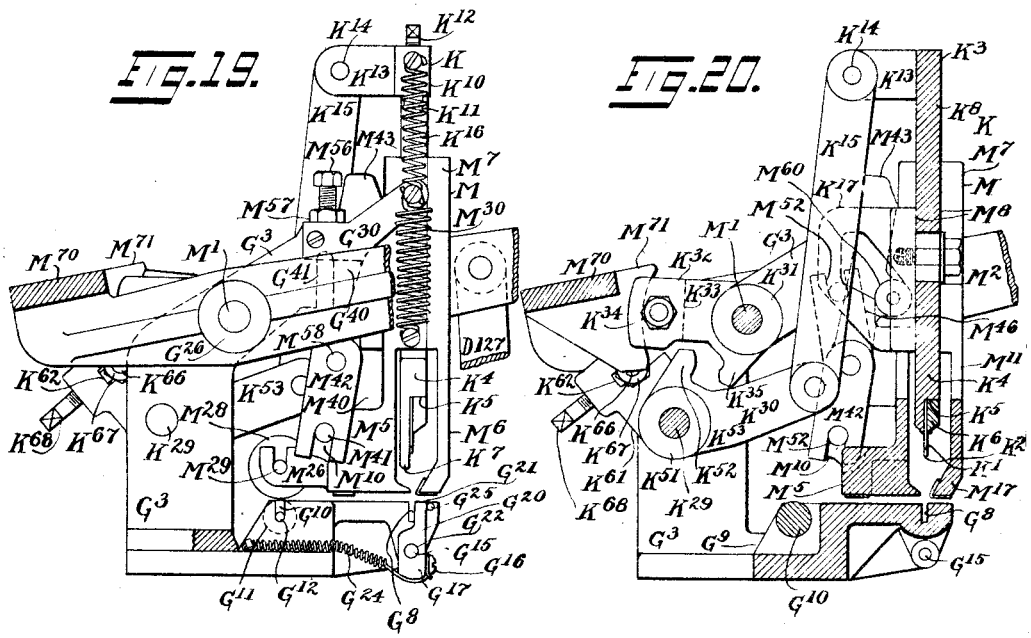
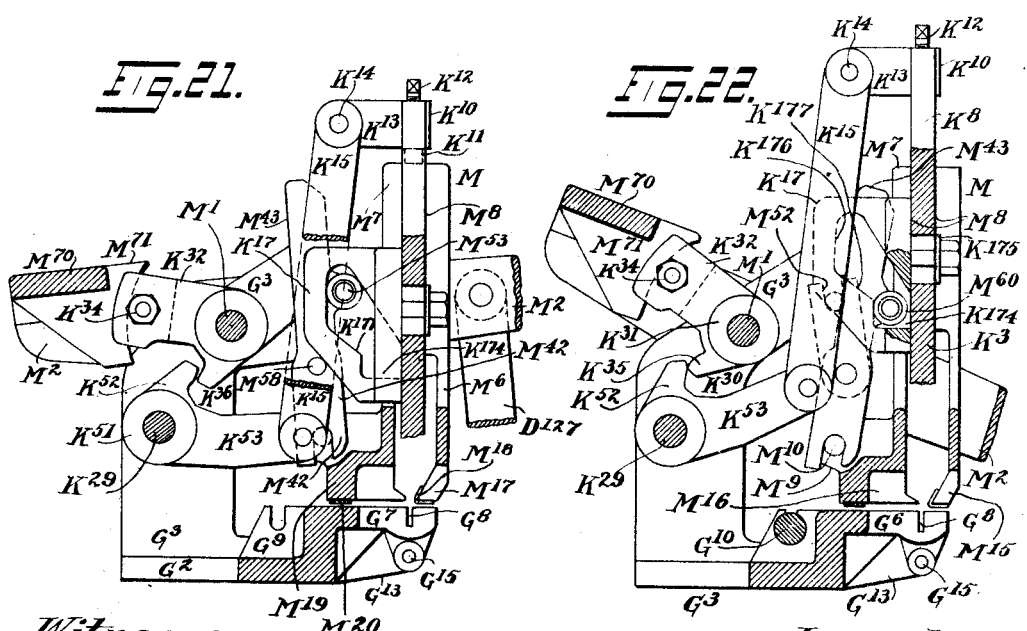
Witnesses:
Inventor:
Sigmund Schiff.
By his Attorney,

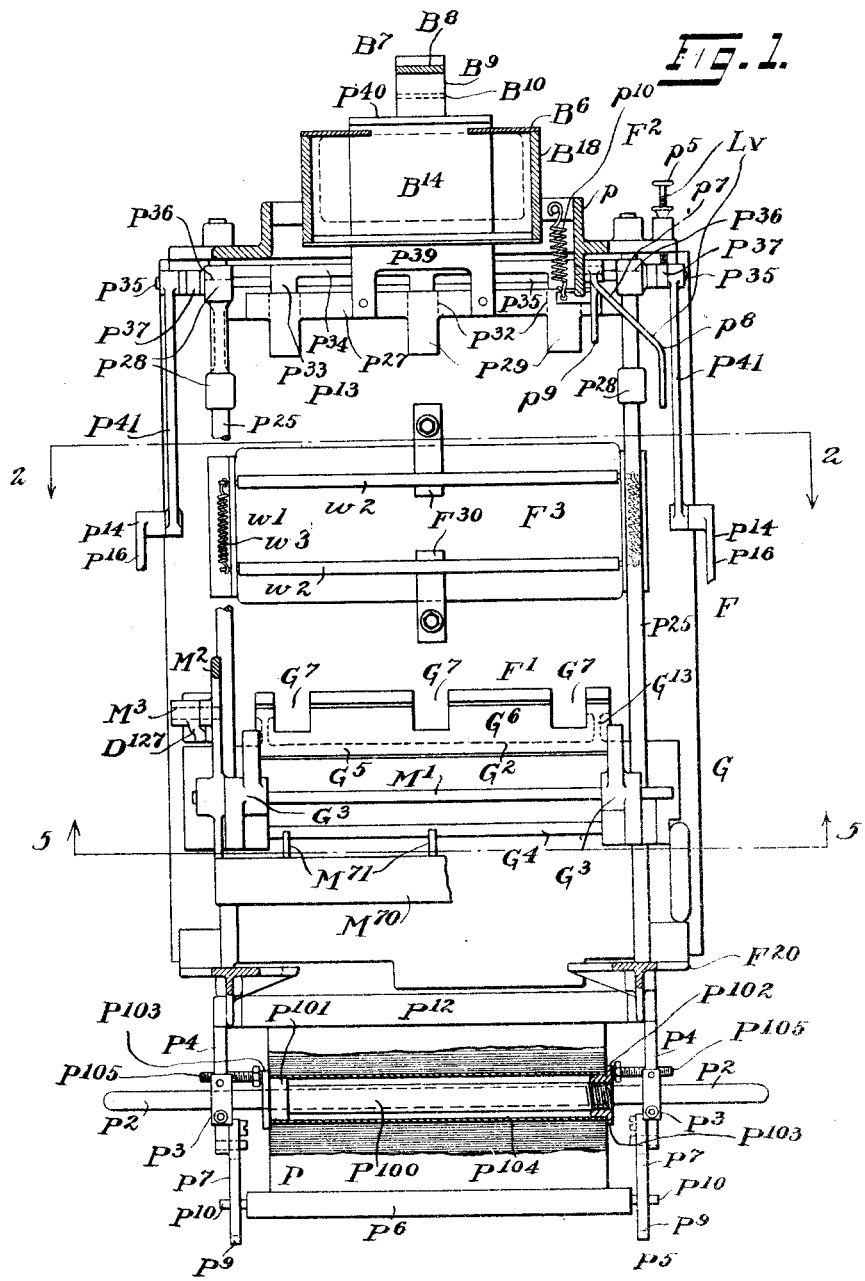

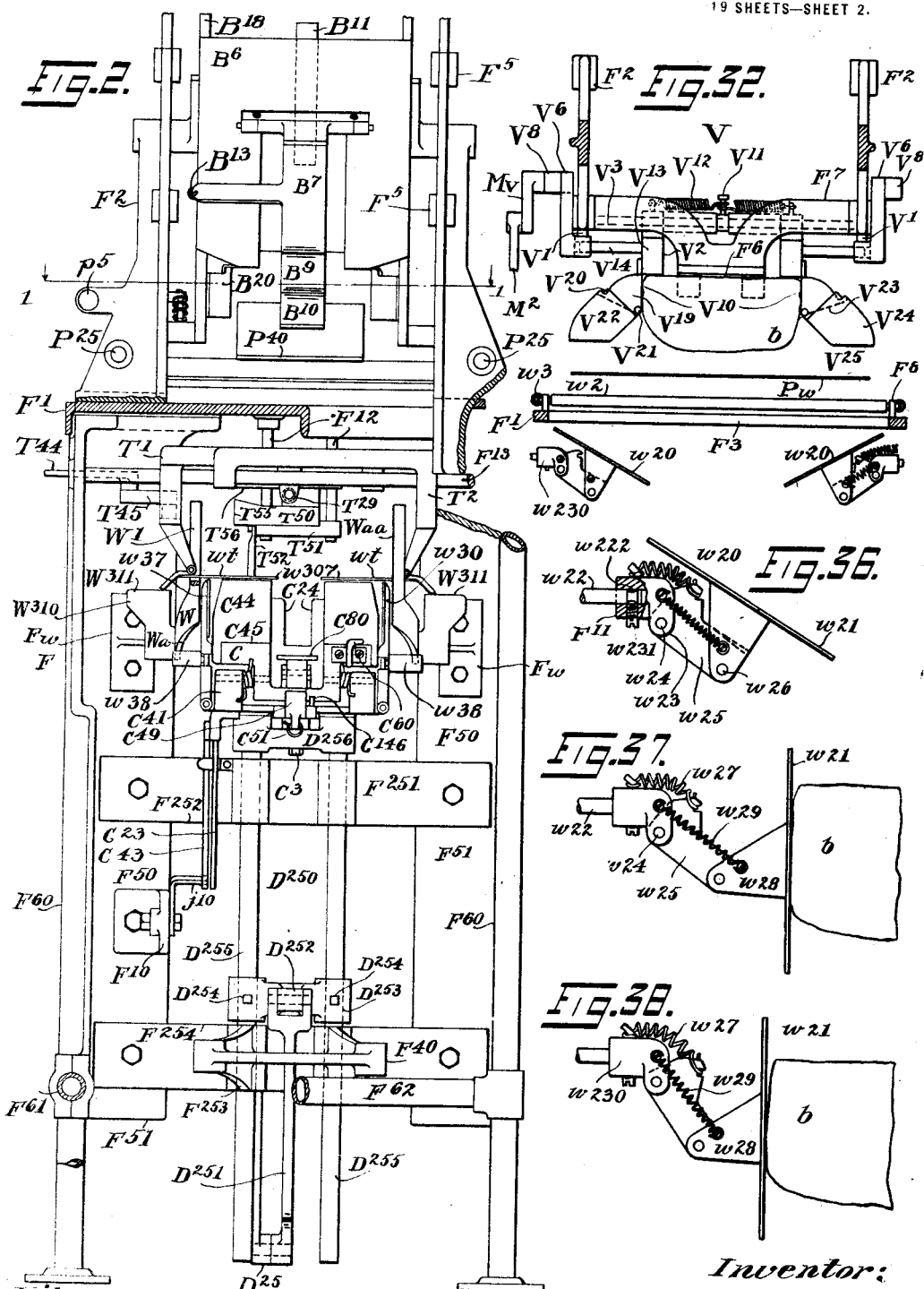

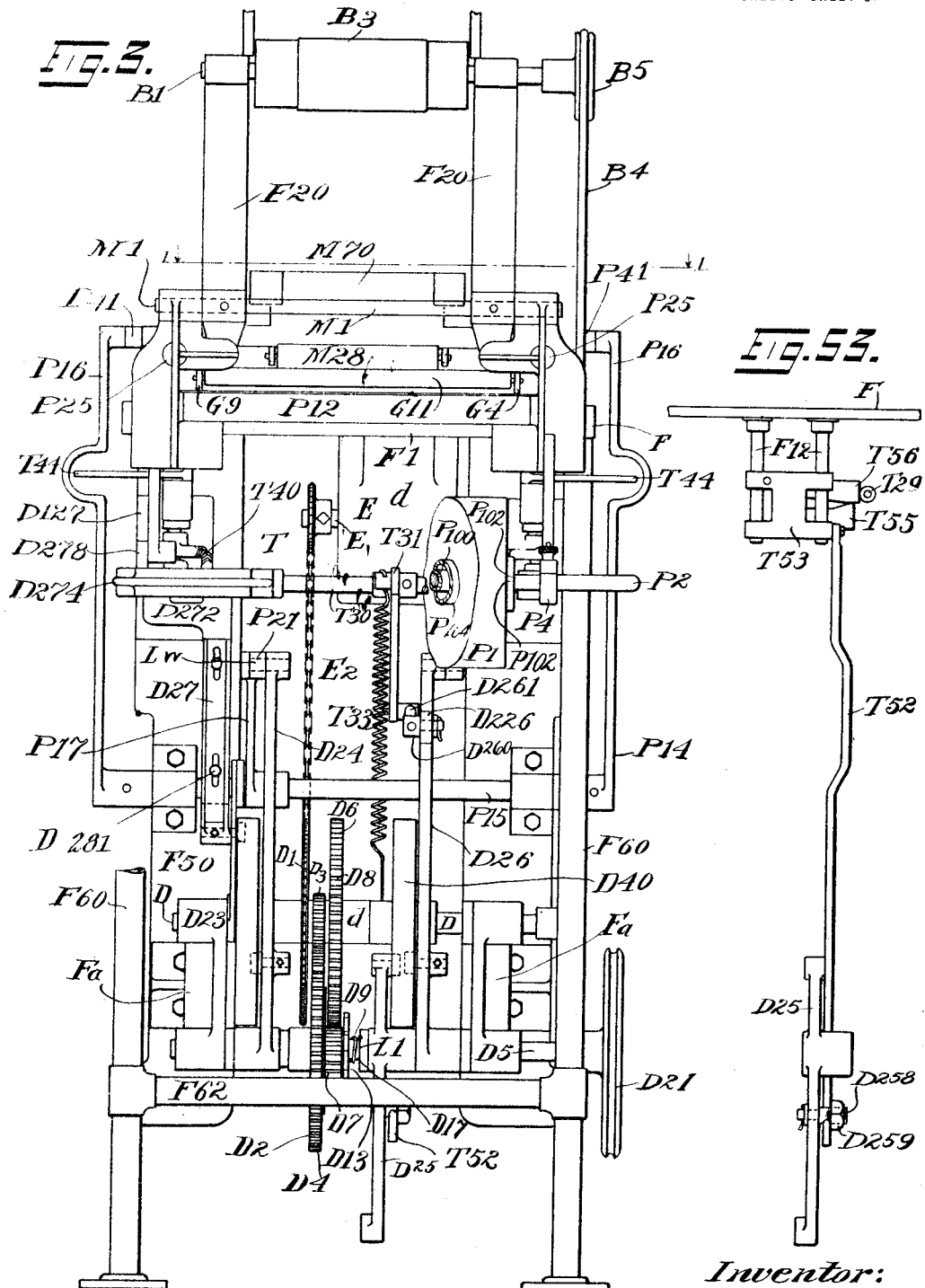

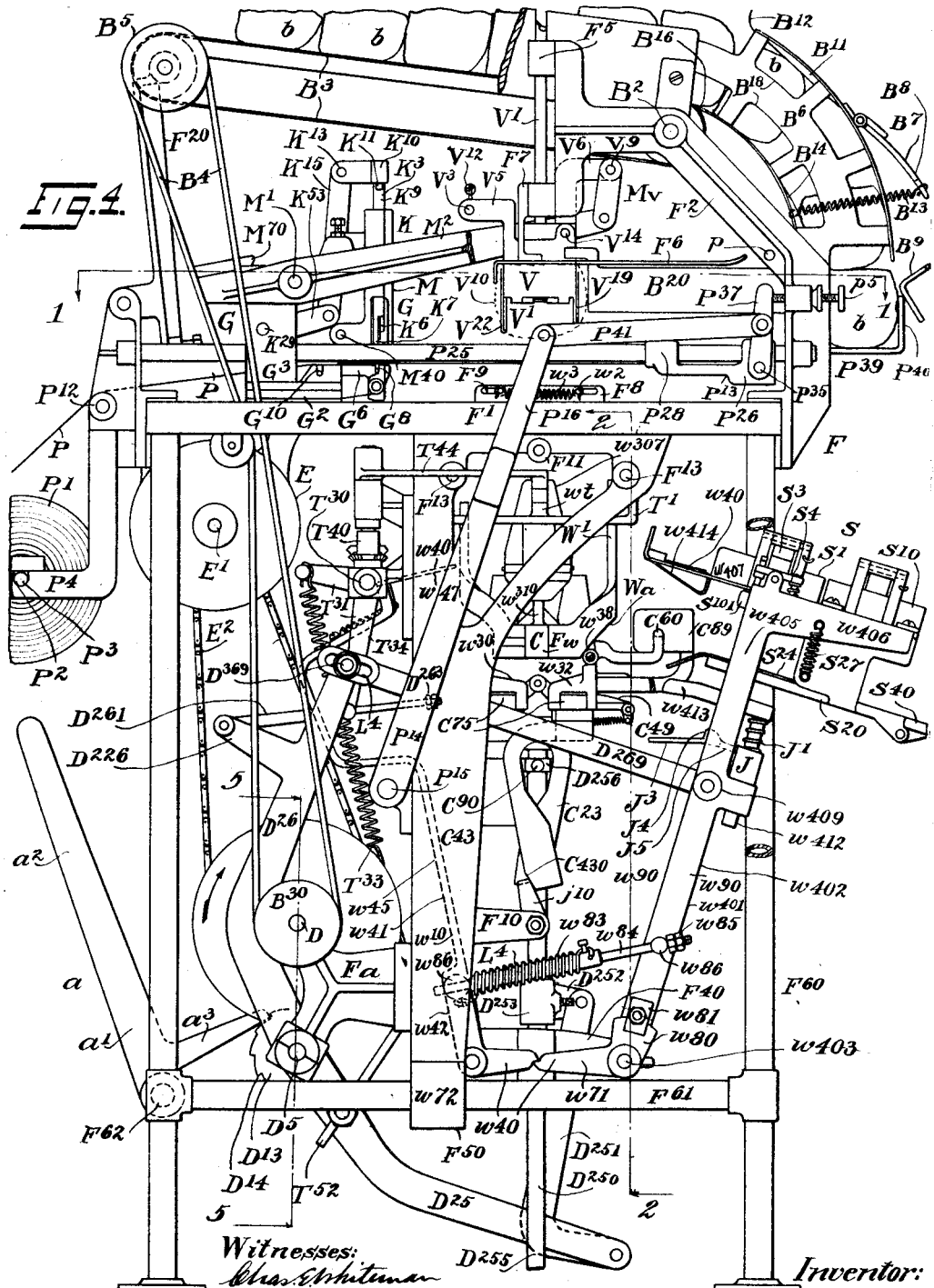

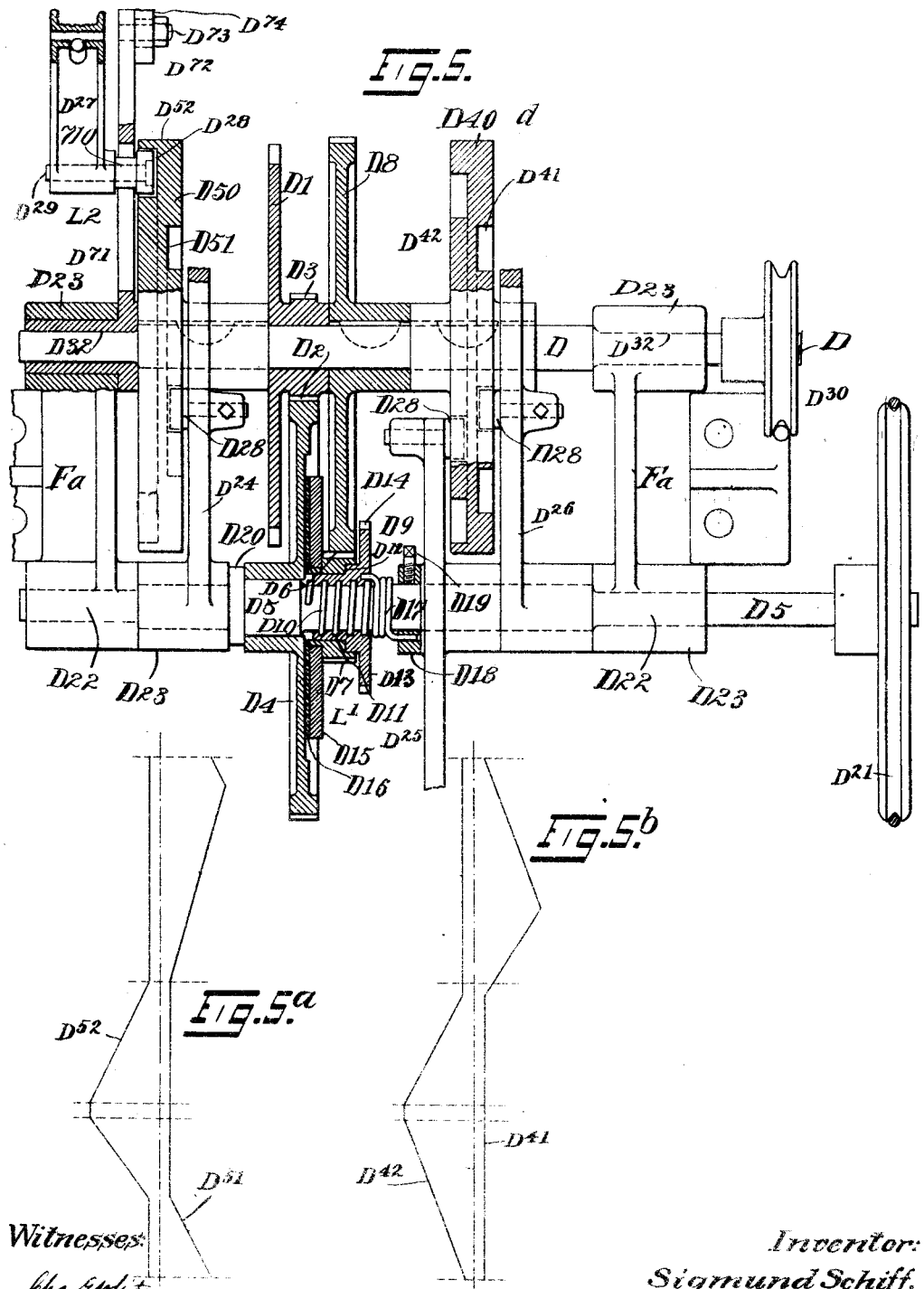

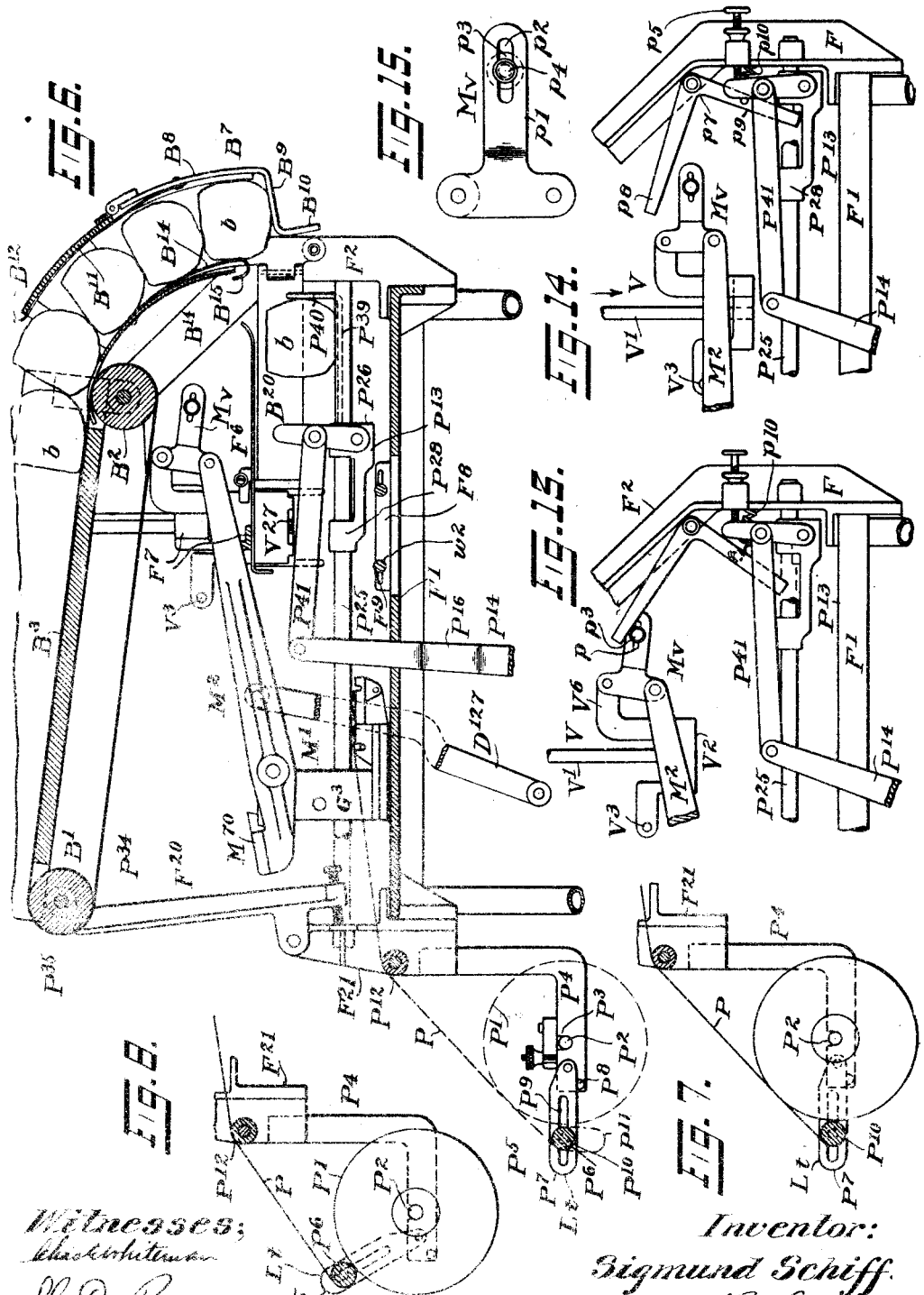

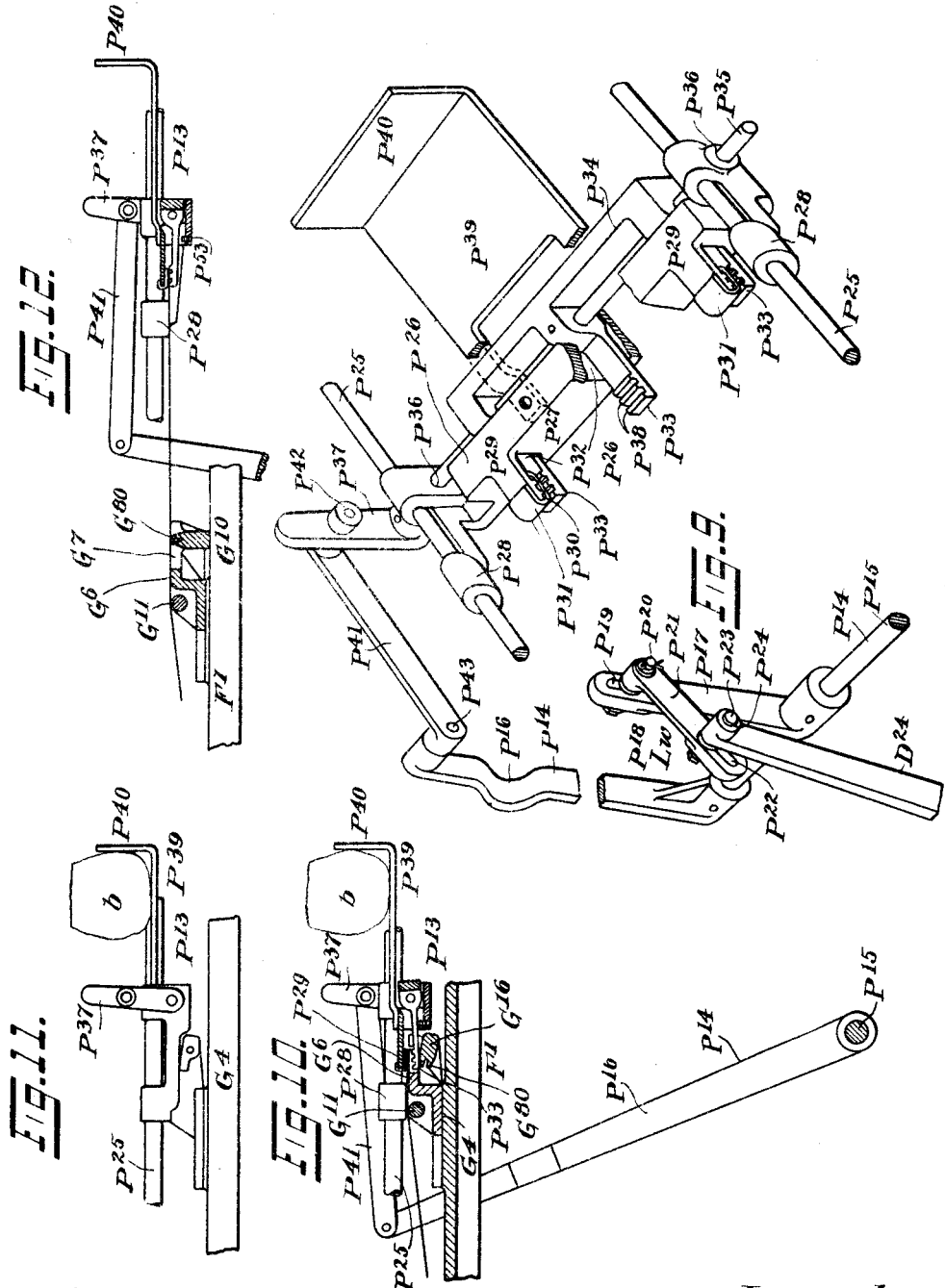

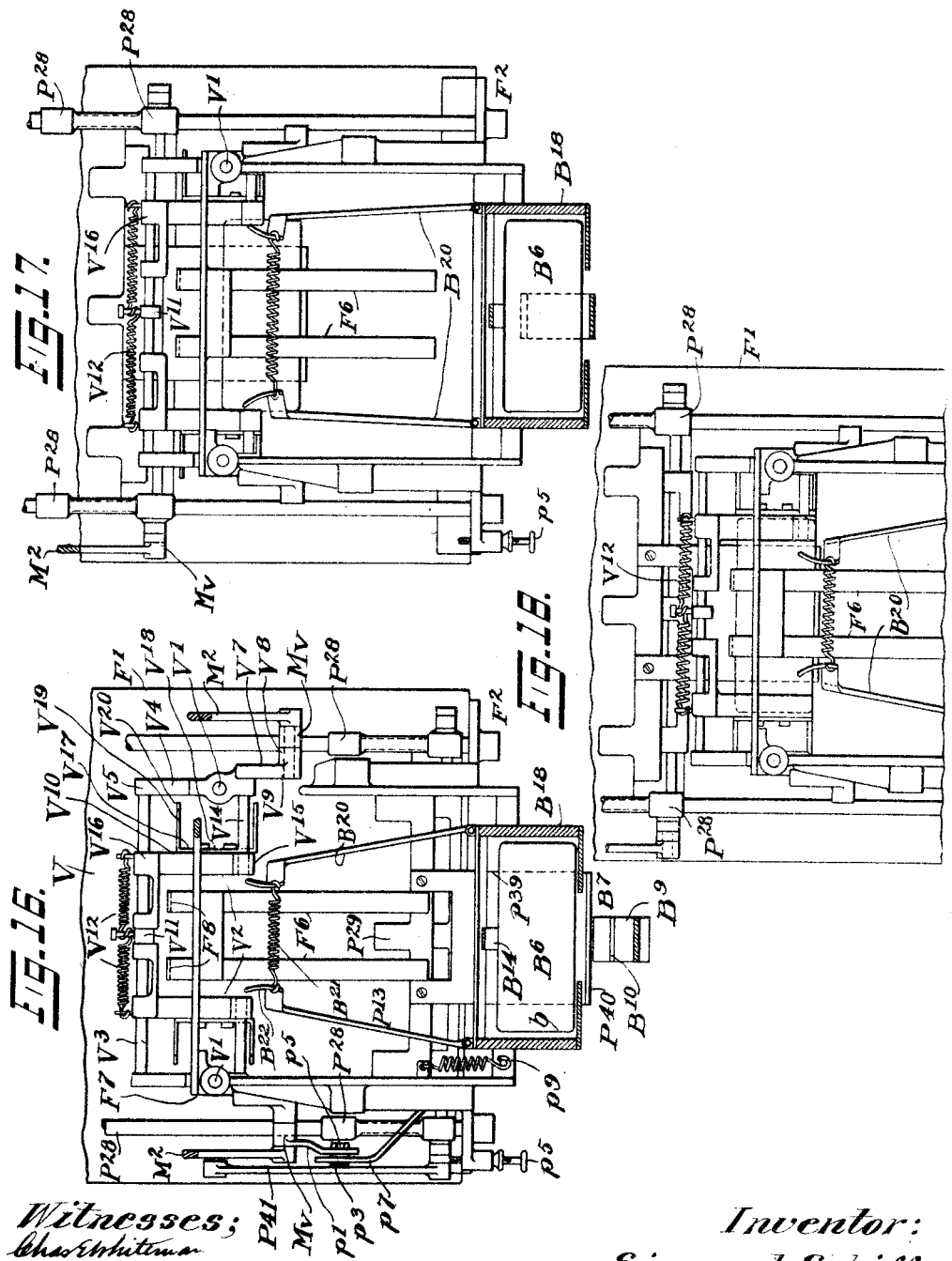

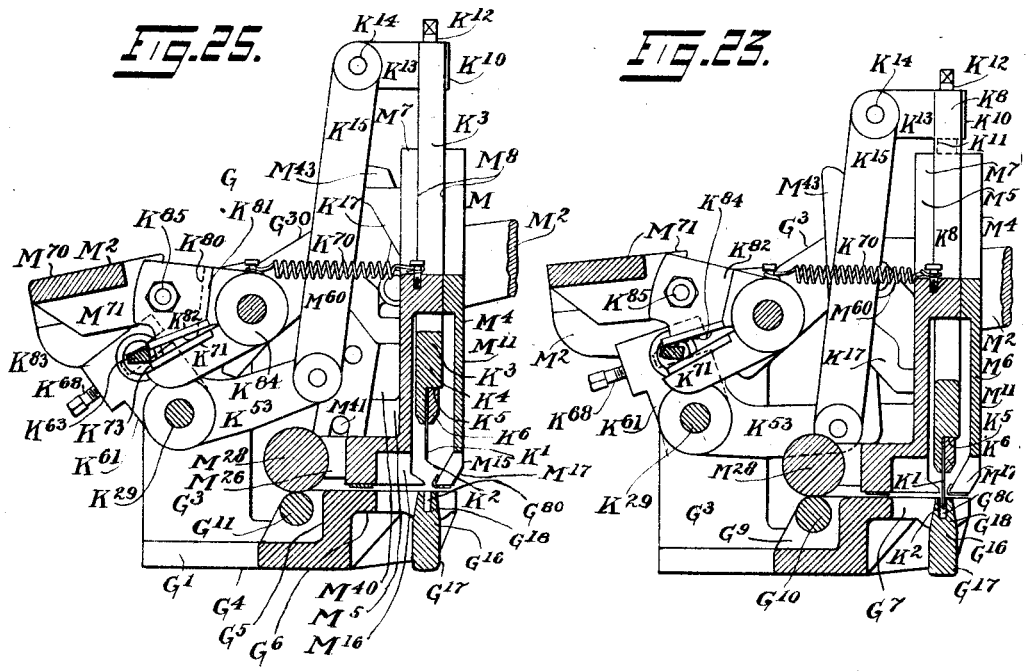
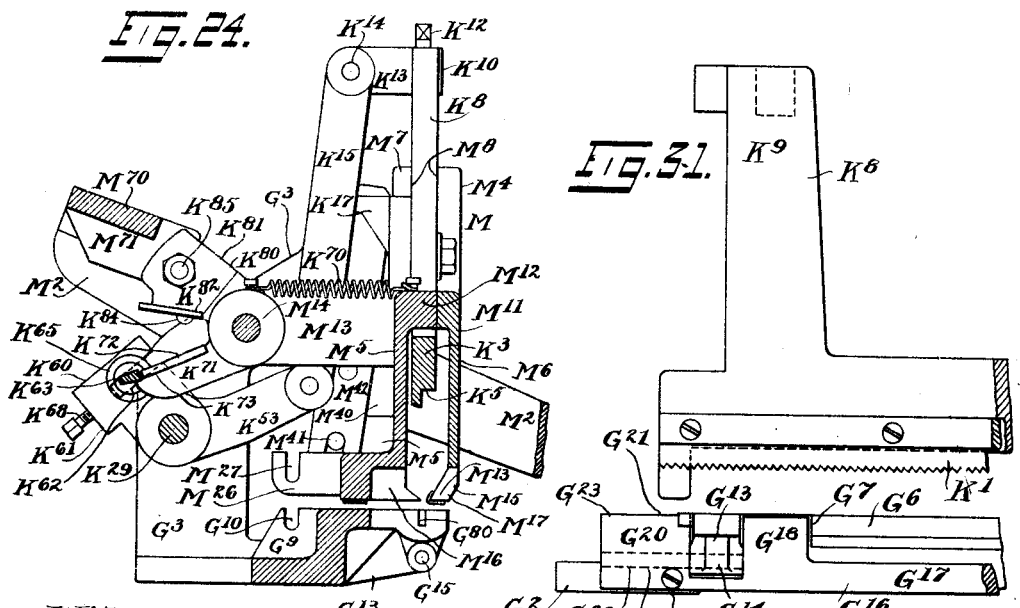

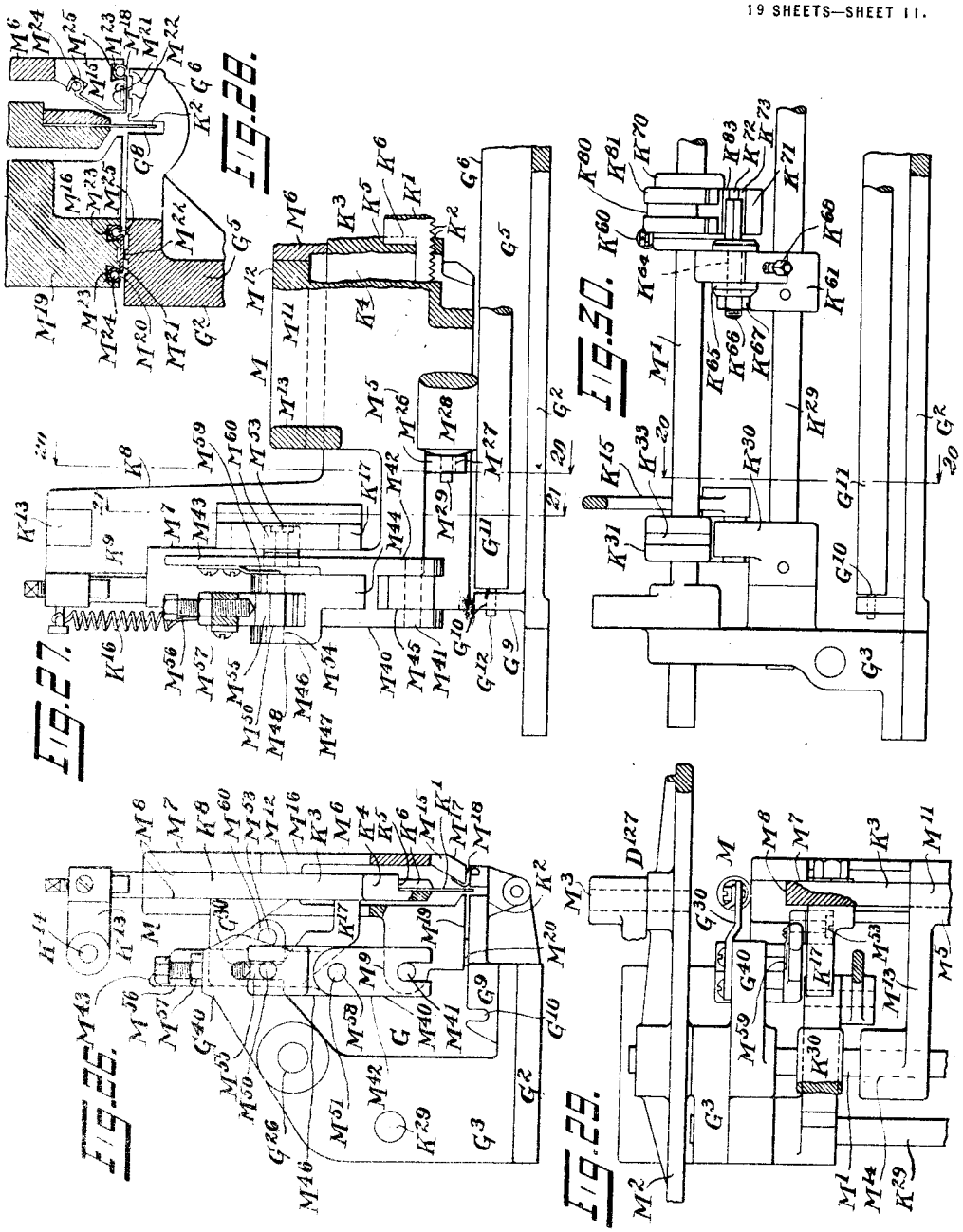

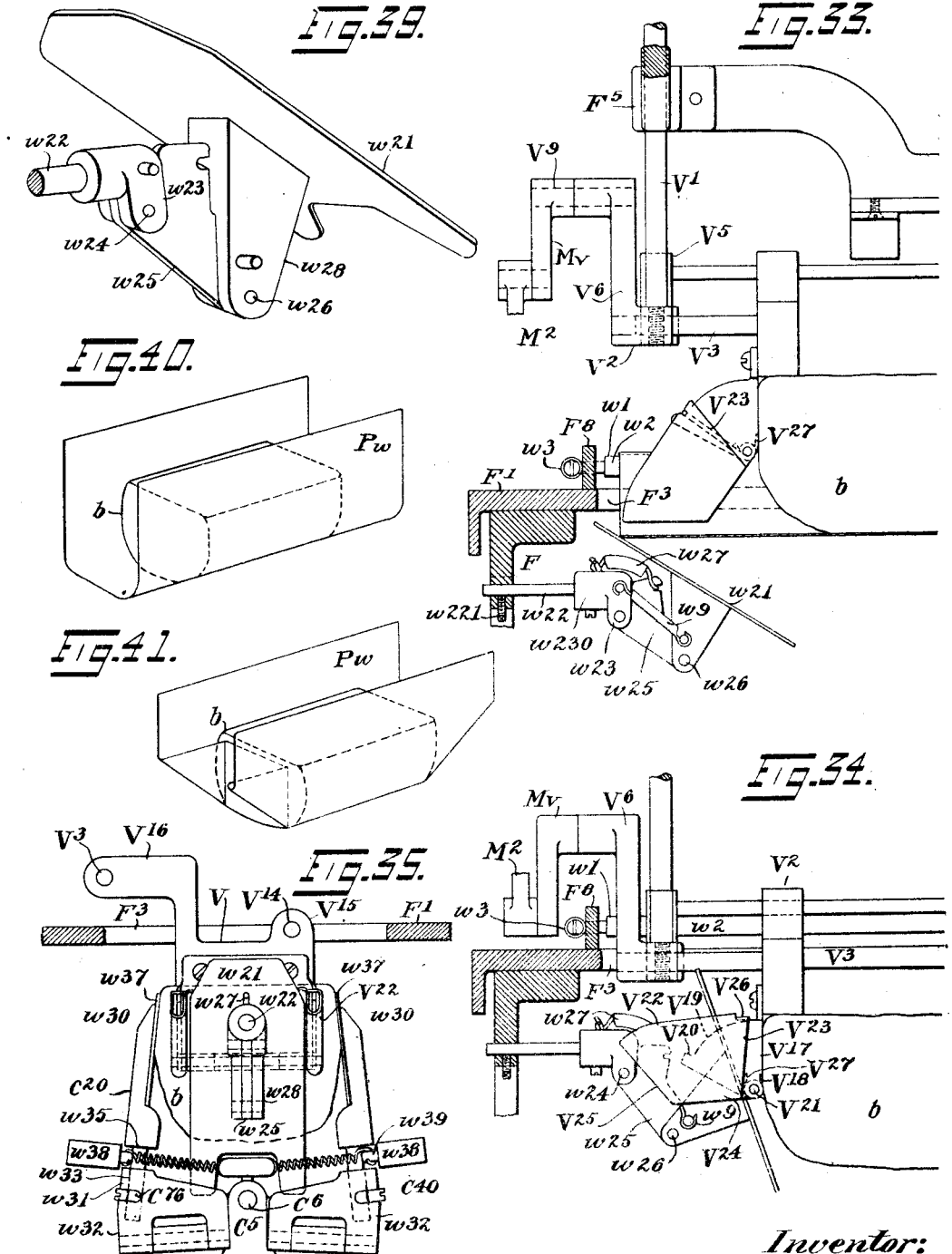

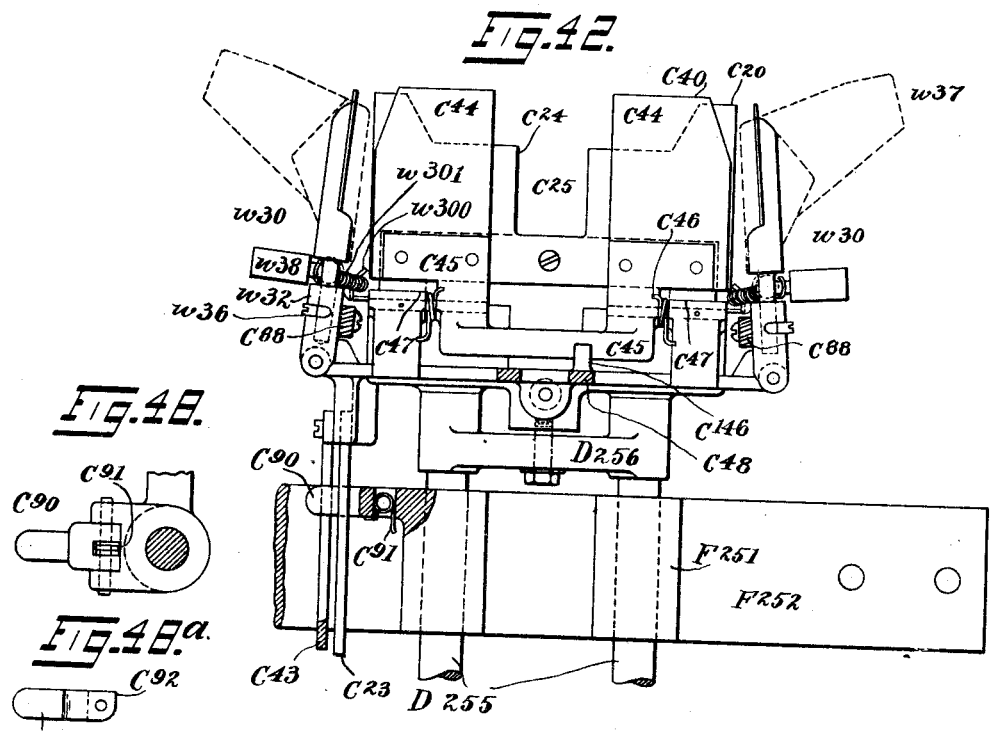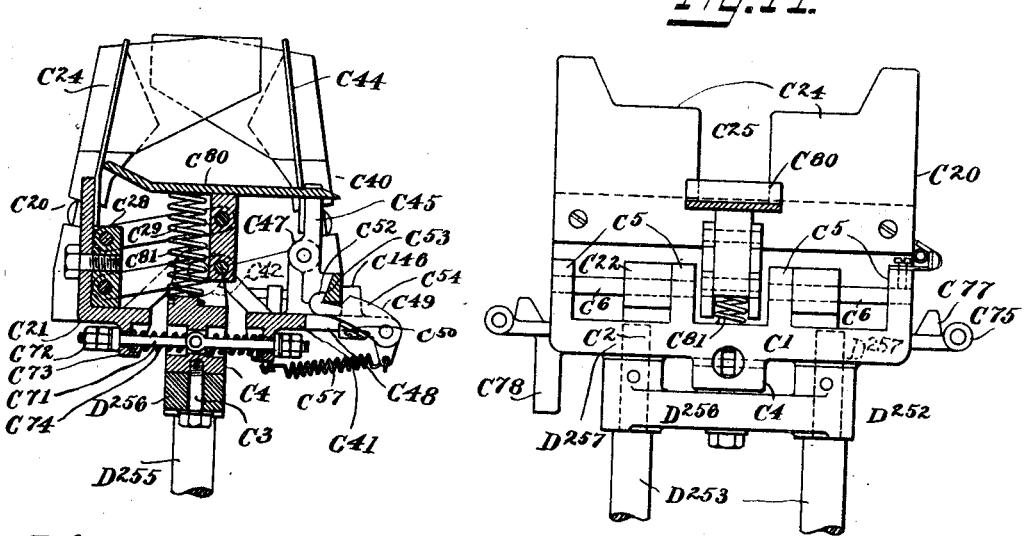

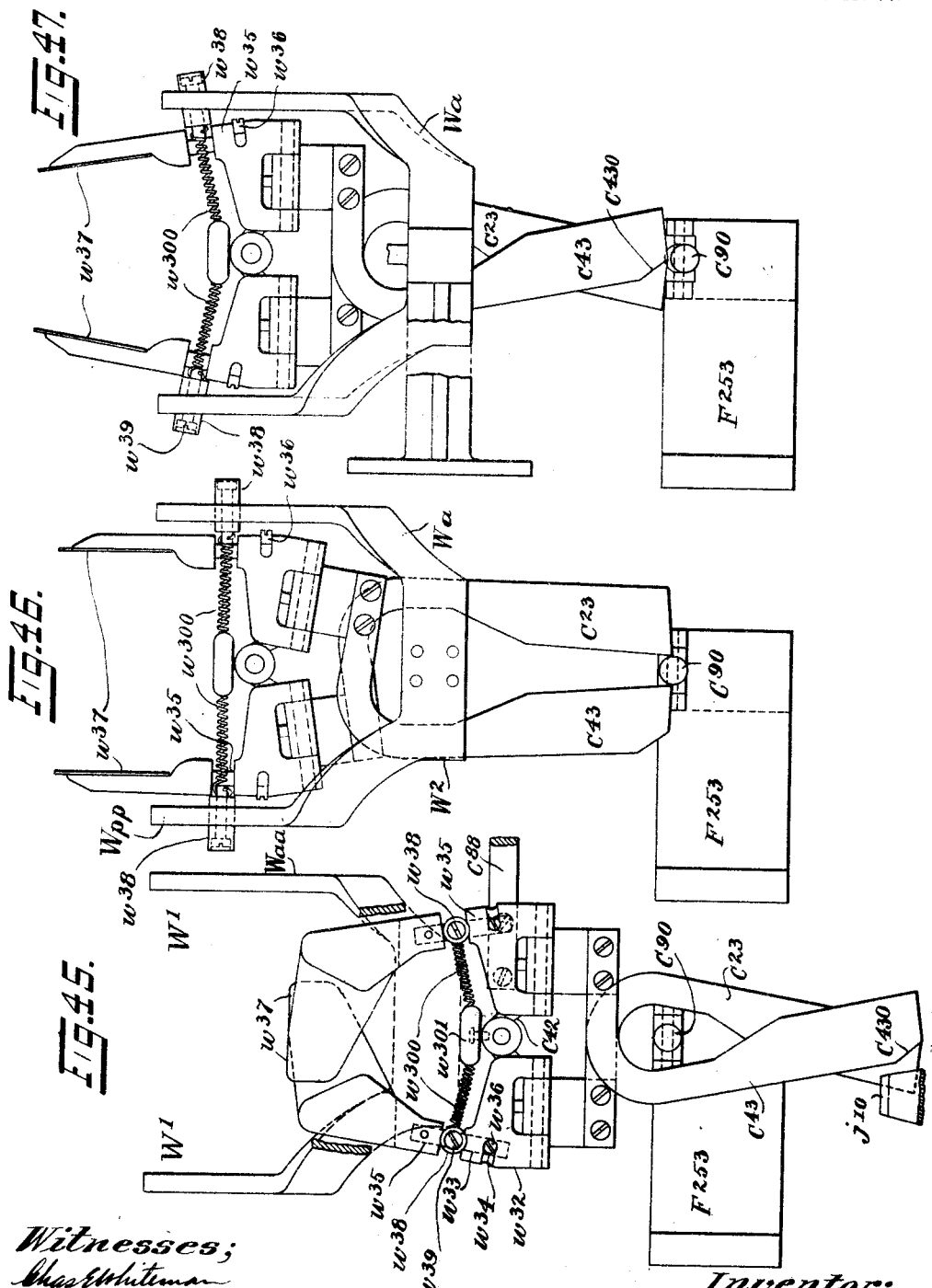

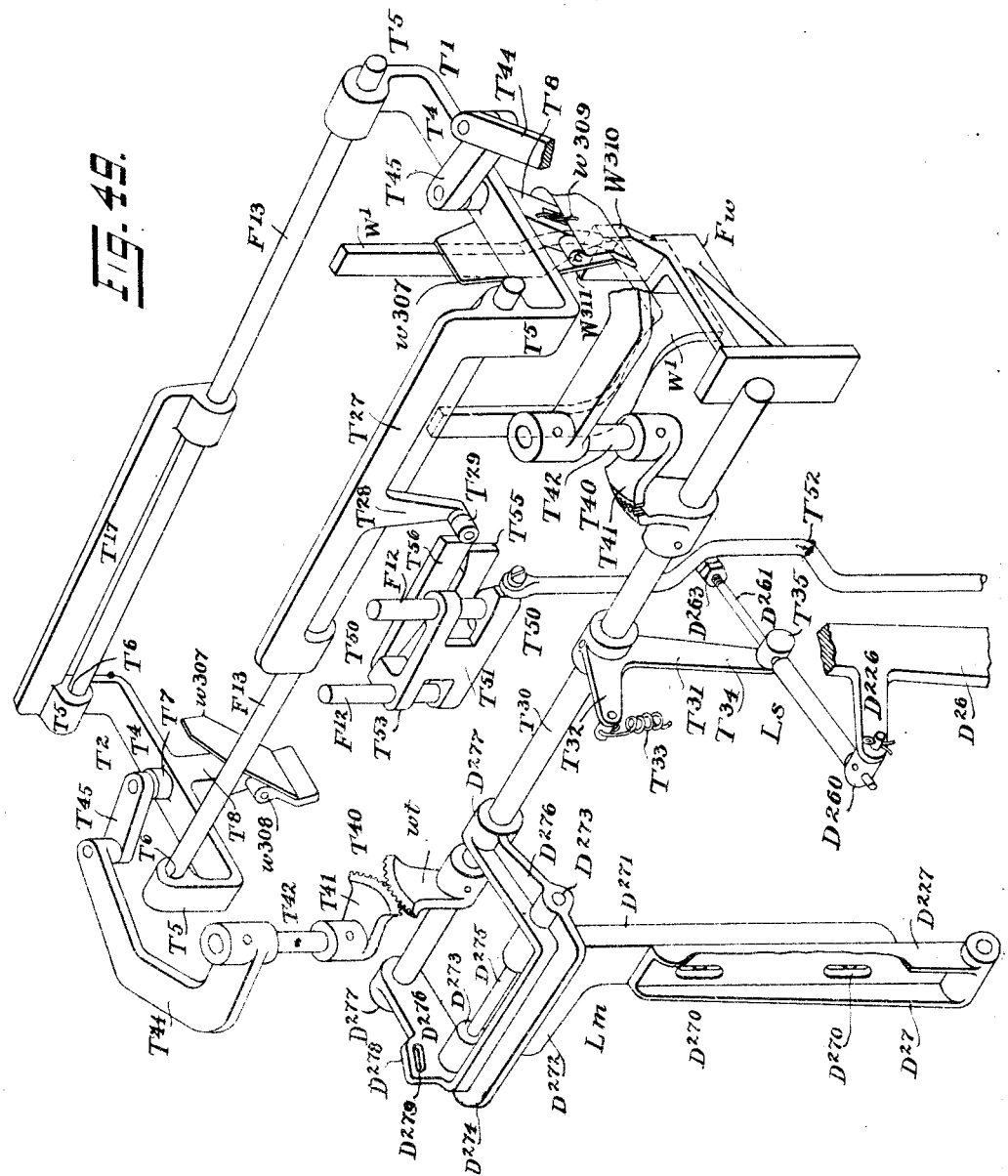

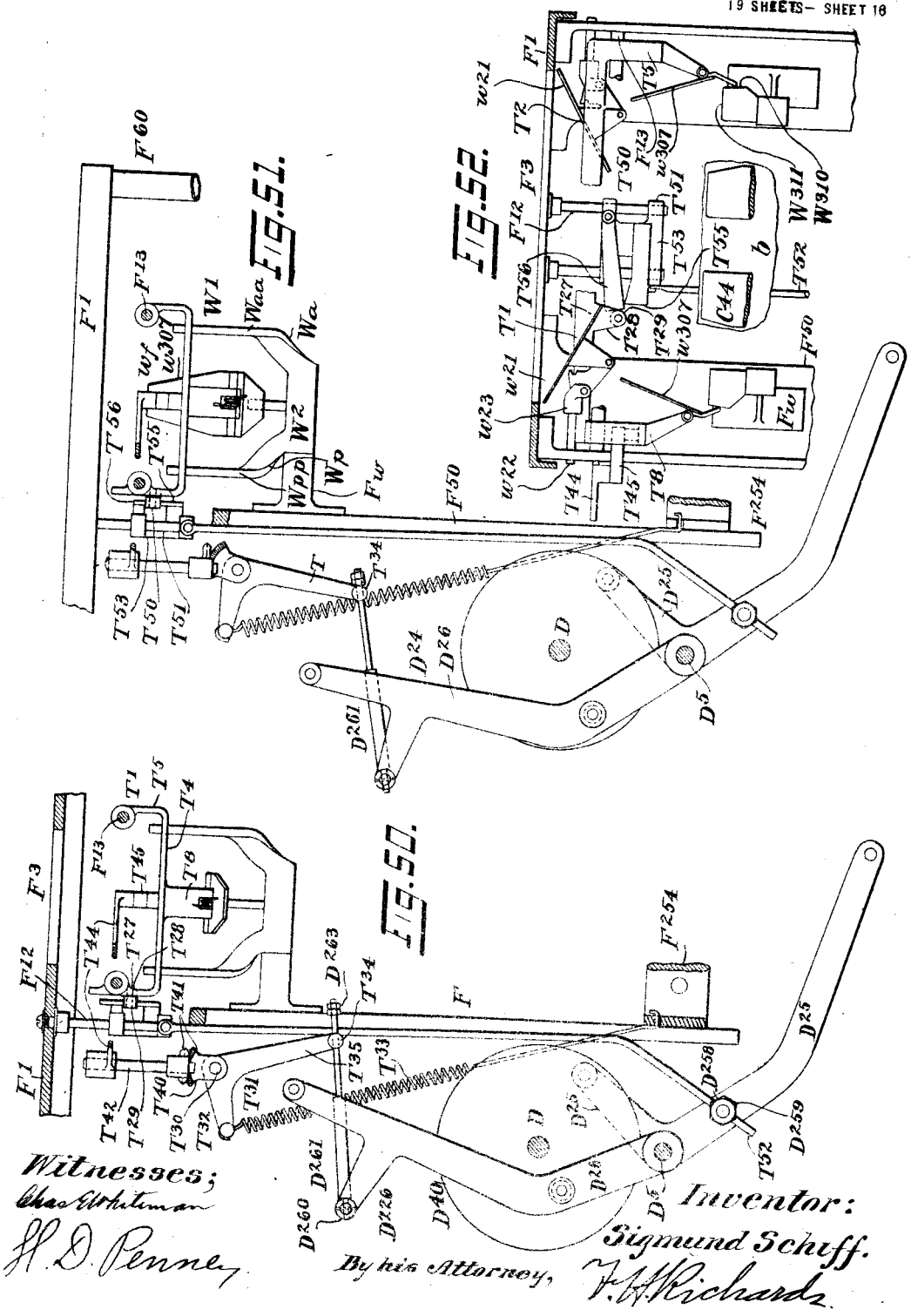

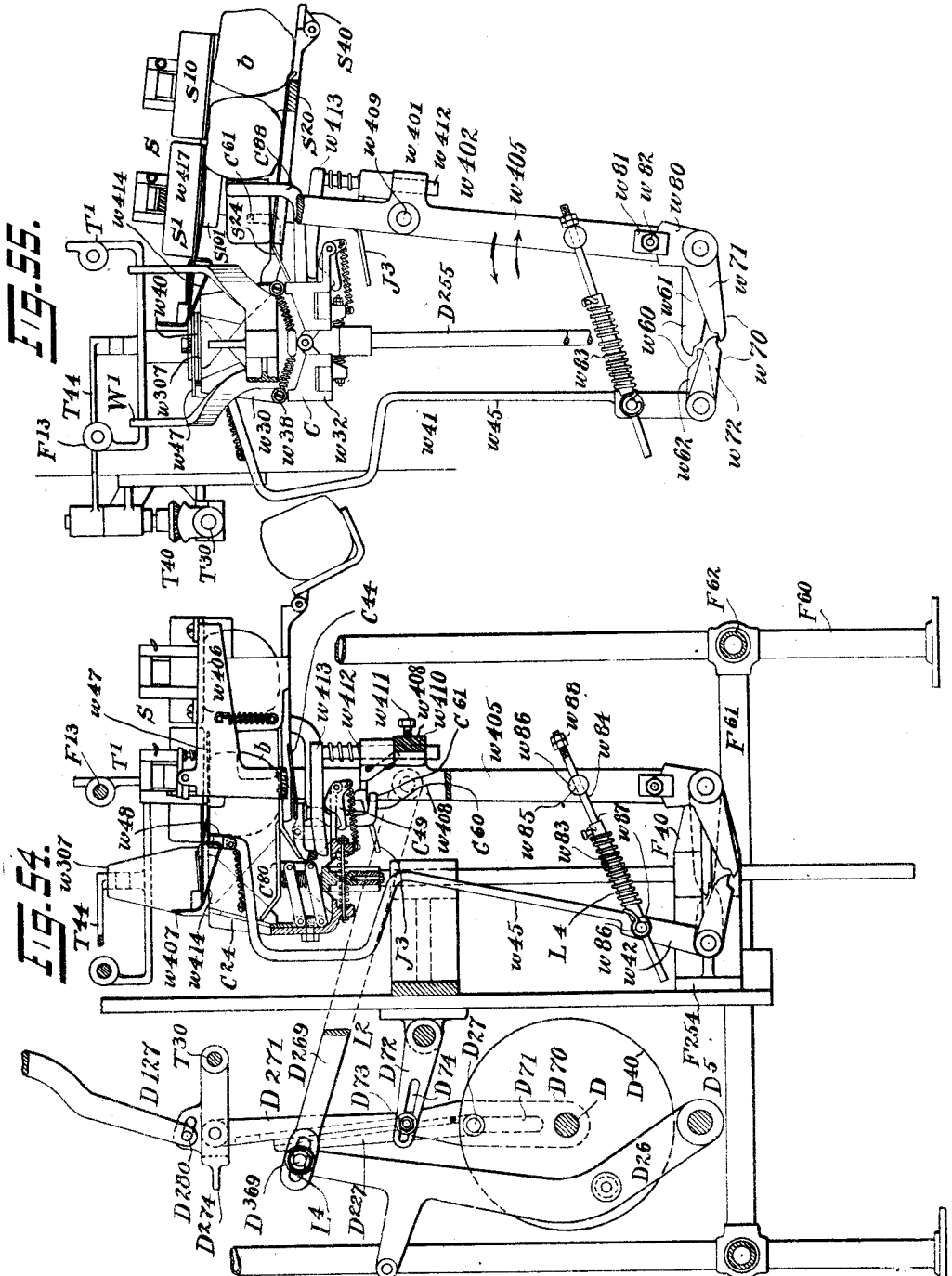

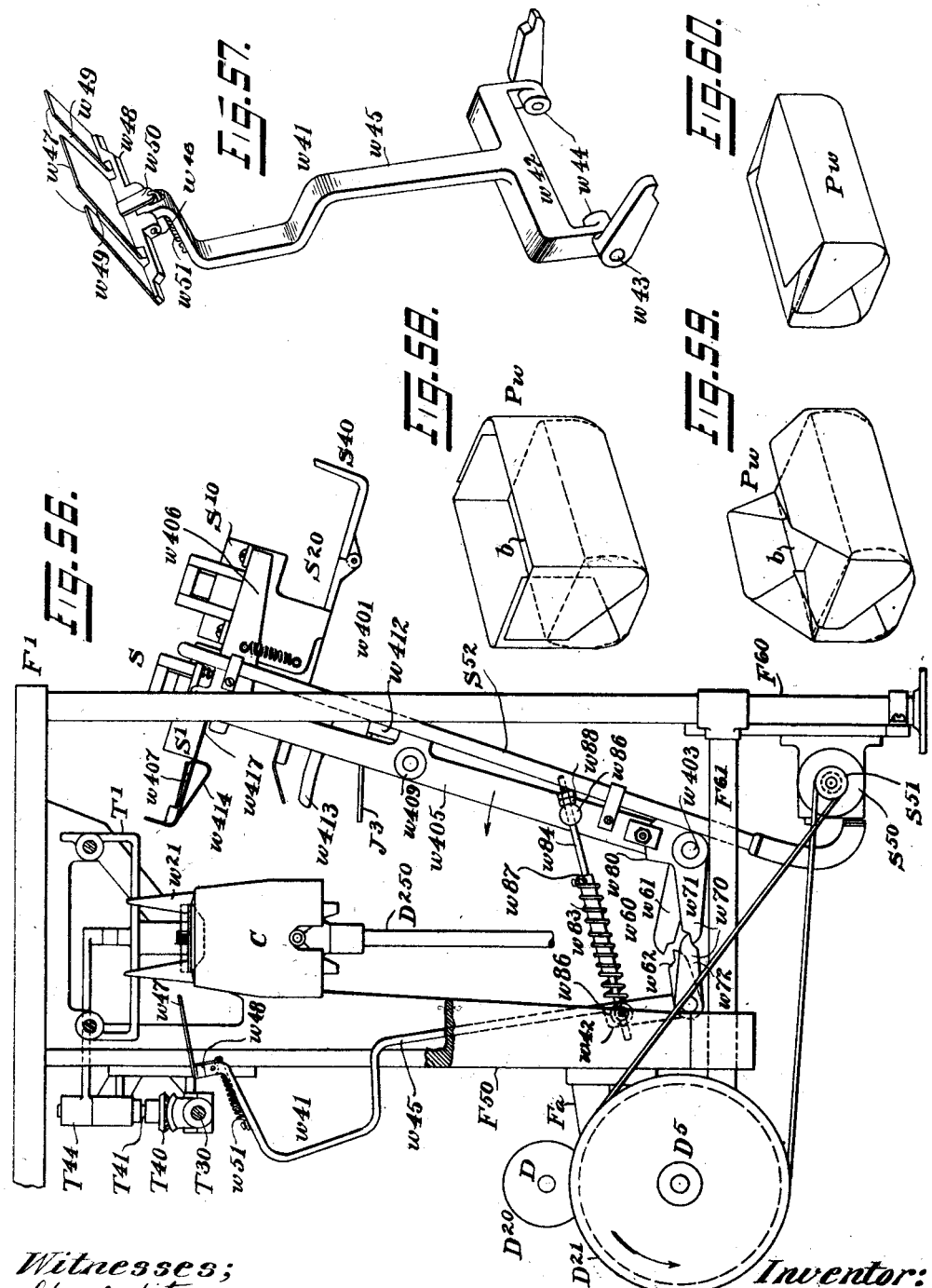

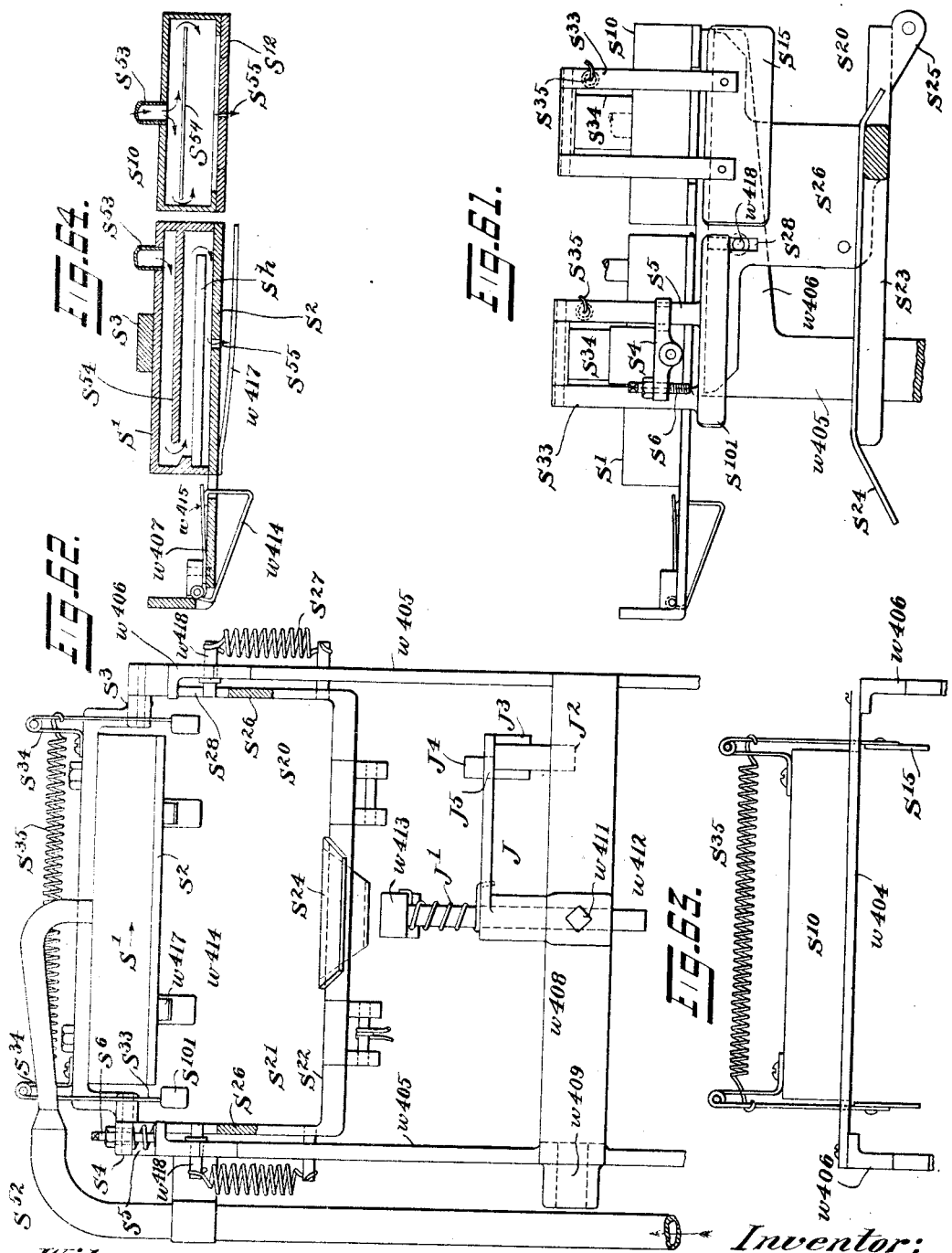

UNITED STATES PATENT OFFICE.

SIGMUND SCHIFF, OF NEW YORK, N. Y., ASSIGNOR OF ONE-HALF TO RAOUL FLEISCHMANN, OF NEW YORK, N. Y.

PACKAGE-WRAPPING MACHINE.

1,192,351.   Specification of Letters Patent.   Patented July 25, 1916.

Application filed June 5, 1913. Serial No. 771,874.

*To all whom it may concern:*

Be it known that I, SIGMUND SCHIFF, a subject of the King of Hungary, residing in the city of New York, county and State of New York, have invented certain new and useful Improvements in Package-Wrapping Machines, of which the following is a specification.

The object of my invention is to wrap units variable within limits as to dimensions and contour; that is to say, units which are commercially uniform, but physically, vary within certain limits in density, dimensions, volume and contour, and especially to wrap loaf bread and other oven products, and shapeless units generally. The keen competition and speed of modern commerce, the precision of automatic parceling machines and the uniformity and neatness of their parcels have caused their general use for granular commodities and those of practically uniform density and controllable hardness, such as butter, etc.

It is obvious that mechanical wrapping of oven products is not only sanitary and preservative, but also facilitates trade and is therefore even more desirable and advantageous for such products than for those it is now generally applied to; and many commercially un-successful machines for the purpose have demonstrated not only its inherent advantages and economies but also the fact that such a machine, in order to perform satisfactorily, must embody fundamental principles not heretofore used. Such principles are embodied in my machine. In lieu of the simple folding and bending movements heretofore used for such purposes, I give orbital, rolling and wiping movements to the wrapping elements so that they may follow around, roll on and wipe the irregular contour of the unit to be wrapped and conform the wrapper closely to it, like a human hand.

In the practical application of another such principle (which may be called the principle of limits) to wrapping machines, as illustrated herein, I provide certain essential mechanical elements, each element having a definite function or series of functions, and I provide limit mechanism comprised in and in combination with each such element and thereby I make each such function an independent variable and establish limits, namely, a minimum limit and maximum limit, within which limits said function can vary, independently of all the other variables, and proportionately to the extreme physical variations (relatively to that function) of the several units to be wrapped; and by so establishing proper limits within which each function of each mechanical element, and necessarily the completed work of each such element, can vary independently, as aforesaid, I provide a flexible organization of variable elements which, properly coacting one with another, in series, will produce a physically-variable, but commercially uniform result,—*i. e.*, a machine to properly wrap physically-variable irregularly-shaped units.

There is probably no other commodity known to the arts to which the principle of variables applies more completely than bread, for the wrapping of which this machine is especially designed. The dough, a variable, is manufactured into bread under variable and varying conditions and the product, loaf bread, is a variable as to actual weight, density, hardness, dimensions, volume and shape or contour. These variable, irregularly-shaped loaves, of which no two are exactly alike, must be wrapped into airtight parcels without subjecting them to any sensible pressure or other severe usage. This can be done successfully only in an orbital-motion, limited-variation machine, the elements of which are adapted to automatically vary their functions, within limits, proportionally to the physical variations of each particular loaf, as the same is wrapped. Further, the design of my machine and its members and their functions and proportions are such as to admit of factory adjustment of different machines produced by the duplicate part system but severally adapted to wrap loaves of any average size within the limits set by the uses of the trade, as for example machines to wrap five-cent loaves and others to wrap ten-cent loaves; the principal members of such machines being produced from the same patterns, templets, etc., but differently adjusted and subordinate members of different proportions being used in different machines.

Because the average size of loaf varies, and in order that wrapping paper be not wasted, the proper feed and the size of wrapping sheet cut off and used must be quickly adjustable: that is to say, the cutting-off mechanism must be variable as to time, relatively to the wrapping functions. And because every dimension of each individual loaf differs from the like dimension of every other loaf, and because of the irregular shapes of loaves, each wrapping function and each series of such functions must be automatically variable, within limits.

The specification describes and the drawings illustrate a loaf-bread wrapping machine.

In describing the drawings, I classify them according to the location of their respective picture-planes, into axial, i. e., those parallel with the working axis of the machine, and transverse, those transverse to that axis; according to their scale and the number of parts developed, into general and detail; and according to their character, into constructional or general, i. e., those showing construction and organization; and functional, i. e., those illustrating actions or functions. A large proportion of the drawings are of the latter nature and I shall treat them as graphical descriptive matter and refer to them as such, throughout the specification.

The constructional drawings are Figures 1 to 5 inclusive, of which Fig. 1 is a horizontal axial view on the plane 1—1 of Figs. 2, 3 and 4. Fig. 2 is a delivery-end elevation of my machine above the bed-plate and below it, a transverse section on the plane 2—2 of Figs. 1 and 4, omitting members which operate axially. Fig. 3 is a supply-end elevation with the outer members broken away on the left side to better illustrate power transmission and adjustment elements. Fig. 4 is a side elevation. Fig. 5 is a detail illustrating the drive and power transmission apparatus and is located at plane 5—5 of Figs. 1 and 4. Fig. 5ª is a diagram illustrating the action of the paper-and-loaf supply cam and of the knife and vise cam. Fig. 5ᵇ is a similar diagram relating to the chuck and final-wrap cams. Fig. 6 is an axial section of the upper part of the machine. Fig. 7 is a partial section illustrating the operation of the limit mechanism connected with the paper roll, and Fig. 8 is a like view with parts differently located. Fig. 9 is a perspective illustrating the paper-feed and loaf-supply mechanism. Fig. 10 is a section of said parts when gripping supply-paper, and Fig. 11 a corresponding elevation: Fig. 12 is a view showing them when the paper-supply is being drawn into the machine. Fig. 13 is an elevation of the paper feed mechanism nearly retracted, Fig. 14 a fully-retracted view thereof, and Fig. 15 an enlarged detail of a member thereof. Figs. 16, 17 and 18 are partial plans illustrating the action of the paper-feed, loaf-supply and vise mechanisms, Fig. 16 illustrating the former retracted and the latter inactive, Fig. 17 the former advancing and the latter coming into action, and Fig. 18 the latter in action and the former beginning its retraction. Figs. 19 to 31 inclusive illustrate the operations of the wrapper-cutting mechanism. Figs. 19 to 22 inclusive being especially illustrative of the mode of lifting the knife and Figs. 23 to 25 of the mode of locking it when lifted and of releasing it. Fig. 19 is an axial sectional elevation of the supply-paper-retaining and knife-guiding mechanism and snap-knife mechanisms, showing the knife-stock raised. Fig. 20 is a corresponding section on the line 20—20 of Figs. 27 and 30. Fig. 21 is a section on the line 21—21 of Fig. 27, with the knife down. Fig. 22 is a like section but with the knife being raised. Fig. 23 is a section on the line 23—23 of Figs. 27 and 31 showing the knife-locking mechanism with the knife down. Fig. 24 a like section showing the knife lifted and its primary locking engagement, and Fig. 25 a like section showing the initiation of knife-release. Fig. 26 is an axial elevation, partly in section, showing the knife nearly down. Fig. 27 is a partial supply-side transverse elevation, illustrating the lifted knife and its guide. Fig. 28 is an enlarged partial axial section on the line 23—23 of Figs. 27 and 31, illustrating my preferred mode of constructing paper-retaining jaws. Fig. 29 is a partial plan of an end of the wrapper-cutting mechanism. Fig. 30 is a partial, supply-side, transverse elevation illustrating the knife-lifting gears and knife lock-and-release mechanism, and Fig. 31 (Sheet 10) a partial delivery-side, transverse elevation of the knife and paper-support. Fig. 32 (Sheet 2) is a transverse functional view illustrating the relations, antecedent to wrapping, of my vise, wrapper and first, and second-stage wrap mechanisms. Fig. 33 (Sheet 12) is a like view illustrating the wrap during its first stage. Figs. 34 to 39 inclusive are similar views illustrating the wrap during its second stage. Fig. 34 illustrates the vise and a loaf therein co-acting with the second-stage wrap mechanism, Fig. 35 the vise feeding a loaf, two stages of its wrap completed, into my chuck. Fig. 36 (Sheet 2) a second-stage wrap mechanism ready for action, Fig. 37 shows it co-acting with a loaf-end, and Fig. 38 with the end of a longer loaf. Fig. 39 (Sheet 12) is an enlarged perspective of a second-stage wrap mechanism with its springs removed. Fig. 40 illustrates a loaf and wrapper in the first stage and Fig. 41 illustrates them in the second stage. Figs. 42 to 48 inclusive illustrate my chuck, or loaf-grasping and feeding mechanism and my third-stage wrap mechanism. Fig.

42 is an anterior elevation partly in section, showing the chuck mounted by its carrier on the machine frame and the third-stage wrap mechanism mounted on the chuck. Fig. 43 is an axial section of the chuck on the line 43—43 of Figs. 42 and 44, and Fig. 44 is a view corresponding with Fig. 42 but with the anterior jaw and the cams of the chuck and the wrap-mechanisms removed. Fig. 45, and Figs. 46 and 47, are enlarged functional views illustrating the co-action of the chuck-jaws and wrap-mechanisms with their respective operating cams, Fig. 45 being an axial view illustrating the chuck down and said members not co-acting, Fig. 46 a similar view of the chuck in nearly the highest position, with its jaws and the wrap mechanisms extended and Fig. 47 a similar view with the chuck-jaws in loaf-grasping position. Fig. 48 (Sheet 13) is a plan of a mounted operating-pin for the chuck-jaw cams and Fig. 48ᵃ a side view of said pin unmounted. Figs. 49 to 53 inclusive illustrate my tuck mechanisms. Fig. 49 is a perspective illustrating my tuck-mechanisms, their lock-and-release mechanism and the connection thereof with my transmission apparatus. Fig. 50 an axial view illustrating the locations of said connections when the tuck mechanisms are advanced; Fig. 51 is a similar view illustrating their locations when said mechanisms are retracted, and Fig. 52 is a transverse view corresponding with Fig. 51 and also showing the relations at such times of said tuck mechanism with the chuck and a loaf therein, and with the second-stage wrap mechanisms. Fig. 53 (Sheet 3) is a transverse view illustrating my tuck-timer and its operative connection. The remaining figures illustrate the co-action of my chuck and third-stage wrap mechanisms with my fourth-stage wrap mechanisms and of the latter with my sealing mechanism. Fig. 54 is an axial view showing the chuck and third stage wrap mechanisms at the end of their cycle and the fourth stage mechanism approached. Fig. 55 is a similar view illustrating the motions of the fourth-stage mechanisms and Fig. 56 a similar view illustrating their recession. Fig. 57 is a perspective of the prior or posterior fourth-stage wrap lever and plate. Fig. 58 is a perspective illustrating the state of a partly wrapped loaf after the third stage mechanisms have co-acted with it. Fig. 59 is a like view after the tuck operation, and Fig. 60 a like view of the finished parcel. Fig. 61 is an axial view partly in section of my sealing mechanism, mounted. Fig. 62 is a corresponding transverse view showing my heater mounted, and Fig. 63 an axial elevation of said mechanism. Fig. 64 is a partial view corresponding with the upper part of Fig. 62, showing the mounting of my cooler.

*Terminology.*—Throughout this specification, except where the context clearly implies a different meaning, "Axial" means parallel with the horizontal working axis of the machine. "Transverse" means horizontally perpendicular thereto. "Advance" means coinciding in direction with a feed motion. "Advanced" means farther along in such motion. "Anterior" means toward the right-hand or delivery end of the machine; or more advanced, or the more advanced or leading object in direction, or in a feed direction. "Posterior" means the opposite of anterior—toward the left hand or supply end or the object which comes after or follows. "Supply end" or "supply", means the end at which the roll paper and loaves are supplied; *i. e.* the left hand end. "Delivery end" means the opposite end to the supply. "Near" means toward the reader as he reads Fig. 4. "Far" means opposite of near.

*The transmission or drive mechanisms.*— While it would be practicable to drive my machine from shafting through the agency of belting or otherwise, it is much preferable to make it an entirely self-contained machine and drive direct; and to that end I provide a suitable electric motor, E, Figs. 1 to 5, from the shaft E¹ of which I transmit power, by a suitable chain E² or otherwise, with a suitable reduction of rotative speed, to a sprocket wheel, D¹, mounted on, and revoluble relatively to, a main driving shaft D. I accomplish a second speed-reduction by means of a reduction gearing, D², operably connected with the sprocket wheel D¹ and preferably consisting in a pinion D³ fixed on the sprocket wheel D¹ and a wheel D⁴ engaging therewith and revolubly mounted on a pivot shaft D⁵, likewise revolubly mounted, in bearings, parallel with the main shaft D; and I accomplish a third speed reduction by means of a reduction gearing D⁶, comprising a pinion D⁷ releasably connected with and adapted to be driven by the wheel D⁴ of the second reduction gearing D² and a gear wheel D⁸, meshing with the pinion D⁷ and keyed or otherwise secured to the main shaft D and adapted to revolve it.

The pinion D⁷ of the third reduction gearing D⁶ is combined with safety friction clutch mechanism D⁹ by which said pinion D⁷ can be connected with the wheel D⁴ and driven thereby, when everything is working smoothly and which will instantly and automatically release in case of obstruction or accident, so that, in effect, the clutch D⁹ constitutes a limit mechanism L¹ introduced into the transmission, which will absolutely limit the amount of power possible to transmit from the motor to the functioning elements of the machine to that amount which will perform the maximum duty of the machine, and no more; so that any derangement will cause the stoppage of the machine and not its destruction.

For the clutch $D^3$, the wheel $D^4$ is made discoid and finished and polished on the face adjacent to the clutch, and a left-hand thread, $D^{10}$, is cut on the pivot shaft $D^5$. A tubular nut $D^{11}$ with a shoulder $D^{12}$ and discoid ratchet-wheel head, $D^{13}$, provided with teeth $D^{14}$, fits and works on the thread $D^{10}$; the pinion $D^7$ of the third reduction gearing $D^6$ is constructed to fit the shank of the nut $D^{11}$ and is mounted thereon; a rigid disk, $D^{15}$, is rigidly connected with the pinion $D^7$ and a fiber disk, $D^{16}$, is interposed between said disk $D^{15}$ and the polished discoid wheel $D^4$.

A spring $D^{17}$, is strained between the nut $D^{11}$ and an abutment ring $D^{18}$ mounted on the pivot shaft $D^5$ and adjustably secured thereon by means of a set-screw $D^{19}$, or otherwise. In the operation of the machine, the spring $D^{17}$ is set up to the desired resistance by turning the abutment ring $D^{18}$ with a spanner or otherwise, and securing it after the resistance is properly adjusted, by means of the set-screw, $D^{19}$. The recoil of the spring $D^{17}$ screws the nut $D^{11}$ down on the thread $D^{10}$ and presses the rigid disk $D^{15}$ and fiber disk $D^{16}$ against the polished discoid surface of the gear wheel $D^4$ and the resulting settable friction constitutes the power-transmission limit of the apparatus. If the resistance is greater than this limit-friction can overcome, it holds the pinion $D^7$ angularly stationary and the motor E idly revolves the sprocket wheel $D^1$ and second reduction gear wheels $D^2$ and $D^4$, and tends to unscrew the pivot shaft $D^5$ and thread $D^{10}$ relatively to the nut $D^{11}$, so as to render nil the friction of the discoidal clutch members aforesaid, the nut $D^{11}$ being revoluble with the pivot shaft $D^5$ and slightly angularly and axially movable thereon, by turning said screw $D^{19}$; and the pinion $D^7$ being revoluble on said nut save as it is pinched between the shoulder thereof, $D^{12}$, and the discoid wheel $D^4$.

The pivot shaft $D^5$ has a locating or abutment ring, $D^{20}$, which locates the wheel $D^4$; it extends outwardly and carries a pulley $D^{21}$, the uses of which will be hereinafter explained; it has shouldered journals, $D^{22}$, by which it is supported and axially located in bearings, $D^{23}$ on the frame F, and it serves as the pivot or fulcrum for my three main operating levers, namely, $D^{24}$, the paper-feed and loaf-supply lever, $D^{25}$, the loaf holder or chuck lever; and $D^{26}$, the final wrapping lever. The main driving shaft D, has likewise shouldered journals $D^{32}$ by which it is secured and located in bearings, $D^{33}$ on the frame F; it extends outwardly and has a pulley, $D^{36}$, secured on one end, the uses of which will be hereinafter explained, and keyed to it are two cam disks, $D^{40}$ and $D^{50}$, respectively, in the discoid faces of which I cut cam-grooves, as follows, and as illustrated diagrammatically in Figs. $5^a$ and $5^b$, which are located on Sheet 5, immediately beneath and projected from the said respective cam disks in Fig. 5; viz:—in the right hand face of the right-hand cam disk $D^{40}$ I cut the final wrapping lever cam groove $D^{41}$ and in the left hand face thereof the chuck-lever cam groove $D^{42}$; and in the right hand face of the cam disk $D^{50}$ the paper-feed and loaf-supply lever cam groove $D^{51}$ and in the left-hand face thereof the loaf-feed and knife-operating lever cam groove $D^{52}$. I provide cam rollers, $D^{28}$, revolubly mounted on studs $D^{29}$ fixed in the several levers and link and engaging with said cam grooves, whereby the levers $D^{24}$, $D^{25}$, $D^{26}$ and link $D^{27}$ may be cam-operated.

As shown in Figs. 4, 5 and 50, the paper feed lever $D^{24}$, chuck lever $D^{25}$, and wrapping lever $D^{26}$, are non-adjustable oscillating levers, fulcrumed on the pivot shaft $D^5$, extending parallel with and by their respective cam rollers $D^{28}$ engaging, and being oscillated by their respective cam grooves $D^{51}$, $D^{42}$, and $D^{41}$; and said levers, together with their pivot shaft $D^5$ and the revoluble and clutch members mounted or secured thereon, as heretofore described, constitute an assembling unit, which can be readily assembled.

It will be observed that it is unnecessary to provide adjustments for said levers because suitable adjustment is more conveniently made elsewhere. On the contrary, the loaf-feed and knife-operating link $D^{27}$, must be manually adjustable for reasons which will be later set forth; and I provide, located between the loaf-feed and knife-operating cam $D^{52}$ and loaf-feed and knife-operating link $D^{27}$, a manually-operated adjusting mechanism, $L^2$, best illustrated in Figs. 5, 54 and 49 (Sheet 15) variable within limits, to adjust the period, in the cycle of operations, at which the wrappers are cut and loaves fed to the wrapping mechanism, relatively to the periods of the other operations of the cycle.

The loaf-feed and knife-operating link $D^{27}$, unlike the operating levers, has a reciprocatory motion, its power-receiving end working in a radial plane of the corresponding cam $D^{52}$; and by making the location of this plane angularly adjustable relatively to the cam $D^{52}$, the desired period-adjustment of the bread-feed is easily accomplished. I therefore provide the aforesaid limit mechanism $L^2$, which comprises an arm $D^{70}$, swiveled axially relatively to the cam $D^{52}$, preferably (for convenient assembling as shown in Fig. 5 and in detail in Fig. 54) on the main shaft D, and having a radial guide or slot, $D^{71}$, therein, and I provide for angular adjustment of its operating location relatively to the cam $D^{52}$ in a suitable manner, preferably by means of a slotted link, $D^{72}$, pivoted on the main frame F, to which the free end of said arm $D^{70}$ may be adjustably bolted with a bolt $D^{73}$, carried by said arm, the range of angular and time-adjustment therefore depending on the length of the slot $D^{74}$ in the link $D^{72}$. These parts being properly adjusted, with the operating link $D^{27}$ movably supported in a plane parallel with the discoid cam $D^{52}$ and the cam stud $D^{29}$ (mounted with a friction roller 710 to reduce its friction) extending through the guide-slot $D^{71}$ of the arm $D^{70}$ and the cam roller $D^{28}$ of said lever extending into the cam groove $D^{52}$, when the main shaft D and cams $D^{40}$ and $D^{50}$ are rotated, the power-receiving end of said link $D^{27}$ will be radially reciprocated in the adjusted plane of said guide slot; and the operating levers, $D^{24}$, $D^{25}$ and $D^{26}$ will be oscillated in proper sequence by their respective cams. The main shaft D with the members mounted thereon, i. e., pulley $D^{30}$, cam disks $D^{40}$ and $D^{50}$, gear wheels $D^1$ and $D^8$, and guide-arm $D^{70}$, constitute an assembling unit which can be readily bench-assembled and conveniently set in the machine as a unit. Further, as above recited, the pivot shaft $D^5$ and the members mounted thereon constitute a bench-assembled unit; and both the foregoing bench-assembled units are further bench-assembled into a compound assembling unit and properly relatively positioned and related by detachably mounting the first shaft $D^5$ and the main shaft D (with the aforesaid members mounted on them) in suitable bearings in an auxiliary frame member $F^2$, provided with flanges or other means for removably attaching it to the main frame F.

It will be seen that the entire assemblage or compound unit can be mounted and dismounted as such in my machine; and that each of its constituent units can be independently mounted and dismounted; and that this mode of assembling greatly reduces the first cost and facilitates and cheapens the repair of my machine.

*Power-control apparatus.*—I provide a power-control-apparatus *a*, by means of which the machine can be instantly stopped or started by the operator without stopping the motor. This might be a well known form of frictional or other control, but I prefer an instantaneous, positive control, such as illustrated in Figs. 4 and 5, in which an oscillating hand-lever, preferably a bell-crank lever $a^1$ is suitably pivoted on the main frame F with one arm $a^2$ extending conveniently to the operator and an arm $a^3$ extending toward the ratchet-wheel $D^{13}$ on the nut $D^{11}$ of the power-transmission clutch $D^9$ and power-limit mechanism $L^1$, so that when the control-lever $a^1$ is moved to the inner limit of its stroke, its control-arm $a^3$ will engage the ratchet teeth $D^{14}$ of the said ratchet wheel $D^{13}$, unset the clutch $D^9$ and suspend the power supply of transmission; and when it is moved toward the outer limit of its motion, the control arm $a^3$ will be moved away from and release said ratchet wheel $D^{13}$ and the spring $D^{17}$ will instantly re-set the clutch $D^9$ and the power supply will be again transmitted to the machine.

*Paper supply.*—Illustrated in Figs. 1 to 4 and 6 to 18 inclusive. Paper, P, of the desired qualities for wrapping, is supplied in a roll, $P^1$, of proper width, loosely mounted on a spindle $P^2$ which is dropped into slots, $P^3$, formed in arms $P^4$ attached to the frame F of the machine.

To enable my machine to take paper from a large and heavy roll without danger of tearing the paper or causing the machine to stagger under a suddenly-applied resistance, when the heavy paper roll $P^1$ is started to unroll, I provide a tension-limit apparatus $L^t$, such that the stress possible to exert upon the paper is limited to a definite amount, which is substantially one-half of a pre-determined weight, plus friction. Such tension-limit apparatus $L^t$ consists in an oscillating frame, $P^5$, (which should be flexible) and a tension-limit roller $P^6$ revolubly mounted therein, substantially parallel with the spindle $P^2$, and adjacent to the roll $P^1$ mounted thereon. The oscillating frame $P^5$ preferably comprises two similar slotted arms $P^7$ respectively pivoted at one end on a roll-carrying arm $P^4$, their outward motion being limited, as illustrated in Figs. 6 to 8, by stops, $P^8$; and having parallel guide slots, $P^9$, formed in them, for mounting the tension roller $P^6$ by means of relatively-small journals, $P^{10}$ formed on the ends thereof, said tension roller $P^6$ floating freely on its aforesaid journals $P^{10}$, in the slots $P^9$, save as its movements and location are determined by the stress in the paper P and the reaction thereagainst of the weight of the oscillating members, which draw it into contact with the roll $P^1$. The roll $P^1$ is set so that the paper P will unwind from its top, outwardly; and when the machine is at rest the paper normally hangs in a free loop, $P^{11}$, (Fig. 6) enveloping the tension roller $P^6$. When stress is applied to the paper P, in supplying it to the machine, the free loop $P^{11}$ is first drawn up into contact with the tension roller $P^6$, thus permitting the paper-feed mechanism to initiate its supply-motion without encountering any substantial paper-resistance; and immediately thereafter the stress in the paper tends to lift the tension limit mechanism $L^t$ toward the position shown in Fig. 8. It is obvious that the stress in the paper cannot, under any circumstances, exceed the sum of one-half the weight of the tension-limit mechanism suspended in its loop, plus the friction; that the machine will initiate the paper-supply operation with practically no paper-resistance; that as the tension-limit mechanism is lifted toward the upper limit of its stroke (the position of Fig. 8) a practically uniform, uniformly-distributed and steady tangential pull will be applied through the paper P, to the paper roll $P^1$, to overcome its vis-inertia and initiate its unrolling motion, and this without sensible retarding effect on the mechanism generally; and further, that as the paper roll $P^1$ acquires rotative motion, its resistance to the pull of the paper will decrease and the stress therein likewise, until it will no longer support the tension-limit mechanism $L^t$ and the latter will drop back to its initial position (Figs. 6 and 7); and the momentum of the roll $P^1$ will cause it to continue, for a short period, to unroll and to liberate paper, in the form of a free loop, $P^{11}$, as when the cycle was initiated.

The tension-roller $P^6$, owing to its flexible-frame support and to the fact that it always floats freely therein, save as constrained by the stress of the paper itself, will be self-adjusting in location with respect to the paper roll $P^1$ and the adjacent guide roller $P^{12}$ and will always lie in contact with the paper roll $P^1$, parallel or slightly inclined thereto, will constitute an automatically-adjusting paper-guide, and will function as such to maintain the paper-supply reliably true as to direction. This function is accomplished by automatically compensating for any defect in the parallelism of the paper roll $P^1$ and guide roller $P^{12}$ relatively to one another and to the transverse axis of the machine and for inequalities in the paper, as rolled. If such parallelism be perfect, the tension roller $P^6$ also will automatically set itself in perfect parallelism; but if, through accident, said parallelism is defective, or if the paper be unevenly strained in making up the roll $P^1$, the tension roller $P^6$ will automatically assume a direction intermediate and compensatory relatively to the departure from parallelism of the other cylindrical members and the inequalities of strain in the paper and divide the error in the paper direction and thereby preserve an even tension across the entire width of the paper, and an even distribution of stress and duty among the several grip-jaws ($P^{29}$—$P^{33}$) of the paper-feed mechanism $P^{13}$ (to be described). This compensative action of the tension limit mechanism $L^t$ is essential to the satisfactory and reliable operation of the machine because unequal feed-stress distribution among said jaws might load all the work on one pair of jaws; in which case either the paper would tear or it would slip relatively to said jaws and be deflected from its proper axial supply-direction, and it would be necessary to stop the machine and re-adjust the paper supply; as practical experience with machines lacking the tension-limit and compensating mechanism $L^t$ has abundantly demonstrated.

It will be seen that the mechanism $L^t$ embodies several highly important and necessary functions, viz: (a) It is a stress-limiting (tension limiting) mechanism and sets a positive, pre-determined limit to the maximum stress to which the paper can be subjected. (b) It is a power-equalizing apparatus relatively to the machine and equalizes the machine stresses and the rate of power consumption by preventing heavy paper-pulling stresses during the initial part of the feed motion, when the feed mechanism proper $P^{13}$, is initiating its motion and acquiring momentum; and by shifting the heavy paper-pulling stresses to a later period in the cycle of motions of said mechanism $P^{13}$, when its motion has been fully accelerated and it has begun to slow up and to lose momentum. (c) It is a stress-distributing apparatus relatively to the paper and distributes the stress equally across the entire width thereof. (d) It is an automatically-operating compensating mechanism and automatically compensates for location-defects or defects in parallelism among the elements and for strain-defects or inequalities in the initial strains in the paper incident to its being made up into the paper roll.

From the tension roll $P^6$ the paper passes over the guide roller $P^{12}$ (heretofore referred to, which guide roller $P^{12}$ is revolubly mounted) into and through the paper-cut-off mechanism G to its place of use.

*Paper feed and loaf-transfer.*—To draw in the paper supply (and also to transfer loaves of bread, as hereinafter explained), I provide the paper-feed mechanism $P^{13}$, before referred to, which is illustrated in the general views and in Figs. 6 to 18 inclusive, of Sheets 6, 7 and 8. This mechanism $P^{13}$ is driven through the agency of the paper-feed and loaf-transfer operating lever $D^{24}$ hereinbefore described, the connection being best illustrated in Figs. 3, 4 and 9.

A symmetrical, forked lever, $P^{14}$, is pivoted on the main frame F (see Fig. 4) by means of its horizontal yoke member $P^{15}$, which is conveniently made of a rod, to which the forks, $P^{16}$, are keyed, as is also an intermediately-located arm $P^{17}$, which is adjacent to the outer or power-delivery end of the operating lever $D^{24}$, and adjustably connected therewith by an adjustable link-motion apparatus $P^{18}$; the free end of the arm $P^{17}$ having a slot, $P^{19}$, in which I adjustably secure an adjustable pivot-pin $P^{20}$, on which I pivot a slotted link, $P^{21}$, having a slot $P^{22}$ in its opposite end, and a second adjustable pivot-pin $P^{23}$ adjustably secured in said slot $P^{22}$ and extending into a corresponding bearing $P^{24}$ in the power-delivery end of the operating lever $D^{24}$, and serving as a pivotal connection for the link $P^{21}$ and levers $D^{24}$ and $P^{14}$, whereby motion may be transmitted, controllably, from the lever $D^{24}$ to the paper feed mechanism $P^{13}$.

Because the operating lever $D^{24}$ is cam-actuated by the cam $D^{51}$ (Fig. 5), and oscillated about a fixed axis, its free or power-delivery end swings in an arc which is non-adjustable and practically unvarying, and because of its adjustable link connection $P^{18}$ with the lever arm $P^{17}$, the axis of the pin $P^{20}$ thereof is likewise oscillated in an arc which is practically unvarying in linear measurement (or only slightly so) because of the mathematical relations of the link motion. But because the arm $P^{17}$ is adjustable as to functional length (by shifting the pivot-pin $P^{20}$) the linearly-constant motion thereof is readily made angularly-variable, by said adjustment; inversely proportionally to the adjusted functional length of said arm $P^{17}$; and because the forks or arms $P^{16}$ of the lever $P^{14}$ are of constant functional length (being non-adjustable) it follows that a change in the amplitude of their angular movement due to varying the functional length of the lever-arm $P^{17}$, will cause a corresponding angular and linear change in the movement of the free or power-delivery ends of the forks $P^{16}$ and will correspondingly vary the stroke-length of the paper-feed mechanism $P^{13}$ and the length of the individual wrapper $P^w$ cut off at each stroke of the machine. Further, because the link $P^{21}$ is adjustable as to its functional length (by shifting the pivot-pin $P^{23}$ in the slot $P^{22}$) the angular location of the arc of movement of the lever $P^{14}$ can be shifted at will (within limits) about its axis and the location of the paper-feed motion can be thereby shifted relatively to a fixed point in the machine, specifically, relatively to the cutting-off plane of the knife. It will be seen that the combination of the adjustable link $P^{21}$ and adjustable lever arm $P^{17}$ with the operating lever $D^{24}$ constitutes, in and of itself, an adjustable limiting and positioning mechanism $L^w$, by means of which I can readily adjust the stroke of the paper feed and the cut-off and individual wrapper length to suit loaves of different sizes, by shifting the pivot-pin $P^{20}$ in the slot $P^{19}$ of the arm $P^{17}$.

The paper feed and loaf-supply mechanism, $P^{13}$, has a reciprocatory movement parallel with the working axis of the machine, on guides, shown as guide rods $P^{25}$, secured to and just above and parallel with the machine bed plate, $F^t$ (see Figs. 4, 6 and 9). Its principal element is a combined grip-frame and carrier, $P^{26}$, formed with a yoke or transverse member $P^{27}$ (transverse to the machine axis); end guide blocks $P^{28}$ integral therewith, by which it is slidably mounted on the guide rods $P^{25}$; a plurality (three) of axially, inwardly, horizontally-extending fixed grip jaws, $P^{29}$, located adjacent to its upper plane and provided with transverse teeth, $P^{30}$, on their under faces and rubber covering or grip-plates $P^{31}$, covering said teeth; and slots, $P^{32}$ located immediately beneath said jaws $P^{29}$ and extending axially through its body, for the accommodation of movable grip jaws, $P^{33}$, which are formed integral on a transverse rocking yoke $P^{34}$ located anteriorly to the carrier yoke $P^{27}$ and fixed on a transversely extending shaft $P^{35}$ which is slightly-rotatably mounted, together with said yoke $P^{34}$, in bearings in the carrier yoke $P^{27}$ or in the guide blocks $P^{28}$ thereof, (see Fig. 9); and upwardly-extending, symmetrical arms $P^{37}$ secured to the ends of said shaft $P^{35}$ extending exterior to said blocks. The movable grip jaws $P^{33}$ extend posteriorly, substantially, horizontally from the grip yoke $P^{34}$, through the slots $P^{32}$ in the carrier yoke $P^{27}$ to locations immediately beneath the fixed jaws $P^{29}$ thereon and are provided with teeth $P^{38}$, on their upper faces and staggered in position relatively to those $P^{30}$ on the fixed jaws and their opening is limited by an adjustable screw-stop $P^{53}$. A loaf-carrier plate, $P^{39}$, is firmly attached to the carrier yoke $P^{27}$ and extends horizontally anteriorly, or outwardly, above the grip yoke $P^{34}$, and terminates in an upwardly-extending trip-flange, $P^{40}$. About mid-height of the arms $P^{37}$, I pin drive-links, $P^{41}$, pin-connected at their other ends to the fork arms $P^{16}$ of the lever $P^{14}$.

Because the links $P^{41}$, which connect the mechanism $P^{13}$ with the transmission, are connected to the arms $P^{37}$ of the rock-shaft $P^{35}$, it follows that when the motion of said mechanism $P^{13}$ is initiated or reversed the said arms and shaft and the movable grip jaws $P^{33}$ attached to said shaft must rock and come in contact with an abutment before the entire organization can be traversed. When said mechanism is approaching the advanced edge of the roll-paper, the pull of said links on said arms $P^{37}$ opens said grip jaws to the limit fixed by the adjustable stop $P^{53}$. When the motion is reversed the pull of said links is changed into thrust on the arms $P^{37}$, and before the mechanism $P^{13}$ can be moved anteriorly, said arms will be rocked anteriorly and will rock the shaft $P^{35}$ and the movable jaws $P^{33}$ upwardly, into gripping contact with the paper and the fixed grip-jaws $P^{29}$; and the drag of the mechanism $P^{13}$ will cause said jaws to remain gripped until the motion is reversed.

It will be seen that the above described mechanism comprises traction elements, or those necessary to the feed traverse; guide elements; and the grip jaws and the yokes on which they are mounted; and that by suitably locating the point of attachment of the traction elements on the pivoted grip-jaw yoke, I cause the necessary traction parts and motions to cause the opening and closing of the grip-jaws without additional machinery and thus greatly simplify my machine relatively to older ones of the same character, which embody special grip-jaw-operating mechanisms, which I render wholly unnecessary by merely suitably locating a point. When the lever P¹⁴ is oscillated, as hereinbefore described, the paper feed mechanism P¹³ is reciprocated on the guide rods P²⁵ in a manner which will be more readily understood if its description be deferred until I have explained the paper cut-off mechanism.

My machine is primarily designed to wrap loaf bread in waxed paper. Early machines for similar purposes, using shears of various types to cut off the individual wrappers, proved unsatisfactory because shear action cannot be instantaneous and is therefore too slow and because the shears require frequent grinding. Some later machines experimentally used guillotine-type cut-off mechanism, which was found heavy running and wasteful of power, and unreliable because it did not hold the roll-paper securely, relatively to the feed and cut-off. To avoid such difficulties and provide reliable, light running cut-off mechanism, adapted to co-act with other members in equalizing the work nearly uniformly throughout the function-cycle and to cut off individual wrappers adjustably uniform as to size and with true edges, I have invented the movable-knife-guide, snap-cut-off mechanism G, described hereinafter in connection with the general drawings, Fig. 54 of Sheet 17, and Figs. 19 to 31 of Sheets 9 to 11 inclusive. It is bench assembled and detachably mounted on the main bed-plate F¹ of the machine, so that it can be removed and replaced as an assembling unit and is substantially symmetrical as to its parts and general arrangement relatively to the machine axis (see Fig. 1), and its characteristic features comprise: 1. A transversely located and fixed main frame G¹, which provides support and bearings for the working parts and by which it is detachably mounted, as aforesaid, on the main bed plate F¹ of the machine, adjacent to its supply (left-hand) end, beneath the loaf-conveyer B³ and approximately over the drive and main shaft D. 2. A movable paper-retaining and knife-guide frame M, the primary function of which is to serve as a paper-retaining mechanism to retain the roll paper taut while the wrappers are being cut off and also to retain the advanced edge of the roll-paper in position to be grasped by the grip-jaws of the paper-feed mechanism P¹³, and its secondary function is to guide the knife K¹ during its stroke. 3. A snap-knife mechanism, K, adapted to accomplish practically-instantaneous paper cut-off, to co-act in equalizing the work through the function-cycle, to store or accumulate in springs energy to quicken the knife-stroke, to adjustably time its release and to release the knife suitably to accomplish practically-instantaneous cut-off; to adjustably time and control the several paper-retaining functions of the knife-guide mechanism M and to provide a new and more reliable type of knife, which will not require sharpening.

The fixed transverse frame G¹ of the cut off mechanism G comprises a base-plate G² and end standards G³ secured rigidly thereto and furnishing support to and suitable bearings for the working parts. In general, the base plate G² is of Z section, with a horizontal posterior lower flange G⁴ by which it may be detachably secured on the machine bed plate F¹, and to which the standards G³ are secured, a vertical web G⁵ and an upper, horizontal, anterior flange G⁶, in which I cut a plurality (as three, Fig. 1) of axially-disposed grip-jaw slots, G⁷, designed to accommodate the grip-jaws P²⁹ and P³³ of the paper-feed mechanism P¹³ when it is advanced to grasping position relatively to the advanced edge of the roll-paper P (see Figs. 10, 11, 12, Sheet 7) and a knife-slot, G⁸, into which the cutting edge of the knife K¹ enters when the paper P is cut; and adjacent and transversely interiorly to each end standard G³ but exterior to the supply paper P, it has narrow posteriorly-extending end flanges G⁹, (Figs. 26, 27) their upper faces substantially flush with the upper Z flange G⁶, and each provided with a transverse bearing slot G¹⁰, in line with one another and adapted to serve as end bearings in which a shouldered and end-journaled transverse paper-guide roller G¹¹ may be revolubly and removably mounted by its said journals G¹²; and I provide, on the opposite side of the Z section, pivot flanges, G¹³, located exterior to the outer grip-jaw slots G⁷, adjacent to the ends of the Z section, and in said pivot flanges G¹³ I drill and tap holes for the reception of pivots G¹⁵ on which I pivot a transverse, rocking, complementary paper-supporting bridge frame G¹⁶, formed with a lower body G¹⁷ parallel with the Z section of the base plate G² and a plurality (three) of normally-upwardly extending bridge arms, G¹⁸ adapted to fit loosely and rock in the grip-jaw slots G⁷ of the upper Z-flange G⁶, with their upper surfaces normally substantially flush with its upper face and I form a knife slot G³⁰ in the bridge face of each arm G¹⁸, supplementary to the knife slots G⁸ in the Z flange G⁶, so that, at the cut off times, when the frame G¹⁶ is in its vertical position (see Figs. 23 and 25), the upper or bridge surfaces of said bridge arms $G^{18}$ will bridge and furnish paper-support across the grip slots $G^7$; and the knife slots $G^{80}$ therein will supplement the fixed knife slots $G^8$ and together therewith, will accommodate the cutting edge of the knife $K^1$ when it makes its stroke.

The body $G^{17}$ of the frame $G^{16}$ extends beyond the upper Z flange $G^6$ and the pivot flanges $G^{13}$ thereunder, and exterior thereto it has pivot arms $G^{20}$ substantially parallel and of equal length with the bridge arms $G^{18}$ but cut away on the supply side, as shown in Fig. 19, so that, when so positioned, the end surface, $G^{21}$ of each pivot arm $G^{20}$, which is substantially flush with the surface of the Z-flange $G^6$ will lie wholly in advance of the knife-slots $G^8$; and in said pivot arms $G^{20}$ I form pivot bearings, $G^{22}$, for the pivots $G^{15}$ and through which said pivots can be entered and screwed into the tapped holes in the pivot flanges $G^{13}$. One of said pivot arms $G^{20}$, preferably the "near" one, I extend to form a rocking arm, $G^{24}$, (Fig. 31) which extends across the line of traverse of one of the guide blocks $P^{20}$ of the paper feed mechanism $P^{13}$, to the end that when said paper feed mechanism advances toward its paper-grasping position, the rocking frame $G^{16}$ will be rocked by the contact of said guide block $P^{20}$ with said rocking arm $G^{24}$, from its normal, upright, grip-jaw-slot-bridging position (Figs. 12, 19, 23 and 25) to its depressed slot-clearing position (Figs. 10 and 11), and the bridge-arms $G^{18}$ will be rocked out of the grip-jaw slots $G^7$, out of the path of the grip-jaws $P^{29}$ and $P^{33}$, so that the latter can advance into said slots, to grasp the advanced edge of the roll paper, P. At other periods the rocking frame $G^{16}$ is retained in normal position against a stop $G^{25}$, by a helical spring $G^{23}$, strained between the arm of the rocking frame $G^{16}$ and the base plate $G^2$ (Fig. 19).

*The frame M.*—The movable knife-guide and paper-retaining frame M is best illustrated in the general views and in Figs. 6 and 19 to 32 inclusive. It is pivoted in bearings $G^{28}$ in the frame standards $G^3$ on a yoke member rock-shaft $M^1$, which extends through said standards and exterior to them has keyed to it symmetrical oscillating levers, $M^2$ to actuate the snap-knife mechanism K and the loaf-feed mechanism V. Power for these purposes is derived from the drive mechanism $d$, main shaft D, and directly from the bread-feed and knife-operating link $D^{27}$, the oscillating levers $M^2$ being adjustably connected therewith as is best shown in Figs. 5, 6, 19 to 31, 54 and 49.

The mode of actuating the link $D^{27}$ has been described. As illustrated in Fig. 49, it is linearly adjustable, being made in two parts, the lower or power-receiving part $D^{227}$ being provided with slots $D^{270}$, through which it may be adjustably bolted to its upper part, $D^{271}$ whose upper end is provided with a pivoting head, $D^{272}$, of considerable length and having duplicate pivot bearings, $D^{273}$, by which it is pivoted on an oscillating adjuster, $D^{274}$, being suitably engaged therewith by a rod $D^{275}$. The oscillating adjuster $D^{274}$ comprises a yoke or C-shaped frame with parallel arms $D^{276}$, in the ends of which are bearings $D^{277}$, for pivoting the adjuster $D^{274}$ on a shaft $T^{30}$, which is also an element of the tuck mechanism T, to be hereinafter described; and it has suitable bearings in said arms $D^{276}$, adjacent to their origin, for said pivot rod $D^{275}$, and on its far arm $D^{276}$ it has a flange extension, $D^{278}$, and in said flange an adjustment slot, $D^{279}$, radial from the axis of the shaft $T^{30}$. As shown in Figs. 54, 6, and 19, a link $D^{27}$, of fixed functional length, is adjustably pivoted on a pivot pin $D^{280}$ adjustable in the slot $D^{279}$, and at the other on a non-adjustable pin $M^5$ (Figs. 6 and 19) in the lever $M^2$, interior to its fulcrum, directly conveys power thereto. This power-supplying connection has three adjustments, of which the primary or cycle-period adjustment has been fully described. Two other adjustments are accomplished: one (the angular adjustment of the arc of motion of the lever $M^2$ and the location of the motions of the parts actuated thereby) by means of the extensible construction of the link $D^{27}$, and the other (the lengthening or shortening of said motions) by adjusting the functional length of the adjuster $D^{274}$ considered as a lever movable about the axis of the shaft $T^{30}$, by shifting the pivot pin $D^{280}$ in the slot $D^{279}$.

To make the location adjustment, the members $D^{227}$ and $D^{271}$ of the link $D^{27}$ are extended or retracted, so as to change its functional length and when adjusted it is securely bolted up by means of bolts $D^{281}$ (Fig. 3), in the slots $D^{270}$; which adjustment angularly adjusts the arcs of motion of the adjuster $D^{274}$ and levers $M^2$ and locates all the motions dependent thereon; and to make the stroke length adjustment, the functional lever-length of the adjuster $D^{274}$ is adjusted, by shifting the pin $D^{280}$ in the slot $D^{279}$; which adjustment changes the amplitude of the arcs of movement of the levers $M^2$ and the stroke-length of all the members dependent thereon. It will be seen that the adjuster $D^{274}$ and extensible link $D^{27}$, together with the other members combined therewith, constitute a limit, positioning and adjusting mechanism, $L^m$, which limits and by which I can manually adjust the functions of the movable knife-guide frame M, snap-knife mechanism K, and loaf-feed mechanism V.

The knife-guiding and paper-retaining frame proper, $M^4$ (Figs. 19 to 25) is hollow and built up of a functional body M⁵, and a face plate M⁶. All the primary guiding surfaces and all the bosses, bearings, locating and setting surfaces, spring abutments, etc., are formed on the functional body M⁵ and the face plate is a mere cover, save in two particulars. The end and highest-extending members of the frame M⁴ are channel shapes, M⁷, interiorly in which I form knife guiding channels M⁸ and on the posterior face whereof I provide toggle bosses M⁹ containing toggle-pin bearings, the uses of which will be explained. Its central portion, for substantially two-thirds of its length, is a knife-box, M¹¹, formed with upper meeting edge flanges M¹², which separate the main walls of the functional body M⁵ and face plate M⁶; and from the upper corners of said knife box, mounting arms M¹³ extend posteriorly and contain mounting bearings, M¹⁴, by which the frame M⁴ is rockably mounted on the rock-shaft M¹. The lower edge of the face plate M⁶ is provided with three slots M¹⁵ for admitting the grip jaws P²⁹ and P³⁰ of the paper feed mechanism P¹¹, and the anterior lower edge of the functional body contains recesses M¹⁶ for said grip jaws. The walls of the knife box, M¹¹, are joined to the flanges of the end channel shapes M⁷ by low wall-extensions M¹⁷, without meeting edge flanges, so that the knife space at their locations is open at top and bottom, as it is also in the channel-guides M⁸, being closed at the top only in the knife box M¹¹, by its meeting edge flanges M¹², and everywhere open at the bottom.

The construction of the lower faces of the frame M⁴ where I locate the paper-retaining function, is best illustrated in Fig. 28, which shows the face plate M⁶ as terminating in a heavy, bottom, interrupted, retainer flange M¹⁷ (cut for the grip-jaw slots M¹⁵), provided with rubber retainer plates M¹⁸; and the functional body M⁵ likewise terminates in heavy retainer flanges M¹⁹ provided with a rubber retainer plate M²⁰. I form long transverse teeth, M²¹, in said retainer flanges M¹⁷ and M¹⁹ and corresponding teeth staggered therewith, M²², in the upper face of the upper Z-flange G⁶ of the fixed frame G¹.

In order to securely and at the same time detachably secure the rubber retainer plates M¹⁸ and M²⁰ on the flanges M¹⁷ and M¹⁹, I provide dove-tail channels, M²³, in said flanges and exterior to the teeth M²¹ and M²²; and longitudinal rods, M²⁴, slightly less in diameter than the width of said dove-tail channels M²³, but greater than said width diminished by twice the thickness of the rubber of the retainer plates M¹⁸ or M²⁰; and having laid the rubber (of proper width) over the teeth M²¹, M²², I snap the rods M²⁴ and a rubber envelop M²⁵ therefor into the dove-tail channels M²³, and owing to their formation, the rubber is rigidly held therein by said rods. This construction provides rubber covering and retainer plates easily applicable and removable, and at the same time reliable in use. At the ends of the outer retainer flanges M¹⁹ of the functional body M⁵, I provide posteriorly extending flanges M²⁶ and guide slots M²⁷ therein (Figs. 23, 24, 19 and 25), in which I revolubly mount a heavy, shouldered, paper-confining roller M²⁸ by its relatively-small end journals M²⁹.

I suspend the knife-guide and paper-retaining frame M⁴ by strong helical end springs, M³⁰ (Fig. 19) attached to its body at one end and at the other to extension arms, G³⁰, which springs normally draw said frame M⁴ up into the position shown in Figs. 19, etc., against end toggles, M⁴⁰, two in number, for which I prepare by extending the fixed-frame end-standards G³ (Figs. 19 and 26) and forming thereon toggle-abutment heads, G⁴⁰ with vertical, transverse, downwardly-opening toggle-abutment slots G⁴¹ therein, located over toggle-bearing pins M⁴¹, fixed in the bearings of the toggle bosses M⁹ on the ends of the frame M⁴ already described.

Each toggle M⁴⁰ consists in a lower, forked, H-shaped, double-slotted link M⁴² having upper and lower slots, M⁴⁴ and M⁴⁵, respectively, and a long, interior drive-and-pressure arm M⁴³, which extends from the lower limit of the toggle considerably above its transverse axis of motion and by which it is controlled and operated, and in the drive side of which I revolubly mount a drive roller M⁶⁰ on a pin M⁵³; and an upper, H-shaped, single-slotted link M⁴⁶ having an upper slot M⁵⁰. In the links M⁴² and M⁴⁶, I form transverse-axial pin bearings and parallel thereto, in the active ends, I form bearing slots.

The mode of assembling and operating the toggles M⁴⁰, to press down and control the motions of the knife-guide and paper-retaining frame M⁴ is best illustrated in Figs. 19 to 27 inclusive. Their upper, fixed abutments are manually-adjustable, each being on an adjustable alinement pin M⁵⁴ provided with a rectangular-prismatic, central, guiding shank M⁵⁵, by which it is slidably mounted in the toggle-adjustment slot G⁴¹ of a toggle-abutment head G⁴⁰ of a fixed-frame standard G³, with its cylindrical ends projecting, and it is adjustably positioned therein by an adjusting abutment screw M⁵⁶, locked in adjusted position by a lock-nut, Figs. 26 and 27.

The drive or H-links M⁴² are located with their drive arms M⁴³ interior to the fixed-frame heads G⁴⁰, and between them and the knife-guide-frame end channel-sections M⁷; and the h-links M⁴⁶ are pivoted on the H-links M⁴² by through-pins M⁵⁸, the pivot ends or stems of the h-links being enveloped in the upper slots $M^{44}$ of the h-links. The slots $M^{50}$ of the h-links and the bearing slots therein respectively envelop the fixed-frame-heads $G^{40}$ and the abutment pins $M^{54}$; and the lower slots $M^{45}$ of the h-link and the bearing-slots in the pressure or active ends thereof respectively envelop the toggle bosses $M^9$ and the pins $M^{41}$ therein of the frame $M^4$. To prevent the toggles from rattling and being shaken out of desired positions, I fix on each drive-arm $M^{43}$ of the h-link a plate spring, $M^{59}$, the free end of which presses against the adjacent active end of the h-link and creates internal friction in the toggle, to the aforesaid end.

The suspending springs $M^{30}$ draw the knife-guide and paper-retaining frame $M^4$ upwardly against the reaction of the toggles $M^{40}$, which limit its upward stroke. Fig. 26 shows the paper-retaining and maximum-pressure position of said frame $M^4$, in which position the axes of all the toggle-pins are in one plane, and the limit of possible pressure is found in the elasticity of the strained members. Practically, the pressure is limited to the reaction of the rubber covering-plates $M^{18}$ and $M^{20}$.

It is desirable that the paper P be firmly held on both sides of the knife $K^2$ at the instant it cuts off a wrapper $P^w$, so that the edges thereof shall always be smooth; that immediately after a wrapper is cut off, its posterior edge be released; and that subsequently the anterior edge of the roll paper P, be released. Therefore I time the paper-retaining and release functions of frame $M^4$ by the motions of the knife $K^1$. To that end I fix on the ends of the knife stock $K^3$ posteriorly-extending, frame-operating cams $K^{17}$, which are each provided with a lower upright timing end $K^{174}$, an inclined paper-retaining and wrapper-releasing face $K^{175}$, an upright upper timing face $K^{176}$ and an inclined full-release face $K^{177}$. When the knife $K^1$ is in its highest position the drive-rollers $M^{60}$ of the toggle drive-arms $K^{43}$ lie in the lower timing ends $K^{174}$ of the cams $K^{17}$ (Fig. 22), the toggle axis is anterior to and at its maximum-distance from the toggle pressure plane, the frame $M^4$ is in its highest position and its rubber plates $M^{18}$ and $M^{20}$ clear both the roll-paper P and the wrapper $P^w$. These conditions remain unchanged during the beginning of the downward or cutting stroke of the knife $K^2$, until its paper-retaining cam faces $K^{175}$ contact with the drive rollers $M^{60}$ on the drive arms $M^{43}$ and thereby swing the toggles' axis toward their pressure plane. At the instant the knife $K^1$ is cutting the paper P (Fig. 26) the axes of all the toggle pins lie in their pressure plane and the toggles hold the frame $M^4$ in its lowest position so that its retaining flanges $M^{17}$ and $M^{19}$ and rubber plates $M^{18}$ and $M^{20}$ retain the paper firmly on both sides of the knife. After the knife $K^1$ has thus cut off a wrapper $P^w$, it continues its downward cutting motion to the position shown in Figs. 21 and 28, and while so moving the posterior, upper portions of its paper-retaining cam-faces $K^{175}$ act as wrapper-release faces, swing the toggles slightly posterior to the pressure plane and allow its suspending springs $M^{30}$ to slightly retract the toggles and rock the frame $M^4$ so slightly that its anterior retaining flange $M^{17}$ is raised from and releases the posterior edge of the newly-cut wrapper $P^w$, while its posterior flange $M^{19}$ still retains the advanced edge of the roll-paper P.

The positions of the frame $M^4$ and toggles remain unchanged during the fore part of the lift or retraction of the knife $K^1$, while its upper timing faces $K^{176}$ are passing the rollers $M^{60}$; and when its full-release faces $M^{177}$ coact with the rollers $M^{60}$ the toggles are swung from their posterior semi-release position (Figs. 21–23), through their pressure plane (Fig. 26) to their anterior full-release position (Figs. 19, 20, 22, 24, 25, 10, 11 and 12). The full release position of the toggle axis is about twice as far anterior to the pressure plane of the toggles as its semi-release position is posterior thereto; and in moving to full-release position the toggles permit the springs $M^{30}$ to rock the frame $M^4$ to full-release position and release the advanced edge of the roll-paper P.

*Snap-knife mechanism.*—In order to provide a knife $K^1$ which will not need sharpening and will cut the paper smoothly practically instantaneously, I make it of very thin plate steel and serrate its cutting edges with saw-teeth, $K^2$, the points of which will initiate the paper-cut-off with trifling pressure and cause it to progress smoothly; whereas a straight-edged knife would bear on the paper its entire width and therefore encounter a very material resistance, which would tend to halt the knife-stroke. I support the knife $K^1$ in a stock, $K^3$ (Figs. 19 to 28) formed with a horizontal body $K^4$ and a lower rabbet $K^5$ in the anterior face thereof, in which the knife $K^1$ is clamped and uniformly supported by bolting on a face plate $K^6$; the serrated, cutting knife edge projecting below the stock $K^3$ (Figs. 21, 23 and 28) save at the ends (Figs. 19 and 31) where I extend the stock below the knife edge, to form guard posts, $K^7$, which preserve the knife from injury in certain cases. Near the ends of the body $K^4$, I provide upwardly-extending guide arms $K^8$ (Figs. 27, 20, etc.) with parallel guides $K^9$ on the faces thereof, by which the stock is guided in the channel guides $M^8$; buffer bosses, $K^{10}$, which extend over the channel shapes $M^7$ and rubber buffers $K^{11}$ set and secured therein by bolts, to reduce shock when the knife falls; posteriorly extending lifting arms $K^{13}$ with pin bearings $K^{14}$ therein, by which I pivotally attach links, $K^{15}$ for lifting the knife stock; and cam bodies $K^{17}$ adjustably bolted thereto at about their mid-height. Energy-storing helical springs, $K^{16}$ are strained between the buffer bosses $K^{10}$ and extension arms $G^{30}$. I apply power to lift the knife-stock $K^3$ by means of gearings, $K^{50}$, which connect the lifting links $K^{15}$ and the levers $M^2$ (Figs. 20 to 22, and 29 to 31 inclusive) each of which comprises a one-toothed driving wheel-segment $K^{51}$, adjustably positioned on the rock-shaft $M^1$ and actuated by the levers $M^2$ and a similar driven wheel segment $K^{51}$ keyed or pinned to a second rock shaft $K^{29}$, rockably mounted in the fixed frame-standards $G^5$.

In order to position the driving segments $K^{51}$, both angularly and linearly, I join the posterior ends of the levers $M^2$ by a transverse yoke bar $M^{70}$ and form thereon anteriorly-extending positioning flanges $M^{71}$. Each driving segment $K^{51}$ is revolubly mounted on the rod $M^1$ and has a slotted setting arm, $K^{52}$ containing a slot which fits a positioning flange $M^{71}$ and is pinched thereto by a bolt $K^{51}$. The single driving tooth $K^{55}$ swings through the plane passing through the axes of the rock shafts $M^1$ and $K^{29}$, and at certain cycle-periods engages an oppositely-located driven tooth $K^{52}$ on the driven segment $K^5$, an arm of which $K^{53}$ extends toward and is connected with the knife stock $K^3$ by the lifting link $K^{15}$ and suitable pins. When the levers $M^2$ oscillate clockwise the driving teeth $K^{55}$ engage the driven teeth $K^{52}$ and rock them and the rock shaft $K^{29}$ and arms $K^{53}$ and lift the links $K^{15}$ and knife stock $K^3$ (Figs. 22 and 25) to its highest position, where it engages a lock-and-release mechanism $K^{60}$ (Figs. 23 to 25, 30 and 31) which locks said members with the knife very nearly in highest position and so retains it during somewhat more than half the function-cycle and at the desired period thereof automatically releases and permits the knife to fall and sever a wrapper $P^w$ from the roll of paper P.

The lock and release mechanism $K^{60}$ comprises three principal members, all in tooth-registering position relatively to one another, viz: a lock arm $K^{61}$ keyed on the driven rock-shaft $K^{29}$, a rocking catch $K^{71}$, slightly revoluble on the rock-shaft $M^1$, and a lock-and-release arm $K^{81}$ angularly, adjustably fixed thereon.

The lock arm $K^{61}$ fixed on the rock-shaft $K^{29}$, extends outwardly and upwardly from and nearly perpendicular to the plane passing through the axis of said shaft and that $M^1$, which it approaches when the knife falls and recedes from when it is raised. It contains a parallel-jawed transverse adjustment slot, $K^{62}$, in which a transversely extending wedge-shaped tooth $K^{63}$ is adjustably mounted by means of a prismatic shank $K^{64}$ which fits said slot, a discoid shoulder $K^{65}$ and a pinch nut, $K^{67}$ running on the threaded end $K^{66}$ of said shank. When the tooth $K^{63}$ is properly adjusted it is secured by pinching the arm $K^{61}$ between the discoid shoulder $K^{65}$ and the nut $K^{67}$, and stayed by radial screws $K^{68}$.

The rocking catch $K^{71}$ extends radially from the shaft $M^1$ to somewhat overlap the tooth $K^{63}$ whatever the position thereof may be and is pressed thereagainst by a spring $K^{70}$. On its upper side it has a plate-stop $K^{72}$, the radial face of which is somewhat shorter than the catch-body, and the peripheral end of which forms a stop-shoulder $K^{73}$ with the face of the catch body. When the knife is to any extent lowered, the radial face of the plate $K^{72}$ slides on the primary tooth $K^{63}$; and when the knife is in its highest position (Fig. 24) the end stop $K^{73}$ clears with good clearance the primary tooth $K^{63}$; against which at such times, the extension of the catch $K^{71}$ bears and prevents it from being lifted by the spring $K^{70}$, entirely above said tooth $K^{63}$. A slight downward movement of the knife brings the tooth $K^{63}$ and the stop-shoulder $K^{73}$ into engagement (Fig. 24) so that the knife is prevented from further descent until released.

The stop-and-release arm $K^{81}$ is Y-shaped, movably mounted and adjustable on the shaft $M^1$ by its stem, and has a peripheral adjusting slot $K^{80}$ adapted to fit a positioning flange $M^{71}$ on the yoke bar $M^{70}$ and to be pinched in adjusted position thereto by a bolt $K^{85}$. It has on its under side a plate-stop $K^{82}$ whose radial face is shorter than that, $K^{72}$, of the catch $K^{71}$, and whose peripheral end-stop $K^{83}$ is slightly radially interior to the like member of $K^{73}$ of catch $K^{71}$; and it is functionally positioned relatively thereto by an adjustable tripping head, $K^{84}$, which is screw-adjustable in and projects from one of the related members, preferably the stop-and-release arm $K^{81}$.

The operation of the stop-and-release mechanism $K^{60}$ is as follows: Normally the catch-spring $K^{70}$ presses the catch $K^{71}$ against the lock-tooth $K^{63}$. When the knife is sensibly below its highest position (and the active ends of the levers $M^2$ above their lowest position) the catch-plate $K^{72}$ contacts with and (as the levers $M^2$ and knife move) slides on the lock-tooth $K^{63}$. When the levers $M^2$ descend to their lowest and lift the knife to its highest position, the catch shoulder $K^{73}$ clears (with good clearance), and the radially exterior catch face bears against the lock-tooth $K^{63}$. When the levers $M^2$ reverse their motion and the knife descends slightly, the tooth $K^{63}$ is brought into contact with and stopped, and the knife is retained in elevated position by, the catch shoulder $K^{73}$; and further upward motion of the levers $M^2$ does not alter the above relations until said levers approach very nearly their highest and the oppositely moving stop-and-release arm $K^{81}$ approaches very nearly its lowest position, at which time its tripping head $K^{84}$ comes in contact with the catch, $K^{71}$, and tends to move it out of engagement with the tooth $K^{63}$; and, because the plate $K^{82}$ of the release arm $K^{81}$ is shorter than the like catch plate $K^{72}$, its stop shoulder $K^{83}$ clears the tooth $K^{63}$ and enters its arc of traverse, ready to engage therewith and sustain the knife when the tripping head $K^{84}$ extrudes the catch from engagement.

Slightly before, or substantially just as the levers $M^2$ complete their upward, and the release arm $K^{81}$ its downward motion, the tripping head $K^{84}$ extrudes the catch $K^{71}$ and because its stop plate $K^{72}$ is longer than the like plate $K^{82}$ of the release arm $K^{81}$, the knife descends very slightly and is (until released) sustained by the release arm by the engagement of the shoulder $K^{83}$ thereof with the tooth $K^{63}$; and its stop shoulder $K^{73}$ is exterior to the inner edge thereof, too far out radially to engage therewith. When the motion of the levers $M^2$ is reversed and they begin to descend and the release arm $K^{81}$ to ascend, its stop-shoulder $K^{83}$ is circumferentially withdrawn from supporting engagement with the tooth $K^{63}$ and as the stop shoulder $K^{73}$ of the catch plate $K^{72}$ is longer than the like plate $K^{82}$ the spring $K^{70}$ cannot bring it into engagement with the tooth $K^{63}$ and therefore the knife is snapped down and cuts off a wrapper from the roll paper P. The tooth $K^{63}$ at such times rides on the radial face of the catch plate $K^{72}$ and clears the like plate $K^{82}$ of the release arm $K^{81}$, which is rapidly receding, Fig. 23.

The reader will observe that the grip-jaw openings $M^{15}$ and $M^{16}$ in the frame $M^4$ and those $G^7$ in the frame bed plate flange $G^6$ enable me to rest the advanced edge of the roll-paper P, after a wrapper has been cut off and used, and to advance my grip-jaws $P^{29}$, $P^{33}$, far enough to grip said paper in its said position of rest, without moving it toward the grip jaws and without auxiliary paper-feed mechanism for such a motion as has been heretofore considered necessary and that said openings render such auxiliary feed mechanism unnecessary. And further, the rocking bridge frame $G^{16}$ and its bridge arms $G^{18}$ and the knife-slots $G^{80}$ therein, enable me to open the said grip jaw slots $G^7$ when the grip jaws are advanced and to bridge the openings $G^7$ and uniformly support the paper P while a wrapper $P^w$ is being cut.

*Loaf supply.*—I will now describe the mode of supplying loaves to the machine, which is illustrated in the general views and in Figs. 6 and 9 to 18 inclusive. As best shown in Figs. 4 and 6 on the sheets of like numbers, I provide upper frame sections $F^2$ and $F^{20}$ above and secured to the bed plate $F^1$, and bearings in that $F^{20}$ for the power shaft $B^1$, and in that $F^2$ for the idler shaft $B^2$, of an inclined endless belt conveyer $B^3$, which extends from the supply end anteriorly and downwardly and is continuously driven by a belt $B^4$ connecting a pulley $B^5$ on the conveyer power shaft $B^1$ with the pulley $D^{30}$ on the main shaft D (see Fig. 5) already described as a transmission element.

On the upper frame $F^2$, I secure a loaf-chute, $B^6$, connected with and adapted to be supplied by the conveyer $B^3$, and which is in form substantially a quarter-torus, made of metal, with open or perforated walls and of cross section suitable for the passage of loaves with their long axes transverse. Its ends are open save that the lower is provided with a latch $B^7$ about one-quarter as wide as the chute $B^6$, merely wide enough to safely retain the loaves, and formed with a curved arm $B^8$, substantially concentric with the convex or outer chute wall, and by which it is hinged thereto substantially at mid-height thereof; an inwardly-extending, lower retainer or catch, $B^9$, which normally hangs under the open lower end of the chute and retains the loaves therein and which terminates in a posterior trigger-flange $B^{10}$, by which it may be tripped to permit egress of loaves; and a long easy plate spring $B^{11}$, preferably made in two or more sections, riveted to the inside of the curved arm $B^8$ of the latch $B^7$ and extending normally-substantially concentric with and interior to the convex wall of the chute and terminating posterior thereto in an outwardly curved guide or safety flange $B^{12}$, the object of which is to prevent the spring $B^{11}$ from digging into or scratching, or catching loaves as they pass through the chute. A helical spring $B^{13}$ connecting the latch $B^7$ and a chute wall (or other rigid member) normally retains the latch closed in loaf-retaining position.

The machine must handle loaves of different sizes and the supply loaves must descend through the chute with their long axes substantially transverse and without danger of rolling or being materially deflected or turned out of their desired direction. To insure this, I provide means for automatically varying the width or radial dimension of the loaf-passage through the chute $B^6$, the preferred means constituting practically an elastically-adjustable inner chute-wall section, $B^{14}$, preferably in the form of a long and easy plate spring, riveted to the inside of the inner chute wall at substantially its mid height, and provided with a lower substantially semi-cylindrical hooked end $B^{15}$, exterior to, enveloping and adapted to catch on the lower edge of said wall; said spring or elastically-adjustable chute-wall section $B^{14}$ extending from its point of attachment to the chute wall tagentially and curvilinearly; its location, when no loaf is in the chute, being determined by its elasticity and the engagement of its hooked end, $B^{15}$, with the lower, inner chute wall, Fig. 6.

When loaves are passing through the chute said elastically-adjustable wall confines and regulates their passage by pressing lightly against them and holding flat sides of them in contact with the inwardly-concave exterior chute wall, and thereby prevents them from rolling or getting out of line in the chute. To insure safe transit of loaves from the belt conveyer $B^3$ into the chute $B^6$, I provide bridge strips, $B^{16}$, which are practically sectional extensions of the inner chute wall overlapping the conveyer termination, said bridge strips being of less thickness than and exterior to the belt conveyer, fixed on and dieing into the said inner chute wall at its upper end, bridging the gap between it and the conveyer and extending exterior thereto, and fitting loosely on the idler end-roller on the idler shaft $B^2$ of said conveyer. Loaves are suitably fed onto the belt conveyer $B^3$, laid on their side, with their long axes transverse and their flat bottoms as nearly as may be perpendicular thereto and their spheroidal tops anterior, as illustrated in Figs. 4 and 6.

The conveyer $B^3$ drives the loaves forward into and fills the chute $B^6$, the loaves being retained therein by the retainer $B^9$ of the latch $B^7$ save when the paper feed and loaf-transfer mechanism $P^{13}$ is near the outward limit of its stroke. The trigger flange $B^{10}$ of the latch $B^7$ and the trip flange $P^{40}$ of the loaf plate $P^{39}$ of the mechanism $P^{13}$ are located at substantially the same elevation (bounded by the same horizontal planes) so that when the carrier $P^{13}$ makes its outward stroke its trip flange $P^{40}$ comes in contact with the trigger flange $B^{10}$ of the latch $B^7$ and swings it outwardly (see Fig. 4) so that a loaf can descend, by gravity, from the chute $B^6$ onto and be retained on the loaf plate $P^{39}$. At this instant the long plate spring $B^{11}$ on the latch $B^7$ is pressed inwardly, by the outwardly-swinging motion of the latch, against the loaves in the upper part of the chute with just sufficient pressure to retain them, by friction, from descending and retain, also, the loaves on the conveyer belt $B^3$ during its constant movement; and the plate spring $B^{14}$ attached to the inner chute wall forms an elastically-adjustable lower inner wall for the chute $B^6$, contracting the radial dimension of the lower part of the loaf passage so that loaves cannot roll or turn therein out of their proper position of descent.

When the paper feed mechanism $P^{13}$ begins and makes its inward or return stroke (to the position of Fig. 6), the retreat of its trip flange $P^{40}$ is closely followed by the trigger flange $B^{10}$ of the latch $B^7$, which is held firmly in contact therewith by the spring $B^{13}$, so that the latch, immediately following upon the inward movement of the carrier $P^{13}$ and loaf plate $P^9$, follows and replaces the latter as the closing means for the lower open chute-end and, by its retainer $B^9$, retains the loaves therein until it is again extruded and replaced as the chute-closing means, by the loaf-plate $P^{39}$. The loaf $b$ which has descended from the chute $B^6$ into the loaf plate $P^{39}$ lies upside-down and transversely thereon (Figs. 4, 6, 10, 11, 16 and 18) with a side adjacent to the trip flange $P^{40}$ thereof; and when the feed mechanism $P^{13}$ begins its inward stroke the vis-inertia of the loaf tends to retain it in this position, an additional retaining force being formed in the friction of the ends of the loaf against duplicate vertical, inwardly-extending guide and vise-opening plates, $B^{20}$ (Figs. 4, 16 and 18) which are hinged on vertical axes at their exterior ends on the axial walls, $B^{18}$ of the chute, normally drawn inwardly (or pressed against loaf ends) by a transverse helical spring $B^{21}$ (Fig. 16) and provided with upwardly-extending vise-opening fingers $B^{22}$, Fig. 16, at their inner ends. When the feed-mechanism $P^{13}$ makes its inward stroke, with a loaf $b$ on the loaf plate $B^{39}$, the loaf ends slide between and press against the plates $B^{20}$ and cause them to open and press their fingers $B^{22}$ against axial members of a loaf-positioning and grasping or vise mechanism V, and open its jaws so that the loaf $b$ can freely enter the same.

*Vise or loaf-positioning and grasping and vertical feed mechanism.*—This is best illustrated in the general drawings and Figs. 6, 16, 18 (Sheet 8); 32, 36, 38 (Sheet 2) and 33-35, 39-41 (Sheet 12). Its working axis is vertical and (because it is directly above the wrapping mechanism $w$ and chuck C) may be considered the vertical axis of the machine. The functions are to correctly position and hold the loaf $b$ and to aid in positioning the individual wrapper $P^w$ therefor relatively to one another, and to the chuck C and the subsequent wrapping operations and the wrapping mechanism $w$, to feed the loaf $b$ thereto and while so doing, in its downward traverse, to accomplish the first and second wraps of the wrapper about the loaf. It is actuated by the levers $M^2$, the inner ends of which are symmetrically linked to it by links $M^v$. Its vertical axis coincides with that of a loaf-way $F^a$ in the bed plate $F^1$ and it is vertically movable, having fixed to it guide rods $V^1$, which slide in guides, in guide blocks $F^5$, symmetrically located on the upper frame $F^2$ above and slightly interior to the far and near edges of the loaf way $F^3$. Its main frame or vise-body $V^2$ is rigid, carefully adapted in shape to its functions; U-shaped when viewed vertically; H-shaped when viewed axially; E-shaped when viewed transversely; and consists in a transverse yoke rod $V^3$ and right-and-left end E-frames fixed thereon, in each of which frames the stem or back of the E is a lower, horizontal arm $V^4$, the middle bar is the guide rod $V^1$, the top bar is a vertically-and-posteriorly extending L-shaped arm $V^5$, with a transverse end-socket for attaching the E-shaped frame to the transverse rod $V^3$ and the bottom bar is a vertically and anteriorly extending L-shaped arm $V^6$ with a transverse pin-bearing formed in an outwardly, transversely extending end, pin-boss $V^7$, for the reception of a pivot-pin $V^8$, by which the vise body is symmetrically linked, by the links $M^v$, to the levers $M^2$, which actuate it.

The vise jaws $V^{10}$ are interiorly slidably mounted on the transverse rod $V^3$ exterior to a central limit adjustment block $V^{11}$ pinned thereon, and are connected with said block $V^{11}$ by two tension springs $V^{12}$, each connected at one end to said block, at the other to a vise-jaw, and which retract the vise jaws into contact with said blocks $V^{11}$, when they are not extended by the opening plates $B^{21}$ or a loaf $b$. Different bakeries produce loaves of different lengths. By using, when assembling, adjustment blocks $V^{11}$ of different lengths, I can produce machines of differing vise-opening, individually adapted to wrap the size of loaf baked by the user of such a machine. Each vise-jaw $V^{10}$ comprises an upwardly-opening U-frame, $V^{13}$, (Figs. 6, 16, 32 and 33) the back of which is in a plane parallel with and lower than that of the stems or backs $V^3$ of the E-frames and which is transversely-slidably mounted in the vise body by its two arms; the anterior arm $V^{17}$ by means of a slide-rod $V^{14}$ fixed therein and extending transversely-outwardly through the bearing in the anterior arm $V^6$ of the adjacent E-frame; and the posterior arm $V^{15}$ (by means of a bearing formed in it) on the transverse rod $V^3$. A jaw-cheek, $V^{18}$, is fixed on the outer face of each end U-frame $V^{13}$, and is also U-shaped in plan and comprises a rectangular, downwardly-axially extending plate $V^{18}$ with discoid, transversely-outwardly-extending end sector plates $V^{19}$ having upper circular edges struck from the axis of a hinge $V^{21}$ (which is at the lower edges of the cheek plates $V^{18}$),—radial, upwardly inclined lower edges and radially-projecting end stops $V^{20}$; and hinged by said hinge to the lower edge of the cheek plate $V^{18}$, an elastically-acting wrapper stretcher $V^{22}$, also U-shaped in plan, formed of a bent plate and hinged as aforesaid at the lower edge of its back $V^{23}$, which is a plane substantially radial from said hinge axis; having U-shaped, double-fold stretching end arms $V^{24}$ adapted to envelop the sectors $V^{19}$, the plate being bent at the functioning or wrapper-contact edges $V^{25}$, which are thus formed semi-cylindrical without added cost and which when said stretcher $V^{22}$ is extended (Fig. 33) extend transversely-horizontally somewhat exterior to and lower than the vise cheeks and slightly higher than the (inverted) top of the loaf $b$; and having stops, $V^{26}$ adapted to contact with the sector stops $V^{20}$ and limit the outward and downward motion of said stretcher.

Springs, $V^{27}$, normally extend the stretchers $V^{22}$. I provide a horizontal, axial bifurcated loaf-positioning plate $F^6$ (which might be made of one or of two plates) made fast to the frame $F^2$ by a transverse yoke plate $F^7$ and terminating posterior to the vise by a downwardly turned loaf-arresting flange $F^8$ (which limits the inward feed of the loaf) and extending nearly to the chute $B^6$, and there terminating in an upward bend (so that it cannot catch or scratch the loaves) and clearing them (see Fig. 6) just sufficiently so that if a loaf should start to roll, said plate $F^6$ will so limit its rolling motion that its posterior upper edge will be lower than the backs of the vise-jaw frames $V^{13}$ and the feed of the loaf into the vise V will not be interrupted.

The entire vise is bench assembled and removably mounted in the machine as a unit. It can be adapted to different loaf lengths by the use, when assembling, of adjustment blocks $V^{11}$ of corresponding lengths. It is desirable in good wrapping that the first wrap of the wrapper $P^w$ about the loaf $b$ be parallel with its length and that the lap of the wrapper be substantially central on the loaf. In order to accomplish this I provide auxiliary wrapper-positioning mechanism $p$, operably connected with an adjustable member which moves with the vise and is suitably located relatively to its vertical axis. For convenience, the said operating member is formed on one of the links $M^v$ which connect the inner ends of the levers $M^2$ with the vise V (the near link, Figs. 6, 11 to 15) and consists in an axially extending bar $p^1$ and adjustment slot $p^2$ therein, and a transverse roller $p^3$ revolubly mounted on an adjusting stem $p^4$, adjustable in said slot.

To limit the paper supply stroke of the paper feed mechanism $P^{13}$, I locate, in the line of traverse of the free end of one of the grip-moving arms $P^{37}$ of said feed mechanism (the near one) an adjustable stroke-limit bolt $p^5$ manually adjustable in a tapped hole in the upper frame $F^2$, fixed in adjusted position by a lock-nut and adapted to be adjusted to limit the stroke of the mechanism $P^{13}$ as may be desired.

The auxiliary wrapper-positioning mechanism $p$ proper, consists in a bell-crank wrapper-release-lever $p^7$, Figs. 1, 13, 14 and 16, pivoted on the upper frame $F^2$, provided with a posteriorly-upwardly extending tripping arm $p^8$ which extends across the path of the operating roller $p^3$ on the link $M^v$, so as to be operable thereby and a lower pressing arm $p^9$ with a strong spring $p^{10}$ adapted to press the lower arm $p^9$ against a member of the paper feed mechanism $P^{13}$, specifically against the yoke $P^{27}$, Fig. 1, to occasion a slight anterior motion of said mechanism $P^{13}$ and thereby release the wrapper.

The operation of the mechanism $p$ is as follows: The paper-feed mechanism $P^{13}$ draws in the roll paper for the wrapper and its feed stroke is primarily (as before described) limited at the contact of the free end of its arm $P^{37}$ (then anteriorly inclined) with the adjusted stroke limit bolt $p^5$. The feed mechanism $P^{13}$ stops at this limit without changing the angular position of said arm $P^{37}$ and movable grip jaws $P^{23}$ (which change would release the anterior edge of the wrapper $P^w$), because of the before described adjustment of its driving and limit mechanisms and moreover, because the frictional resistance of the mechanism $P^{13}$ is proper (and if desired adjustable) to that end; and the paper feed $P^{13}$ lies in its primary position of rest firmly grasping in its jaw the anterior edge of wrapper $P^w$, whose posterior edge is very soon released by the vibration of the knife guide and paper retainer $M^4$ as timed by the drop or cutting motion of the knife; and immediately thereafter the loaf $b$ held by its ends in the vise $V$, is fed down upon the wrapper, the first wrap thereof begins while its anterior edge is firmly held in the grip jaws, and its posterior edge, which is free, is drawn forward sufficiently to be thus positioned so that its lap will subsequently come substantially central on the (inverted) bottom of the loaf $b$; and when the wrapper is so positioned the roller $p^3$ on the link $M^v$ (adjusted in its slot $p^2$ to this end) moving downwardly with the lever $M^2$ and vise $V$, will permit the tripping arm $p^8$ of the bell-crank lever $p^7$ to descend and its arm $p^9$ to press against and move the paper feed mechanism $P^{13}$ outwardly or anteriorly, which motion will cause the grip arms $P^{37}$ to swing about their axis, open the grip jaws $P^{23}$ and release the wrapper $P^w$, because the said axis and the mechanism $P^{13}$ will be moved anteriorly while the free ends of said arms are held by the limit bolt $p^5$. It will be seen that said limit bolt, together with the auxiliary wrapper positioning mechanism $p$ and the operating or control member (as $p^3$) functioning therewith constitute a wrapper-positioning and lap-limiting mechanism $L^v$ adapted to limit the positions of the wrapper $P^w$ and its longitudinal lap symmetrically (substantially central) relatively to the loaf and its longitudinal vertical axial plane, transverse to the machine.

My primary or first-wrap mechanism $w^1$ is located above the machine bed plate $F^1$ and loaf way $F^3$, symmetrically relatively to the vise axis and is operably mounted in folding-rod slots $F^3$, in vertical, axially-extending flanges $F^8$ exterior to the loaf-way $F^3$ and consists in two transverse, round, folding-rods $w^2$ (Figs. 1, 4, 6, 32 and 33) slidable in the mounting slots $F^3$, and held retracted in the adjacent ends thereof by helical retracting springs, $w^3$ except when extended by a loaf. When retracted, their distance apart is somewhat less than the thickness of a loaf. When a loaf $b$ is grasped in the vise $V$ and fed down between them, the wrapper $P^w$ being below them, the spheroidal loaf-top (inverted) comes in contact with the wrapper and as it descends extrudes said rods $w^2$ and functions to position the wrapper, as above described, and the actual downward motion of the loaf $b$ and outward motion of the rods $w^2$ cause the latter to have, respectively, opposite axial and vertical orbital or concentric wiping motions relatively to the spheroidal top of the former, which motions wipe or wrap the wrapper about the loaf, as smoothly as is possible and symmetrically, as shown in Fig. 10 (Sheet 12).

My secondary or second stage wrap mechanism, $w^{20}$ is in duplicate, is located below the machine bed-plate $F^1$ and first stage wrap mechanism $w^1$ and transversely-adjustably interior to the far and near edges of the loaf-way $F^3$, and is best illustrated in Figs. 1, 32 to 39 (Sheets 2 and 12), and is adapted (co-acting with the wrapper-stretchers $V^{22}$) to make the necessary side folds in the wrapper at the loaf ends, illustrated in Fig. 11, and to wrap the wrapper transversely and upwardly and as closely and smoothly as possible, around the (inverted) spheroidal loaf-ends. The characteristic feature of these duplicate mechanisms may be described in commonly-used, in mathematical, and in mechanical terms and language, as follows:

The principal or functioning member of each such mechanism $w^{20}$ is a wrapper-wiping plate $w^{21}$ automatically, flexibly (elastically) universally movable within limits and functionally self-adjustingly hung on a rockably mounted spring-controlled compound link in such a manner that:—

(In common terms) the wiping plate $w^{21}$ has a wiping motion relatively to the irregularly rounded loaf-end and wipes the wrapper (as a human hand might) as closely and smoothly as possible around it, following around and automatically conforming the wrapper to its contour, whatever irregularities it may have and bringing the wrapper into close contact with it, from the beginning to the completion of the wrap under consideration. Or, in other words, when the loaf descends, the wiping plates $w^{21}$ are turned by it about one or other or all of the axes on which they are swiveled and, relatively to the loaf, said plates have a rolling and sliding motion and roll and slide around its rounded (inverted) top, the axes of contact swinging and moving outwardly and upwardly, so as to draw the wrapper as smoothly as possible in contact with the loaf-top, whatever its irregularities of surface may be:

(In mathematical terms) the mode of flexibly mounting or hanging and elastically supporting the wiping plate $w^{21}$ in its actual motions is such that its motion relatively to the loaf-end is controlled thereby and is rolling, wiping and orbital about a continually-shifting instantaneous center of revolution which may be within or may even lie on the opposite side of the loaf (according to its convexity), and which is automatically and continuously found or re-located by the co-action of the descending loaf and the universally-swiveled, flexibly-supported plate, so that (considering the duplicate mechanisms) the axes of contact will first occur on the (inverted) spheroidal loaf-top well in toward its center and as it descends will relatively swing and move orbitally outwardly and upwardly around, and the wiping plates $w^{21}$ will roll and wipe upon, the loaf-ends, and will roll and wipe the wrapper into close conformity therewith, whatever their variations of surface may be;

(In mechanical terms) each mechanism, $w^{20}$ may be described as a flexibly mounted compound, spring-supported, link motion mechanism in which a wiping plate $w^{21}$ is universally mounted and spring-supported on and parallel to, two link-separated axes of revolution and a third axis intersecting the said two axes, on which it can be orbitally swung, around one, or two or all the axes, as determined by the contour of the loaf and hence can move orbitally on the surface of a cylinder or of an ellipsoid, or of any one of a number of solids of higher order; and can be retracted toward or extended from its secondary axis, and this in any angular direction,—and can be inclined at any angle,—within the limits of its orbital motion, as determined by the loaf.

Wherefrom it follows (considering the duplicate mechanisms $w^{20}$) that when a loaf is fed down (by the vise V) the axes of contact of its spheroidal (inverted) top with the plates $w^{21}$ will be well removed from its ends; that the loaf co-acting with the elastic plate-support will position said plates, both transversely and angularly; that relatively to the loaf the plates $w^{21}$ will roll and slide upon it; and said axes of contact will follow and wipe around the loaf-top and ends and draw, roll and wipe the wrapper into close contact therewith, whatever may be the irregularities of the surface thereof.

It may be said that each organization $w^{20}$ may be considered relatively to the (inverted) descending loaf-top as a highly developed trammel apparatus adapted to describe not only circles and ellipses but also curves of higher orders, or of any nature on the surfaces of solids of any contour and in which the wiping plate $w^{21}$ replaces the trammel beam, the fixed pencil is replaced by the axis of contact with the loaf which travels on the plate (the beam member) and the guides are replaced by the arcs of oscillation of said members about the axes and of the axes about one another, and the guides, instead of being relatively fixed, are relatively universally automatically angularly adjustable within limits; the trammel being thus adapted to describe any curve whatever; and therefore because of the co-action and relative motions of the descending loaf top and ends and the wiping plate, their axis of contact describes and follows the bounding curve of the loaf-top however irregular it may be, and wipes the wrapper closely upon it. A trammel is an instrument in which a moving line has a fixed relation to two points which move along two fixed lines and in so doing control the motion of the moving line so that it, or a point in it generates or describes a curve, such as one of the conic sections all of which can be generated by suitable trammels. For example, the trammel for describing ellipses has two slots coinciding with the major and minor axes of an ellipse and a bar having two pins which slide in the slots and a pencil or tracing point which describes the ellipse; and (although it is seldom so used) the axis of the bar, in its successive positions, is tangent to, and generates four quarter ellipses terminating at the foci and there tangent to the axes of the ellipse described by the pencil; that is to say, of the slots.

Considering the second-stage wrap mechanism $w^{20}$ as illustrated in Figs. 32 to 38, it is evident that the plate $w^{21}$ is in truth a universal trammel bar and in passing from its position of rest (Fig. 36) to that of Fig.

37 or 38, any point in it can describe or the plate itself can be tangent to and thereby generate, any curve whatsoever. For the journal $w^{22}$ can slide in its bearing; the axes $w^{24}$ and $w^{26}$ can swing about the axis $w^{22}$ and the axis $w^{26}$ about that $w^{24}$ and all these motions (except the sliding) can take place simultaneously and independently; which relations constitute the said mechanism $w^{20}$ a trammel adapted to describe or locate its plate $w^{21}$ tangent to any curve whatsoever, within its range of motion.

My second-stage wrap-mechanisms $w^{20}$ are flexibly, rockably and transversely adjustably mounted (Fig. 36), each in the swivel head $w^{23}$ of a bar $w^{22}$ which is slidable in a bearing formed in the frame F and secured in adjusted position therein by a set screw, $w^{221}$. The head $w^{23}$ is swiveled on said rod by its sleeve extension $w^{230}$ and axially fixed therein by the engagement with an annular groove $w^{232}$ thereon of the point of a set screw $w^{231}$ screwed through a tapped hole in the sleeve extension $w^{230}$.

Each mechanism $w^{20}$ is hinged to an internal head $w^{23}$ of such a bar, on an axial pin $w^{24}$ (the axis of which is the secondary axis of the mechanism) by means of a transverse bell crank lever $w^{25}$, the upper arm of which I connect by a strong spring $w^{27}$ with the bar-head $w^{23}$, and in the lower arm of which I locate the primary axis of the mechanism, in the axis of a pin, $w^{26}$ on which I hinge a lever $w^{28}$ whose long arm carries (and is perpendicular to) the wiping plate $w^{21}$ and the other is connected by a weak spring $w^9$ with the bar-head $w^{23}$. The strong spring $w^{27}$ and weak spring $w^{29}$ respectively normally hold the bell crank lever $w^{25}$ and the wiper-plate $w^{21}$ and lever $w^{28}$ to which it is attached against stops, in their limit position of rest (Figs. 32, 33, 36 and 39), the pin $w^{24}$ serving to stop the inwardly extended bell crank $w^{25}$ and the lever $w^{28}$ being stopped in a convenient manner, for example, by contact in its end slot, with the body of the bell crank.

When the loaf $b$ is fed down in the vise V from the position shown in Fig. 32 its motion accomplishes the first wrap of the wrapper $P^w$ (as before described) in descending to that of Figs. 34 and 35 (which correspond save that in Fig. 34 the chuck C is omitted). During the fore part of this motion the stretchers $V^{22}$ are spring-extended with the rounded edges $V^{25}$ of their arms $V^{24}$ horizontal (Fig. 33); and while the vise feeds the loaf $b$ and wrapper $P^w$ down upon and thereby causes the wipers $w^{21}$ to function as above described, as they roll about the loaf-ends they enter between, and in-fold the wrapper-ends about, the stretcher arms $V^{24}$, retract the stretchers (Figs. 34 and 35), and advance the wrap to the stage illustrated in Fig. 41. When the loaf is fully descended its sides and the wrapper are grasped by the chuck C and the wiper $w^{21}$ has nearly conformed the wrapper to the loaf-end.

When vise V begins to ascend, the chuck C retains and begins to descend with the loaf and wrapper and the loaf-ends further swing the wipers $w^{21}$ on their spring supports (Figs. 37, 38) and fully conform the infolded wrapper ends to the loaf-ends. I may attach to the bed plate $F^1$ axial and opposite down-bent plate springs $F^{30}$ (Figs. 1 and 4) which extend from its sides through the loaf-way $F^2$, supplement the first wrap mechanism $w^1$ and when a loaf and wrapper are fed down, aid in conforming and holding the wrapper to the loaf.

The chuck C or second loaf-grasping, holding and wrapping mechanism is functionally subsequent to the vise and acts in a continuation of its vertical axis. It is mounted on a reciprocating carrier $D^{250}$, as best illustrated in Figs. 2, 3 and 4, which derives power from the operating lever $D^{25}$ (described before as a drive element) by a link connection, an L-shaped link $D^{251}$ (Fig. 4) being pin-connected to the lever $D^{25}$ and to a cross-head arm $D^{252}$ on a cross-head $D^{253}$, adjustably secured by set-screws, $D^{254}$ (Fig. 2) on and uniting the two rods, $D^{255}$, which form the lengthwise vertical element of the carrier $D^{250}$ and which have shouldered upper ends for positioning a separator, $D^{256}$, fixed on said rods $D^{255}$, whose ends project above said separator $D^{256}$ and constitute positioning or setting pins, $D^{257}$, by which I set my chuck C on the chuck carrier $D^{250}$. The carrier is vertically reciprocated in upper and lower guides respectively $F^{251}$ and $F^{253}$, on transverse frame members respectively $F^{252}$ and $F^{254}$.

The chuck C and its appurtenances are best illustrated in Figs. 2 and 4 and 35 (Sheet 12), 42 to 48 (Sheets 13 and 14) and 56 (Sheet 18). The chuck C, together with the third-stage wrap-mechanism $w^{30}$, form a bench-assembled unit, removable and replaceable as such and to this end its base $C^1$ which extends transversely, is provided with sockets, $C^2$, which fit and register with the rod-pins $D^{257}$ of the chuck-carrier $D^{250}$, to the separator $D^{256}$ of which it is detachably bolted by a bolt $C^3$ engaging its lower central boss $C^4$. The chuck is located and adapted to grasp a loaf with its long axis transverse to the machine, while the loaf-ends are held by the vise V; and therefore the posterior chuck jaws $C^{20}$ and anterior jaws $C^{40}$ are hinged in its transverse axis; and to prepare for them (Figs. 42 and 44) I form a plurality (four) of up-standing hinge arms $C^5$ symmetrically located on the base $C^1$ adjacent to its ends and each side of its axial plane; and in them, hinge-pin bearings for the transverse hinge pins $C^6$ on which the jaws are hinged.

The posterior chuck-jaw, $C^{20}$, swings about the hinge pins $C^6$, merely enough to admit and position the loaves $b$ and grasp them securely; while the anterior jaw $C^{40}$ has an additional function, one of its members being adapted to swing anteriorly to a substantially horizontal position, to permit the loaves to be ejected from the chuck, and consequently their construction differs.

The chuck jaws are built upon L-shaped plates, $C^{21}$ and $C^{41}$, respectively, hinged to the hinge-arms $C^5$ of the base by hinge bosses $C^{22}$ on the posterior jaw and like bosses $C^{42}$ (transversely exterior to those $C^{22}$) on the anterior jaw; and the L-plates are normally adjustably positioned, as shown in Fig. 43, by the co-action of limit bolts $C^{71}$, pivoted in the base $C^2$ at one end, with a washer and nuts $C^{72}$ on the outer end of each, which engage limit flanges, $C^{73}$, projecting downwardly from the L-plates, between which flanges and the base $C^1$ and abutting in suitable sockets, are jaw-closing compression springs $C^{74}$. The tops of the L-plates are swung inwardly by said springs, such motion being adjustably limited by adjusting the nuts and lock nuts on the limit bolts $C^{71}$. Each L-plate has, at each end of its lower or horizontal flange, a transversely-projecting, end hinge arm $C^{75}$ with an axially-extending pin-bearing for hinging a third-stage wrap-mechanism $w^{30}$, and a stop, $C^{77}$, for limiting the motions thereof; and extending axially-downwardly, adjacent to its near end (from the near end hinge arm) it has a flange $C^{78}$, to which I attach a pair of downwardly-axially extending chuck opening pincer cams, $C^{22}$, $C^{43}$ ($C^{23}$ to the jaw $C^{20}$ and $C^{43}$ to that $C^{40}$); said cams being so located as to clear and pass one another in vertical planes and having (together with their respective jaws) a pincers-like motion about the hinge pin $C^6$, such that when the cams are fully opened the chuck jaws are opened wide enough to freely admit the largest loaf the machine can handle, the cams being retracted and the jaws being closed by the jaw-closing springs $C^{74}$.

To the inner face of the posterior L-plate, $C^{21}$, I secure an upwardly-inwardly extending light-jaw-extension plate $C^{24}$ (Figs. 42–47) having high ends, a recessed edge between and joining them with inclined edges and a central slot $C^{25}$ extending inwardly to the L-plate; and centrally in the angle of said L-plate I secure a link-bearing plate $C^{28}$ to which, by two pair of axially-extending parallel-motion links $C^{29}$, I pivot and constrain to move in parallel, a horizontal loaf-support plate $C^{80}$, which is normally extended from the base $C^1$ by a spring $C^{81}$ strained between them. The loaf support, $C^{80}$, has an upwardly inclined posterior end somewhat wider than the slot $C^{25}$ in the jaw-extension, $C^{24}$, and of adjusted length so that it will just touch said jaw-extension when in its highest position, and its other end extends anterior to the L-plate $C^{41}$ and has an upper edge beveled (Fig. 43). The anterior jaw $C^{40}$ has a forked extension comprising two plates $C^{44}$ spaced to admit the loaf-support $C^{80}$ between them, being somewhat higher than the anterior extension $C^{24}$, with outer corners beveled; and fastened on a yoke-plate $C^{45}$, which is hinged between end boss $C^{47}$ on the L-plate $C^{41}$ about at its midheight, and normally spring supported in upright position against stop $C^{146}$ (Figs. 42, 43) by springs. $C^{46}$.

A slotted central-anterior extension or arm $C^{48}$ of the lower flange of the L-plate $C^{41}$ (Figs. 2, 4, 42 and 43) serves for hinging a bell-crank latch $C^{49}$, formed with a downwardly extending arm, connected with the base $C^1$ by a spring, $C^{57}$ which normally raises the latch-arm on which is a hook $C^{52}$ adapted to engage a catch $C^{53}$ formed centrally anterior on the jaw extension yoke plate $C^{45}$, the engaging faces being concentric about the latch axis and therefore without tendency to disengage, and the latch $C^{49}$ having a stop $C^{50}$ (Fig. 43) which engages the base $C^1$ to limit its spring actuated stroke to engaging position and an upper cam face $C^{54}$ anterior to its hook $C^{52}$. The latch $C^{49}$ normally engages and holds the L-plate and jaw extension ($C^{41}$ and $C^{44}$ respectively) safely in fixed relation; and at a certain cycle-period it is operated by the final stage wrap-mechanism, $w^{40}$, so that the jaw-extension $C^{44}$ can be swung to horizontal position and a loaf ejected from the chuck, as will be explained.

The location of the fourth-stage prior wrap-plate $w^{47}$, when functioning, determines the proper lowest position of the chuck $C$. At such times its jaw-extensions $C^{24}$, $C^{44}$, must clear (be below) said prior wrap plates $w^{47}$. This adjustment is made by suitably shifting the lower chuck cross-head $D^{253}$ on the carrier rods $D^{255}$ and fixing it in adjusted position by the set screws $D^{254}$.

The stroke of the vise $V$ is so adjusted (as before described) relatively to the highest chuck position that it will position loaves in the latter with their (inverted) bottoms flush with the upper edges of the chuck-jaw extensions. The smallest loaf so positioned (wrapable with the stated chuck-adjustment) will somewhat depress the loaf-support $C^{50}$. Upon a frame-member located below the lowest position of the chuck proper and interior to the planes of action of the jaw-opening cams $C^{23}$, $C^{43}$, preferably on the transverse frame member $F^{252}$, I pivot a cam opening pin, $C^{90}$, (shown enlarged in Figs. 48 and 48$^a$ of Sheet 13) which is normally horizontally extended transversely by a spring, $C^{91}$, in position to co-act with the pincers cams $C^{23}$, $C^{43}$; the pin-head having a vertical upper limb $C^{92}$ which at such times is held by the spring $C^{91}$ against the back of the slot in which it is pivoted, and a rounded lower corner, so that a downwardly acting force can rock, depress and retract the pin $C^{90}$, out of the path of the cams.

As illustrated, the pincers cams are L-shaped and inverted when viewed axially (Figs. 4, 42-47) fastened to the cam-flanges $C^{78}$ of the L-plates $C^{21}$, $C^{41}$ by their bars and have their functioning surfaces on their inverted downwardly-extending stems; the functioning face of the cam $C^{23}$ of the posterior jaw $C^{20}$ being posterior on its stem and the like face of the cam $C^{43}$ of the anterior jaw $C^{40}$ being anterior. When the chuck is depressed (Fig. 2, 4, 45) the pin $C^{90}$ extends between the cams across their upward path; and as the chuck is elevated the contact of the pin with the inclined upper cam faces forces the cams outwardly and opens the chuck jaws correspondingly, until the chuck reaches a nearly raised position, Fig. 46, in which the lower cam-face edges coincide with the transverse diameter of the pin $C^{90}$, at which times the chuck jaws are opened their widest, to admit a loaf, and thereafter after the loaf has entered, a very slight additional ascent of the chuck will raise said cam-edges above the transverse pin diameter, the line of pressure of the pair of cams on the pin will lie in an upper chord thereof and their pressure thereupon will automatically resolve itself into a horizontal and a vertical component and the latter will tilt the pin downwardly, Fig. 47, the cams will ride over it and the chuck jaws will close, as illustrated, or upon a loaf, if one be in the chuck.

The above described mode of mounting the chuck jaws and their belongings on its base $C^1$ leaves them free to rock within the limits fixed by the limit bolts $C^{71}$ during the chuck-stroke. When the chuck is elevated and the vise V is feeding a loaf into it, the spheroidal top and the sides of the loaf position the chuck jaws centrally in their arc of rocking. When the chuck is depressed it must be axially positioned so that its members will be properly related to the fourth-stage wrap-mechanism $w^{40}$. To this end an upwardly, posteriorly inclined positioning cam face $C^{430}$ is formed on the back of the anterior cam $C^{43}$, at its lower corner, and an adjustable positioning finger $j^{10}$ is located in and near the lower limit of the traverse of the cam face $C^{430}$, being adjustably bolted to the frame F or an extension $F^{10}$ thereof.

The chuck when idle is normally rocked anteriorly and the cams $C^{43}$ posteriorly because there are more and heavier members on its anterior side. Therefore when the chuck approaches its lowest position the cam face $C^{430}$ will contact with the positioning finger $j^{10}$, the chuck will be thereby positioned on its transverse axial plane and its anterior L-shaped plate $C^{41}$ will be fixed so that the tilting motion of its jaw extension $C^{49}$ will not be communicated to it.

Attached to the anterior jaw-extension $C^{44}$ is a bent lock-arm $C^{60}$ armed with a lock-pin $C^{61}$, which functions with a lock apparatus J (to be described) to lock the jaw extension $C^{44}$ in depressed position during loaf-ejection periods. Substantially vertical loaf-delivery plates $C^{89}$ (Figs. 4, 45 and 55) are attached to the anterior mounting yokes $w^{32}$ by bent arms $C^{88}$, which extend therefrom anteriorly inwardly and upwardly to normally locate said plates somewhat within the horizontal loaf path by which, when wrapped, loaves are ejected from the chuck. Said plates face one another and, in plan, form cam faces converging anteriorly and terminate in outwardly extending transverse loaf-abutment faces. When a wrapped loaf is ejected from the chuck it enters between the cam-faces of said plates and separates them more widely, swinging the yokes $w^{32}$ outwardly; and after the loaf has traversed said plates the springs $w^{300}$ of said yokes draw them and the said plates inwardly, so that their anterior transverse faces stand in the loaf-path, to serve as loaf-abutments as hereinafter described.

A third stage wrap-mechanism $w^{30}$ is universally hinged at each corner of the chuck mechanism proper, on a hinge pin (in a hinge arm $C^{75}$) by means of a universal joint, $w^{31}$, comprising a forked mounting yoke $w^{32}$, the forks of which straddle and are hinged to the hinge arm $C^{75}$, and which contains a diagonal socket $w^{33}$ (Fig. 45) nearly above its outer fork, said socket being located, relatively to the axis of the hinge pin in the arm $C^{75}$, in the intersection of two planes, viz; a perpendicular plane in which said axes lie (Fig. 42) and a second plane perpendicular to the first but inwardly inclined relatively to said axis (Fig. 45), and having, communicating with and perpendicular to said socket at about its mid height, a limit slot $C^{76}$ whose end axes extend respectively axially and transversely (perpendicular to one another); and a mounting spindle $w^{35}$, revoluble ninety degrees in the socket $w^{33}$, completes the universal joint mechanism, carries fixed on its outer end the third stage wrap-mechanism proper and is restrained and its rotation is limited in the socket $w^{33}$ to a quadrant motion by means of a pin $w^{36}$ which is fixed in the spindle, plays in said limit slot and, by contact with the ends thereof, limits the spindle motion.

The third stage wrap mechanism proper is a wiping (and rolling) plate $w^{37}$ fixed to (integral with) the spindle head, which is shown as triangular in shape; the spindle-axis prolonged being in that face of its head to which the rolling plate $w^{37}$ is attached and also, when open (Fig. 35), substantially in the prolongation of the outer, upper faces of the jaw-extensions $C^{24}$, $C^{44}$.

The third-stage wrap mechanisms $w^{30}$ co-act in far and near pairs on a loaf end. The operating and positioning members of each such mechanism comprise a roller $w^{38}$ revolubly mounted exterior to the universal joint $w^{34}$ on an outwardly-extending pin $w^{39}$ fixed in the spindle $w^{35}$, perpendicular to it and to the plate $w^{37}$; and each pair is normally closed (Figs. 42, 43) by a common spring $w^{300}$, whose mode of attachment causes it to tend both to draw in and to revolve said mechanisms $w^{30}$, the body of the spring being bent (substantially in V form) around and through an inwardly convex saddle $w^{301}$ loosely centrally pinned to the chuck base $C^1$ (shown pinned to a hinge arm $C^5$) and its ends being attached to the pins $w^{36}$ of the spindle $w^{35}$; the spring, interior to said pins, making bends around said spindles, which bends cause turning moments on the spindles and measure angularly about thirty degrees when the mechanism $w^{30}$ is closed (Fig. 42, solid line), and one hundred and twenty degrees when they are extended (Fig. 42, dotted lines), the spindle and their attached mechanism making about a quarter revolution.

Constraining the spring $w^{300}$ around through the saddle $w^{301}$ and wrapping its ends about the spindles $w^{35}$ causes it to have a turning moment on the latter and also to retract the wrap-mechanisms against their limit stops $C^{77}$ as illustrated in Fig. 42, while further said springs co-act with and supplement the chuck-jaw closing springs $C^{74}$. The third-stage wrap-mechanisms $w^{30}$ are extended, ready to be spring-operated, with their wiping plates $w^{37}$ substantially in line with the chuck-jaw extensions $C^{24}$, $C^{44}$ (Fig. 46, dotted lines of Fig. 42), against the tension of their springs $w^{300}$, by the upward traverse of the chuck C (on which they are mounted) and the co-action of their rollers $w^{38}$ with a pair of right and left hand, fixed, substantially U-shaped cams $W^1$ (Figs. 2, 4, 45 and 47) which are fixed to the frame F by means of flanged arms $F^w$ to which their horizontal lower plates are attached and are located transversely-exteriorly adjacent to the chuck C in the path of the rollers $w^{28}$ (Fig. 2).

Besides being U-shaped when viewed axially, the cams $W^1$ are also U-shaped when seen in plan; and their inactive lower plates extend axially and their active arms begin as inwardly-curved quarter-helices and continue as vertical arms. The anterior cam faces $W^a$ begin transverse at the lower edges of the cam bodies and wind upwardly-helically through ninety degrees in plan until they become axial and then extend in axially-vertically-extending timing faces $W^{aa}$. The posterior cam faces $W^p$ begin with transverse, vertical inactive faces $W^z$ which extend some distance higher than the beginning of the anterior faces $W^a$ and thence extend like but opposite to the anterior faces; except that their vertical axial timing faces $W^{pp}$ are shortened by the length of their lower timing faces $W^z$.

In the ascending motion of the chuck, the rollers $w^{38}$ carried on its anterior jaw come first in contact with the helical portion of the anterior cam faces $W^a$ and, co-acting therewith, begin to revolve the connected anterior wrap-mechanisms $w^{30}$ and extend their wiping plates $w^{37}$; and when these motions are progressed to a desired degree the opposite posterior rollers $w^{38}$, which have been sliding inactively on the posterior inactive cam faces $W^z$, contact with the helical portions of the posterior cam faces $W^p$, and their connected posterior wrap-mechanisms follow the motions of the anterior ones; and all such mechanisms, being fully extended by said helical portions of the cams, remain so while their rollers $w^{38}$ are traversing the vertical timing cam faces $W^{aa}$, $W^{pp}$.

After the chuck has grasped a loaf and wrapper (the latter being in its second stage, Fig. 41, Sheet 12) and begins its downward motion, the timing cam faces $W^{aa}$, $W^{pp}$ retain the rollers $w^{38}$ and wiping plates $w^{37}$ extended until the posterior rollers $w^{38}$ run off the posterior timing faces $w^{pp}$ and, functioning with the helical portion of the posterior cam, permit the springs $w^{300}$ to begin to close the posterior wrap plates $w^{37}$ and initiate the end wraps from the posterior loaf-side; and (as timed by the relative heights of the posterior and anterior timing cam faces $W^{aa}$, $W^{pp}$) the anterior rollers $w^{38}$ and connected mechanisms follow the posterior ones, functioning similarly and advancing the loaf-wrap to the state illustrated in Fig. 58, with only the end tucks and final wraps on the (inverted) loaf bottom to be made; and slightly after the above described operations, the chuck reaches its lowest position, still grasping the loaf, nearly wrapped, as illustrated in Fig. 59.

It will be observed that the chuck C is flexibly mounted and elastically positioned in its normal working plane and this mode of mounting and supporting constitutes a compensatory mounting which automatically compensates for accidental misalinement of the vise and chuck and for misplacement of loaves in the vise and enables the machine to satisfactorily feed and advance loaves which vary considerably from the standard loaf-dimensions, to which the machine is set. It will also be observed that I mount the third stage wrap mechanisms on the chuck and moreover, mount them flexibly thereon, and by universal joints; make their wrap motions spring-actuated; and that their engagement with their opening cams $W^1$ and the cam faces thereof is by means of the rollers $w^{38}$, which are illustrated as several times longer than the operative cam-faces with which they contact, and that they will be operative however said rollers may be laterally shifted on said cams which constitutes a flexible operative engagement, operative without impairment of functions throughout the swing of said wrap-mechanisms. This mode of construction and operation gives a wide operative range, curtails the elapsed time of wrapping a loaf and thereby increases both the normal output and the reliability of the machine.

It is a general principle of my wrap mechanisms characteristics of these particular ones, that they are positioned for operation by the loaf itself and not arbitrarily (and necessarily approximately and frequently unsuitably) by a machine-element; and therefore they are operatively positioned whatever may be the physical variation of a loaf from standard loaf-form, however it may be misplaced in the machine or whatever the misalinement of the machine parts, all, of course, within practical limits. Further, it is a general principle of my wrap mechanism, shared by these particular ones, that wrap-operations are accomplished by, and therefore necessarily coincident with, the necessary feed-motions of the loaves.

I feed and wrap at one and the same time instead of, as is usual in prior machines making a feed motion, arresting the unit and making a partial wrap and then making another feed motion. The progress of a loaf through my wrap elements is practically continuous and uninterrupted, not intermittent, as has heretofore been the practice. These features enable me to maintain a large output and rapid complete loaf-traverse without undesirably high local accelerations of loaf-speed.

It may be stated that the springs which close the chuck jaws are adapted to cause a friction between them and the loaf which somewhat exceeds the sum of the frictions between the loaf and the vise jaws and initial wiping plates $w^{24}$ plus the upward lift of the loaf-support $C^{80}$, so that the chuck C will not fail to withdraw the loaf from the vise and properly retain it while descending.

*Analysis of the relative motions of the loaf and the third-stage wrapping mechanism, especially its rolling plate $w^{37}$.—*
Loaves are generally baked in splayed pans and therefore the sides and ends of loaves, for a considerable part of their height, splay out from the loaf bottom. The flexible mode of mounting the chuck jaws on its base enables them to automatically conform (very nearly) to and grasp the splayed sides of (inverted) loaves (Fig. 43) within the capacity of the machine so that the spindles $w^{35}$, which are the (nearly) upright axes of revolution of the third stage wrapping mechanism $w^{30}$ will lie parallel to the sides of loaves in the chuck but the ends of said loaves will project beyond said axes. As the wrap advances said axes (being mounted on the yokes $w^{32}$ and spring supported) swing outwardly, as the mechanisms $w^{30}$ close on the loaf ends until substantially said axes are in the prolongations of and the wrap plates conform to the loaf ends. It necessarily follows that the plates $w^{37}$ roll and at the same time (because said axes approach the loaf-ends) slide slightly on the loaf corners and therefore the analysis hereinbefore made, of the relative motions of the loaf and wiper, plates $w^{24}$, applies to this case except as follows: Loaf-corners are much more uniform in contour and more uniform and have smaller radii than loaf-tops and therefore the relations between the sliding and rolling or sliding and orbital motions are less variable in the latter case, which admits of control and reasonable precision within practical limits, by properly proportioning the third-stage wrapping members; whereas in the former case the element of change is larger. From the same cause the instantaneous centers of revolution of the orbital motion are nearly stationary within the loaf, whereas in the former case they may shift from slightly within to locations without and to the other side of the loaf. Whereas in the aforesaid case the universal joint mounting comprises three axes of revolution, of which one is fixed and generally intersecting in direction relatively to the others which are movable relatively to the first but fixed relatively to one another, in this case there are three axes all intersecting in direction and movable relatively to one another and comprise the common hinge-axis of the chuck jaws $C^{30}$ and $C^{40}$, common to all four universal joints, the hinge-axes of the mounting yokes $w^{32}$ and the axes of the spindle $w^{35}$.

Slightly prior to the completion of the third-stage wrap during the time the posterior rollers $w^{38}$ are descending the inactive faces $W^2$ of the cams W, I initiate the end tucks, which advance the wrap from the stage shown in Fig. 58 to the condition of Fig. 59, and complete them during and instantly subsequently to the completion of the descent of the chuck. I treat the tuckers as supplementary wrap mechanisms $wt$, supplementary to the third stage mechanisms $w^{30}$. They are best illustrated in Figs. 2, 4, 49 (Sheet 15) and 51 to 56 inclusive (Sheets 16, 17 and 18, 53 on Sheet 3). Their wrap-members are opposite tuck plates $w^{307}$ centered in the transverse axial plane, hinged on transversely-movable, axially extending hinge pins $w^{308}$, and have a folding and sliding motion relatively to the end-bottom corner, and the bottom, of the (inverted) loaf, being normally supported nearly upright by springs $w^{309}$, when retracted, as shown in Fig. 49.

The near and far tuck plates are respectively mounted on oppositely transversely sliding frames $T^1$ and $T^2$ which slide on transverse horizontal guide rods $F^{13}$, fixed suitably distanced below the bed-plate $F^1$. The far frame, $T^2$, (Fig. 49) comprises an axially extending yoke $T^4$, with upstanding arms $T^5$ by which it is distanced from the bed-plate $F^1$ and the guide rods $F^{13}$, which extend through its guide bearings $T^6$; a long, anterior, inwardly-transversely extending guide arm $T^{17}$ with a guide bearing $T^6$ at its inner end for the rod $F^{13}$, which bearing is thus so far distanced from the yoke bearings as to prevent the frame from binding on its guides; an upper central boss $T^7$ on the yoke $T^4$; and on the under side thereof a downwardly-inwardly extending hinge arm $T^8$ on which the tuck plate $w^{307}$ is mounted by the hinge pin $w^{308}$.

The near frame $T^1$ differs from the far one only in that its long guide arm, $T^{27}$, is posterior and at about its midlength, has a downwardly-extending arm with a timing roller $T^{29}$ revolubly mounted at its lower end. Power for the tucking is derived from the fourth-stage wrapping lever $D^{26}$ and it is timed by a connection with the chuck-operating lever $D^{25}$. For the power-supply I form on the lever $D^{26}$ a posteriorly-extending arm $D^{226}$ and rockably mount at its end an inwardly-transversely extending rocker head $D^{260}$. In said head, transverse to its axis (axial relatively to the machine) is a socket for a limit-link $D^{261}$.

On the frame F, I rockably mount a transverse primary rock-shaft $T^{30}$ (before referred to) having fast to it, in an axially-extending plane adjacent to the lever $D^{26}$, a bell crank $T^{31}$, the short, horizontally-posteriorly extending arm $T^{32}$ of which is connected by a tension feed-spring, $T^{32}$, with the frame F, and the long, downwardly-extending arm of which, $T^{34}$, is connected with the lever $D^{26}$; the rocker head $D^{260}$ thereof being connected with a similar head $T^{35}$ on said bell crank arm $T^{34}$ by the limit-link $D^{261}$, one end of which is fast in the rocker-head $D^{260}$ while its anterior limb is slidable in a bearing in the rocker head $T^{35}$, such motion being limited by limit nuts $D^{263}$ on its threaded anterior end.

During the anterior swing of the lever $D^{26}$, the limit link $D^{261}$ slides through the bearing in the rocker-head $T^{35}$ and the bell-crank $T^{31}$, spring $T^{33}$ and tuck mechanism $wt$ rest; the spring being strained and the tuck mechanism retired and so locked by a lock-and-release mechanism $T^{50}$. After the anterior motion of the lever $D^{26}$ the chuck C goes up for a loaf, descends with it, and while so doing makes the third-stage wrap; and near the lowest limit of its stroke releases the tuck mechanism $T^{50}$; then said lever $D^{26}$ reverses and swings posteriorly and the limit link $D^{261}$ at first slides idly through the bell-crank rocker-head $T^{35}$; and after its limit nuts $D^{263}$ contact therewith, the continued posterior swing of the lever $D^{26}$ will swing the bell crank posteriorly, strain the spring $T^{33}$ and store in it energy with which to make the succeeding feed motion of the tuck mechanism $wt$ and retract said mechanism, which, when fully retracted, is so locked by a lock and release mechanism $T^{50}$.

It is obvious that the limit-link $D^{261}$ and nuts $D^{263}$ together with the rocker-head $T^{35}$ and the levers $D^{26}$ and $T^{31}$ constitute a limit motion and power-equalizing apparatus $L^2$ adapted to adjustably limit the freely-spring-actuated motion of the tuck mechanism $wt$ and time the storage in the spring $T^{33}$ of energy derived from the lever $D^{26}$.

In order that the rock shaft $T^{30}$ may by its motions oppositely reciprocate the tuck frames $T^1$, $T^2$, I connect them severally therewith by synchronously-oppositely-acting gearing, $T^{10}$, each comprising a pair of bevel gears, $T^{41}$, one fixed on said rock shaft, the other on a vertical rock shaft $T^{42}$, rockably mounted in bearings formed in a member of the frame F, and fixed on the upper end of said vertical rock-shaft, a (bent) lever, $T^{44}$, link-connected, at its free end, by a link $T^{45}$, and centrally with a frame $T^1$ or $T^2$. When the lever $D^{26}$ moves posteriorly (after the limit nuts $D^{263}$ contact with the bell-crank rocker head $T^{35}$) it swings the bell crank $T^{31}$, rocks the horizontal rock-shaft $T^{30}$, the bevel gears $T^{41}$ and vertical rock shafts $T^{42}$, swings the bent levers $T^{44}$ outwardly and retracts the frames $T^1$ and $T^2$ and tuck plates $w^{307}$.

The tuck mechanisms are fed in by the spring $T^{33}$ during their feed-motions the lower limbs of the tuck plate $w^{307}$, which are their heavy mounting angle-plates, function firstly with upstanding cam faces $W^{310}$, and secondly with their transverse, inward, horizontal continuation $W^{311}$, both formed on upstanding flanges of the chuck-cam supports $F^w$ (to which the cam bodies $W^1$ are fastened) and by the first cam contact the tuck plates are inwardly depressed (against their spring-support) toward and to a horizontal plane slightly higher than the (inverted) loaf bottom and begin the (inverted) bottom-end tucks of the wrapper $P^w$, which are completed (Figs. 2, 55, 59) when the chuck and loaf are fully lowered and during their contact with the horizontal cam faces $W^{311}$ which retain the tuck plates horizontal so that they can complete said tucks during the last part of the feed motion of the tuck mechanism. The tuck mechanism is retracted by the posterior motion of the lever $D^{26}$, as aforesaid, and is locked in retracted position and at the proper subsequent motion-cycle period is released, by a tuck lock-and-release mechanism $T^{50}$ comprising a vertically-reciprocating tuck-timer-releaser $T^{51}$, slidably mounted on guide rods $F^{12}$ projecting downwardly from the bed-plate $F^1$ posterior to those $F^{13}$ and is timed by the fourth-stage wrap lever $D^{25}$ with which it is connected by a link $T^{52}$ (Figs. 53 of Sheet 2, 49 of 15 and 50–52 of 16).

The timer releaser comprises a transverse cross-head $T^{53}$ having bearings by which it is mounted on the vertical guide rods $F^{12}$ and is pin connected to the link $T^{52}$, the connection of which with the lever $D^{25}$ is made adjustable by means of a slotted rock head $D^{258}$, rockably mounted in said lever, the link $T^{52}$ being adjustably secured in said slot by a pinch-nut $D^{259}$. On the anterior face of the cross head $T^{53}$, I form or fix a stop and guide, $T^{55}$ (as illustrated in Fig. 53, looking toward the supply end of the machine, and in Fig. 49) and near its upper far corner I pivot a latch $T^{56}$, which is directly above the fixed stop $T^{55}$ and is held upon it by its own weight and a supplementary spring and the near end of which extends beyond the end of the fixed stop.

The tuck lock-release mechanism $T^{50}$ is operated in time with the chuck C by its link connection with the chuck lever $D^{25}$; and when the chuck is in its lowest position, the tuck mechanism T is fully retracted. During the motions of the tuck mechanism the timing roller $T^{29}$ on the near frame $T^2$ moves between the time stop $T^{55}$ and latch $T^{56}$, which then rides on the roller; and when the tuck mechanism is fully retracted the roller $T^{29}$ clears and ceases to support the latch $T^{56}$, which drops into the path of said roller and locks the tuck mechanism in retracted position, to so remain until the release period arrives.

The reciprocation of the timer-releaser $T^{50}$ is short because it is linked to the lever $D^{25}$ near its fulcrum. When the chuck C is raised by the lever $D^{25}$ the timer-releaser $T^{50}$ is also lifted (by the link $T^{52}$) and carries with it the latch $T^{56}$ to such a height that the roller $T^{29}$ can clear its lower edge and be slightly fed in (by the spring $T^{33}$), into contact with the end of the stop $T^{55}$; and so remain while the chuck and timer-releaser $T^{50}$ continue to ascend, reverse, and begin to descend. The latch $T^{56}$ during such motions is inoperative, merely riding first on the stop $T^{55}$ and then on the roller $T^{29}$. At the proper cycle-period the lever $D^{25}$ will lower the timer-releaser $T^{50}$ so low that the roller $T^{29}$ can roll around the upper near corner of and along the stop $T^{55}$, which will release the tuck mechanism T so that the spring $T^{35}$ can impart to it its feed motion, during which the roller $T^{29}$ moves, above the stop $T^{55}$, to the position shown in Fig. 2. The upper transverse surface of the stop $T^{55}$ is recessed considerably below its upper near corner so that the timer-releaser can ascend somewhat while the tuck mechanism is in its inner position and the roller $T^{29}$ is above said stop.

My fourth-stage and final wrap-mechanism, $w^{40}$, receives the loaf partly wrapped (Fig. 59) and delivers it fully wrapped (Fig. 60). It consists in two connected, oppositely and nearly-synchronously working principal members, viz; a posteriorly-located, prior-acting wrap-lever $w^{41}$ which rocks anteriorly to make the prior loaf-bottom wrap and subsequently ejects the wrapped loaf from the chuck; and an anteriorly-located, final-wrap or omnibus member $w^{401}$ which rocks posteriorly to make the final wrap and receive the loaf ejected from the chuck, and when it rocks anteriorly retains it while the exposed wrapper-laps are being sealed air-tight; a previously wrapped and sealed loaf being by the same member delivered to the delivery chute. Both these members are rockably mounted on frame members $F^{40}$, preferably bosses on or extensions of the lower chuck-guide frame $F^{253}$. It is best illustrated in Figs. 2 and 4 and 54 to 63 (Sheets 17, 18 and 19). It derives power from the final-wrap lever $D^{26}$, through a slotted link, $D^{269}$, which is adjustable as to functional length by shifting its pivot stud $D^{369}$ in its slot and connects the free end thereof with the stock $w^{402}$ of the omnibus $w^{401}$ somewhat above its mid-height.

The omnibus stock $w^{402}$ is a rectangular open frame with upright outer bars $w^{405}$ having near their tops posteriorly-extending brackets $w^{406}$, to which I suspend a loaf-cradle $S^{20}$ (to be described) and which are connected by head-plates $w^{404}$ to which I fasten my cooler $S^{10}$ (to be described). One, preferably the near upright, is provided with a link-pin boss $w^{409}$ about at its mid-height, and adjacent and anterior thereto I connect the uprights $w^{405}$ by a transverse bar $w^{408}$ with a central enlargement containing a socket (with its axis upright) in which I adjust and fix, by a set screw $w^{411}$, a trip-rod, $w^{412}$ on the upper end of which is fixed a trip-finger $w^{415}$, which trips the anterior chuck-jaw extension $C^{44}$ to permit the wrapped loaf to be ejected from the chuck. The omnibus stock $w^{402}$ is hinged at its bottom on hinge pins $w^{403}$ fixed in the uprights $w^{405}$.

The prior wrap lever $w^{41}$ (Fig. 57) comprises a lower forked head $w^{42}$, hinged by its forks $w^{44}$ to the frame members $F^{40}$; extending centrally from said head an upright arm, $w^{45}$, to the top of which I hinge, by a transverse pin $w^{46}$ (see Fig. 57), my prior wrap-plate, $w^{47}$; and integral with the forks $w^{44}$, driven gear-wheel segments of one tooth each, the near (recession) and far (approach) ones designated respectively as $w^{72}$ and $w^{62}$. The prior wrap-plate $w^{47}$ is mounted on and extends anteriorly from the ejector $w^{48}$, in three parts with passages $w^{49}$ extending axially between them, for the traverse of loaf-pawls, to be described.

Centrally on the anterior face of the ejector $w^{48}$, I provide a depending arm $w^{50}$ which depends somewhat lower than the hinge pin $w^{46}$, and is connected with the upright $w^{45}$ by a spring, $w^{51}$, which normally depresses the plate $w^{47}$; and I make an adjacent U-bend in the upright $w^{45}$ so that the ejector can traverse and eject loaves from the chuck. When this occurs the anterior jaw extension $C^{44}$ is depressed and the wrap-plate $w^{47}$ passes between the high ends and over the recessed edge of the posterior jaw extension $C^{24}$, and the ejector arm $w^{50}$ through the central slot, $C^{25}$ therein; while the U-bend in the upright $w^{45}$ envelops the chuck base and body.

Power to actuate the prior-wrap lever $w^{41}$ is derived from the omnibus $w^{401}$ by means of an approach gearing, $w^{60}$ and an oppositely-acting recession gearing, $w^{70}$, shown as located respectively exterior to the far and near prior-lever forks $w^{44}$ and each consisting in a pair of wheel segments of one tooth each. Their driving segments, respectively $w^{61}$ and $w^{71}$, are revolubly mounted on the omnibus mounting-pins, $w^{403}$ and are secured in adjusted position by pinching their positioning arms $w^{80}$ between the omnibus uprights $w^{405}$ and pinch-plates $w^{81}$ by means of bolts. Their driven segments, $w^{62}$, $w^{72}$, respectively, are integral with the prior wrap lever forks $w^{44}$.

The arcs of action of the recession gearing $w^{70}$, (which follows a slight, idle, approach-motion of its driving to its driven gear) coincides with the entire recessional movement of the prior lever $W^{41}$, and during a part of such movement, energy is stored in a tensional approach-spring, $w^{83}$, which is illustrated as connecting the upright $w^{45}$ with and enveloping a stop-limit-link, $w^{84}$ whose ends are slidable in bearings formed in rocker-heads $w^{86}$, rockably mounted on the prior lever and omnibus uprights $w^{45}$ and $w^{405}$, the working strain of said spring being adjustable by nuts $w^{88}$ on said link, which limits its functional length.

The slotted link $D^{269}$ and its adjustable connection with the final-wrap lever $D^{26}$, together with the limit-link $w^{84}$ and its limit nuts $w^{85}$, constitute a limit and positioning mechanism $L^4$, adapted to limit the approach and recession motions of the omnibus $w^{401}$ and prior lever $w^{41}$, and also to position their arcs of traverse relatively to the axis of the chuck C.

When the omnibus $w^{401}$ and prior lever $w^{41}$ are wholly approached (Fig. 54) the base members of the chuck are in the U-bend of the upright $w^{45}$, the head of the latter extends anteriorly across the chuck, (having ejected a loaf therefrom) and the posterior end of the omnibus wrap-plate $w^{407}$ extends across the top of the chuck, posteriorly beyond the prior wrap-plate $w^{47}$ a distance about equal to the chuck-width. At such times the tooth of the recession driving gear $w^{71}$ is clear below that of the recession driven gear $w^{72}$. When the lever $D^{26}$ initiates recession of the omnibus, the rocker head $w^{86}$ of the latter idly traverses the anterior limb of the stop-limit link $w^{84}$ and the tooth of the recession driving gear $w^{71}$ approaches that of the driven gear $w^{72}$ and the prior wrap lever $w^{41}$ rests until said teeth contact; and after such contact, the recession of the prior lever $w^{41}$ is gear-actuated, by the recession gearing $w^{70}$, from the omnibus. After such motions have caused the omnibus rocker head $w^{86}$ to contact with the limit nuts $w^{88}$ (Fig. 55) the spring $w^{83}$ is extended and energy is stored in it by further recessional movements, until their completion (Fig. 56).

Because the pitch radius of the recession driving gear $w^{71}$ exceeds that of its driven gear $w^{72}$, the angular motion of the prior lever $w^{41}$ is greater than that of the omnibus $w^{401}$; and this, together with their substantially equal lengths, causes the former and its wrap-plate $w^{47}$ to have a longer and swifter retractive motion than the latter and its wrap-plate $w^{407}$. The pitch radius of the approach driving gear $w^{61}$ exceeds, and that of the approach driven gear $w^{62}$ is less than, the pitch radii of the like recession gears, $w^{71}$ and $w^{72}$.

When recession (of the omnibus) begins, the tooth of the approach driving gear $w^{61}$ is in contact with that of the approach driven gear $w^{62}$; but the gear $w^{61}$ travels faster than and recedes from the gear $w^{62}$ during recession and when the limits of the recessional movements are reached is considerably retired from it (Fig. 56). At such times the prior lever $w^{41}$ is retracted posteriorly so that its wrap plate $w^{47}$ is nicely clear of the chuck C and the omnibus $w^{401}$ is oppositely retracted so that its wrap-plate $w^{407}$ is a considerable distance (practically equal to the length of the wrap-plate $w^{47}$) anterior to the chuck.

When the lever $D^{26}$ initiates the approach (posterior motion) of the omnibus, the approach gears stand separated (Fig. 56) and the spring $w^{83}$ causes approach (anterior motion) of the prior lever $w^{41}$ and presses the tooth of its recession driven gear $w^{72}$ against that of the omnibus recession driving gear $w^{71}$, so that the approach of the prior lever is spring actuated, but gear-timed, by the recession gearing $w^{76}$, until the ejector $w^{48}$ contacts with the loaf in the chuck.

During its spring-actuated approach the prior wrap-plate $w^{47}$ makes the posterior loaf-bottom (fourth stage) wrap of the wrapper, considerably in advance of the corresponding (and final) wrap made by the omnibus wrap-plate $w^{407}$; and this because: (1) the prior plate $w^{47}$ is much the nearer (Fig. 56); and (2) the driving pitch circles of the gearings $w^{60}$ and $w^{70}$ are much larger than their driven pitch circles and therefore the prior lever $w^{41}$ moves angularly faster than the omnibus and its wrap-plate $w^{47}$ moves linearly faster than the omnibus wrap-plate $w^{407}$, their respective arms being of substantially equal length.

During spring-actuated approach, as above described, the tooth of the approach driving gear $w^{61}$ approaches, but at the termination is still some distance from the tooth of the approach driven gear $w^{62}$, and after such termination (of spring actuation) the prior lever $w^{41}$ rests an instant and the limit link traverses the rocker head $w^{86}$ of the omnibus until said teeth contact; and after such contact the lever $D^{26}$ and omnibus actuate and time the prior lever $W^{41}$ by means of the approach gearing $w^{60}$. During this part of the approach (Figs. 55 and 54) the spring $w^{51}$ causes the prior-wrap-plate $w^{47}$ to press the posterior loaf-bottom fold of the wrapper against the loaf-bottom and the ejector $w^{48}$ presses against the anterior side of the loaf to eject it from the chuck C (its anterior jaw extension $C^{44}$ being then horizontal as will be described); and as the omnibus $w^{401}$ approaches, the posterior extension of its wrap-plate $w^{407}$ passes over and begins to fold the final wrap of the wrapper $P^w$ down upon the prior wrap plate $w^{47}$; and as approach continues and becomes complete, the prior lever, by its ejector $w^{48}$, pushes the loaf out of the chuck and completes the final wrap between posterior extensions $w^{417}$ of the omnibus wrap-plate $w^{407}$ and a spring suspended cradle $S^{26}$, which receives the loaf and presses it against said wrap-plate extensions. Spring-extensible loaf pawls $w^{414}$ on the omnibus wrap plate $w^{407}$ ride over the loaf during approach and at its completion spring down behind it (Fig. 54) to prevent it from being pulled back into the chuck by the recession of the prior wrap-plate $w^{47}$.

The anterior chuck jaw extension $C^{44}$ is depressed substantially anteriorly horizontally (Figs. 55-54) during approach by the functioning of the omnibus-carried trip-finger $w^{413}$ with the upper cam face $C^{54}$ of the latch $C^{49}$. The finger then advances posteriorly upon and depresses the latch so that its hook $C^{52}$ is lowered away from and releases the catch $C^{53}$ on the yoke $C^{45}$ of the anterior chuck jaw extension $C^{44}$ and immediately thereafter the tip of the finger $w^{413}$ contacts with the lower limb of said yoke, rocks said member and depresses the jaw extensions $C^{44}$, thereby opening the anterior side of the chuck for loaf-ejection. At such times I confine such chuck-opening motion to its jaw-extension $C^{44}$, position the chuck C and fix its anterior L-plate $C^{41}$ by contact between the posterior cam-face $C^{430}$ of the anterior cam $C^{43}$ (attached to said L-plate) and the adjustable positioning finger $j^{10}$, fixed in adjusted position on the frame member $F^{10}$.

It is necessary that the anterior chuck jaw extension $C^{44}$ be releasably locked, depressed and open during the fore part of the recession of the omnibus in order that it may not press upwardly against the loaf and pull it back into the chuck; and that it be subsequently released so that it can be spring-returned to and latched in upright position, ready for another loaf. To this end I provide a jaw-lock and release plate J (Figs. 4, 54, 56), which is rockably mounted on the trip-rod $o^{412}$ above the transverse bar $w^{408}$ of the omnibus stock, where it is normally held in lock-and-release position by a spring $J^1$ which presses it bodily down against, and so positions it by pressing its stop $J^2$ against, said bar, its lock-and-release plate $J^3$ at such times extending, L-shaped in plan, from the rod $w^{412}$ at first transversely to an elbow and thence in an axial direction across the arc traversed (when the anterior chuck jaw swings down, to open) by a lock-pin $C^{61}$ located on a bent arm $C^{60}$ which is attached to the upper limb of the anterior chuck-jaw extension $C^{44}$. On the posteriorly-extending part of the lock plate $J^3$, in position to be struck by the lock-pin $C^{61}$ when the chuck is opened, I form an upwardly-posteriorly extending cam-face, $J^4$, and immediately anterior thereto I cut a slot, $J^5$, for the passage of the lock-pin $C^{61}$.

As the anterior chuck-jaw extension $C^{44}$ is depressed, the lock pin $C^{61}$ contacts with the cam face $J^4$, and swings the lock and release plate posteriorly (against its spring $J^1$) so that its slot $J^5$ will lie in the transverse of the lock pin $C^{61}$; and as the opening of the chuck is completed, the said pin passes through said slot and the spring $J^1$ retracts the lock-and-release plate J to lock-and-release position in which its posterior extension $J^3$ is above and confines the lock pin $C^{61}$, thereby locking down the chuck jaw extension $C^{44}$, which is thus locked and retained open during almost the whole recession of the omnibus. The posterior extension $J^3$ of the lock and release plate is such that at the desired cycle-period (during the recession of the omnibus) it will have slid over and to release position and will clear and release the lock pin $C^{61}$, so that the chuck-jaw extension $C^{44}$ can be spring-returned to upright position.

Fig. 64 shows a preferred construction of the omnibus or final wrap-plate $w^{407}$, which is there shown as a posterior extension of the lower or face plate, $S^2$, of my heater $S^1$ and formed with an up-curved posterior end, so that it will not catch and tear the wrapper. The loaf pawls $w^{414}$ are made of thin plate, hinged near the posterior end of the wrap-plate $w^{407}$ and are extended by springs $w^{415}$. Their transverse location is axial with the slots in the prior-wrap so that at the close of the approach and the beginning of the recession of the wrap-plates $w^{47}$ and $w^{407}$, said pawls may be extended through said slots in the prior wrap plate and engage a loaf.

The omnibus wrap plate extensions $w^{417}$ are bent spring plates attached at their posterior edges (Fig. 64) to the face plate $S^2$ of my heater $S^1$. Their under faces are practically continuations of the like faces of the loaf-pawls $w^{414}$, to the end that at full approach and during early recession they may traverse and be in the slots in the prior wrap plate $w^{47}$, project below and elastically depress the folds of the wrapper clear of the face thereof and hold them against the loaf and securely, while said wrap-plate recedes.

My sealing apparatus consists in a main upper heater $S^1$, end heaters $S^{101}$, a cooler $S^{10}$, and a cradle $S^{20}$. The cradle $S^{20}$, as shown in preferred form in Figs. 61 and 62, comprises a suspension yoke $S^{21}$ with a lower transverse beam $S^{22}$ having a central posteriorly-extending tongue $S^{23}$, to which is attached a floor plate $S^{24}$ with curved and downbent ends, beveled at their edges, to facilitate entry and egress of loaves, and anterior hinge-arms, $S^{25}$ for hinging a spring-supported tumble-head, $S^{40}$; and integral with said beam $S^{22}$, vertical axially-extending, T-shaped suspension cheek plates $S^{26}$, the upper faces of which normally bear against the in-turned upper flanges of the brackets $w^{406}$ on the omnibus-uprights $w^{405}$; and suspension springs $S^{27}$, by which the cradle is suspended, to guide pins $w^{418}$, fixed in the brackets $w^{406}$, the vertical plane of suspension of the cradle being transverse and about at its mid-length.

The mode of suspension permits either end of the cradle to be rocked downwardly; and such motion is axially guided and restrained and downwardly limited by the engagement of inward extensions of said guide pins, $w^{418}$ with limit slots $S^{28}$ formed in the cheek flanges $S^{26}$.

I secure my cooler $S^{10}$ to the brackets $w^{406}$, adjacent to their posterior ends, by means of the transverse head plates, $w^{404}$. It consists in a metal box with an upper nozzle $S^{53}$ for connecting a compressed air supply pipe $S^{52}$, an interior baffle plate $S^{54}$ to compel air passing through it to circulate uniformly, and a lower face-plate, $S^{12}$, its face flush with those of the transverse plates $S^{11}$ and having a plurality of air-outlets $S^{55}$, preferably on its transverse axis.

My heating element $S^h$ is preferably a refractory plate containing resistance coils. Heating current is conveyed to it through suitable conduits and connections and is regulated by a rheostat, all in conventional ways. It is fixed in the heater $S^1$, (which is a metal box) immediately above its face-plate $S^2$ and beneath a baffle plate $S^{54}$, which compels uniform circulation of compressed air, which enters the heater from a compressed air pipe $S^{52}$ by a nozzle $S^{53}$ and passes out through a plurality of air outlets $S^{55}$, in its face plate $S^2$, which, as aforesaid, extends posteriorly to form the final-wrap-plate $w^{407}$, and has the loaf-pawls $w^{414}$ connected, and the elastic wrap-plate extensions $w^{417}$ secured, to it.

The heater $S^1$ is rockably pin-mounted on the omnibus uprights $w^{405}$, by means of mounting arms $S^3$ extending from its less-heated upper body (so as not to convey away and waste heat) and preferably integral with a transverse yoke to which the heater is bolted, as illustrated; and in order to limit its rocking motion, I form on one (the near) suspension arm $S^3$, a head $S^4$, with anterior and posterior extensions to, respectively, afford an abutment for a spring, $S^5$, and room for an adjustable motion-limit member $S^6$, shown as a set screw; this construction permitting the posterior end of the heater $S^1$ to be rocked upwardly.

To seal the exposed loaf-end wrapper laps, I provide end heaters $S^{101}$ similar in construction and operation to the main heater $S^1$ but without air circulation. These are suspended adjacent and parallel to and just lower than the ends of the main heater, by hinge straps $S^{33}$, from upstanding hinge arms $S^{34}$, secured to the main heater $S^1$, and are normally drawn transversely inwardly by a spring $S^{35}$. They not only heat the end wrapper laps, but also transversely position loaves under the main heater $S^1$. Similarly hinged and related to the cooler $S^{10}$, are loaf-end sealing plates $S^{15}$ adapted to similarly position loaves under it.

I supply compressed air to my heater $S^1$ and cooler $S^{10}$ through a pipe $S^{52}$, from an air compressor $S^{50}$, which is preferably a rotary one; and I drive the compressor by a belt connecting a pulley $S^{51}$ on its shaft with the pulley $D^{21}$ of the drive mechanism. I might locate the compressor on the omnibus and drive it electrically to avoid belting and a flexible section in the air pipe.

The operation of this part of my apparatus follows: When a newly wrapped loaf $b$ is ejected, at complete approach, from the chuck by the prior lever $w^{41}$ and ejector $w^{48}$, it is thereby positioned under the heater $S^1$, to be sealed, and the loaf pawls $w^{414}$ are extended behind it and prevent it from being stalled or drawn back; it is forced and wedged under the wrap-plates $w^{407}$ and elastic extension wrap-plates $w^{417}$, of the heater $S^1$ and between them and the cradle floor plate $S^{24}$ and wedges and rocks apart the heater $S^1$ and cradle $S^{20}$, overcoming (as much as may be necessary to its entrance between them) the elastic resistance of the said extension wrap-plates $w^{417}$ and of the springs $S^5$ and $S^{27}$, which respectively elastically position the heater and cradle and suspend the latter. When a loaf is positioned under the heater, as aforesaid, the lap of the wrapper on its inverted bottom is directly under the hot air outlets $S^{55}$ of the heater $S^1$, and the loaf end wrapper laps are adjacent to the end heaters $S^{201}$. The loaf remains thus positioned during a complete oscillation of the omnibus; and the rheostat is so adjusted that the amounts of electric current supplied to and of heat developed in the heaters $S^1$, $S^{101}$, during said oscillation, are just sufficient to melt the wax covering the laps of the wrapper; said laps being held tightly closed by the currents of air issuing from the hot-air openings $S^{55}$ and by pressure between the loaf and the heaters, due to the springs $S^5$, $S^{27}$. The loaf has no motion relatively to the heater and cradle during the recession of the omnibus or during the fore part of its next approach; but when it again draws near the chuck, the outer portions of the upright back of said loaf contact with and the loaf is stopped and positioned by the loaf-delivery plates $C^{89}$ (before described) and the approach of the omnibus co-acting with said loaf-delivery plates causes the heater $S^1$ and cradle $S^{20}$ to slide over said loaf, and positions it immediately beneath the cooler, where it remains and the package is sealed air-tight during an oscillation of the omnibus, as the melted wax covering its wrapper laps is cooled by the cooler and cold compressed air issuing from the air outlets $S^{55}$ in the latter. While a third loaf is being similarly ejected from the chuck, the loaf delivery plates $C^{89}$ serve as abutment for and stop and position the second and first loaves while an approach of the omnibus slides the heater over the third, the cooler over the second, and the tumble head $S^{40}$ under the first; whereupon the weight of the first loaf overcomes the spring support of the tumble head, which yields and allows the first loaf, wrapped and sealed, to fall into the delivery chute.

*Important Minor Devices.*

*Roll-mounting device.*—Fig. 1 illustrates an improved mode of transversely positioning the paper roll P. Its spindle, $P^2$, slides in a tube $P^{100}$, which has a fixed head, $P^{101}$ and an adjustable head $P^{102}$ on its opposite threaded end, both heads being adapted to enter, and having exterior positioning flanges $P^{103}$ adapted to position, the core $P^{104}$ of the paper roll. The tube $P^{100}$ is slid into and its adjustable head $P^{102}$ is screwed down against the roll core and the spindle $P^2$ is slipped into the tube $P^{100}$. The roll is then mounted in the slots $P^3$ of the arms $P^4$ and the positioning bolts $P^{105}$ are set to confine the roll $P^1$ revolubly in its proper transverse location.

*Paper-gripping teeth.*— My preferred form of co-acting teeth ($P^{30}$, $P^{33}$ of Fig. 7, $M^{21}$, $M^{22}$ of Fig. 28) comprise long, staggered teeth and rubber plates covering one set thereof. The width of the inter-tooth spaces exceeds the tooth-width by substantially or slightly more than twice the rubber plate thickness.

The approach of a pair of teeth is so adjusted that the teeth press the covering rubber plates somewhat into the inter-tooth spaces and corrugate the rubber and similarly corrugate paper which they grip, so that feed-stress in the paper is resisted and the paper held not only by the friction of its surfaces but also by its internal resistance to a change in the location of its corrugations.

*The frame.*—The bed plate $F^1$ constitutes the main assembling plate of my machine, on and from which the functioning members are suitably located, and at the same time its steadying element, said plate being rigid and heavy so that it may not only properly support said elements, but also that its vis-inertia may be so great that it may absorb and nullify tendencies to vibration, which might otherwise impair the precise and smooth operaton of my machine and make it noisy.

I mount the bed plate $F^1$ on a pipe frame of usual construction, specifically on its posts $F^{60}$ which may have bottom flanges for attaching the machine to a floor or foundation, or casters, if the machine is to be movable. The posts $F^{60}$ are connected by laterals $F^{61}$ and transversals $F^{62}$. The posterior transversal serves as a mounting bar and pivot for the starting-and-stopping lever $a$.

The anterior upper frame $F^2$, fastened to the bed plate $F^1$, supports the loaf chute $B^6$, and contains bearings or sockets for the conveyer idler $B^2$, the vise guide rods $V^1$ and the anterior ends of the guide rods $P^{26}$ of the paper feed and loaf-transfer mechanism $P^{13}$. The posterior upper frame $F^{20}$ contains bearings for the conveyer power shaft $B^1$ and is adapted to tighten the conveyer belt $B^4$, to that end being T-shaped, with set-bolts in its lower end and hinged by its stem to a posterior end-plate $F^{21}$, which is fastened to and the stem of which rests on the bed plate $F^1$ and which supports the paper roll arms $P^4$ and the posterior ends of the guide rods $P^{25}$.

All the members located below the bed plate (except the starting and stopping lever $a$) and the subordinate frame members or extensions on which such members may be directly mounted, are suspended from and located relatively to the bed plate by a massive, transverse, open beam $F^{50}$, whose flange or external members are angles $F^{51}$ and whose web or transverse members are my supplemental transmission frame $F^a$ (which is bolted to said flange members) and wide channels $F^{252}$, $F^{254}$ (before referred to), illustrated as fastened to the flange members but which might be integral therewith. The flange members $F^{51}$ have extended heads $F^{52}$ by which they are fastened to the bed plate $F^1$, and their lower ends are clamped to the laterals $F^{61}$, to thereby stiffen the pipe-frame $F^{60}$.

The operation of my wrapping machine (as a loaf wrapper) is as follows: Loaves are deposited on the conveyer belt $B^4$ transversely, with their tops anterior. Its motion charges the chute $B^6$ with them, wherein they are normally retained by the retainer $B^2$ of the latch $B^7$, which is the usual closing means of the open loaf chute (Fig. 6). Let us begin the cycle at the top of Figs. $5^a$ and $5^b$, which show the cam $D^{51}$ as nearing its apex and causing the completion of the posterior motions of the lever $D^{24}$ and paper feed and loaf transfer mechanism $P^{13}$, which latter, with a loaf on its loaf plate $P^{49}$, is approaching the position of Fig. 10, just about to enter the loaf in the vise V and to grasp the advanced edge of the roll paper $P$; show the cam $D^{41}$ as initiating the posterior swing of the lever $D^{26}$, the approach of the fourth-stage wrap-mechanism $w^{40}$ (Fig. 56) and soon to begin the retraction of the tuck mechanism $wt$ and the straining of and storage of energy in its spring $T^{33}$; and the cams $D^{42}$ and $D^{52}$ and the members actuated thereby inactive. At such times: Of the members actuated by the (reversed) cam $D^{52}$, the link $D^{27}$ rests, extended and elevated, the vise V is raised and its jaws are extended to receive the loaf on the loaf-plate $P^{39}$ (Fig. 17), the knife $K^1$ is locked in raised position, its cams $K^{13}$ act to cause (or permit) the elevation of the frame $M^4$ to full paper-release position (Fig. 22), and the auxiliary wrapper-adjusting mechanism $p$ is retracted and its spring $p^{10}$ strained: Of the members connected with the cam $D^{42}$, the lever $D^{25}$ rests retracted, the chuck C and third-stage wrap-mechanisms are depressed and closed (on a partly wrapped loaf, Figs. 42 and 43) and the tuck-timer $T^{51}$ is likewise depressed and ready to lock the tuck mechanism $wt$ (Fig. 53, Sheet 3). At such times the first and second stage wrap mechanism $w^1$ and $w^{26}$ are in their normal positions of rest (Figs. 6, 34, etc.), and the just-described inactivity obtains through nearly half the function cycle. As the cam $D^{51}$ approaches and reaches its apex, the lever $D^{24}$ completes its posterior swing, and the mechanism $P^{13}$ moves to and grasps the advanced edge of the roll paper $P$ (Fig. 10): the cam $D^{41}$ swings the lever $D^{26}$ posteriorly and initiates approach of the omnibus and permits spring-actuated approach of the prior lever $w^{41}$ (actuated by the spring $w^{83}$) during which it advances its wrap-plate $w^{47}$ upon the loaf and wrapper in the chuck C and makes the posterior bottom wrap; and all other functioning members remain inactive, as before described. After passing its apex, the cam $D^{51}$ causes the lever $D^{24}$ to swing anteriorly and the mechanism $P^{13}$ to grasp, and to begin to draw anteriorly, paper for a wrapper $P^w$; and at about the same time the approach of the prior lever ceases to be spring-actuated and until it reaches its apex, said cam $D^{41}$ (through the posterior swing of the lever $D^{26}$) continues such approach (now gear-driven); retracts the tuck-mechanism $wt$ and strains and stores energy in its spring $T^{33}$, and when said tuck-mechanism is fully retracted (its lock-and-release mechanism $T^{50}$ being then in its locking zone) the latch $T^{56}$ falls behind timing roller $T^{29}$ (which it has been riding) and locks the tuck-mechanism $wt$, retracted:—causes the omnibus $w^{401}$ to approach the loaf discharge plates $C^{89}$ and by their reaction, to (relatively) advance and position previously-wrapped loaves, from under heater $S^1$, where the wax covering the exposed laps of its wrapper is softened and melted, to the cooler $S^{19}$, where the wax of the wrapper laps previously softened in the heater is cooled and hardened and the wrapper thereby sealed air-tight, and a previously wrapped and sealed loaf from the cooler $S^{19}$ to the tumble-head $S^{40}$ and the delivery chute; and immediately subsequent to the just-described functions, causes the omnibus to trip and depress the anterior jaw extension $C^{34}$ of the chuck C and open it so that (at complete approach) the loaf therein can be ejected by the prior lever $w^{41}$ and its ejector $w^{48}$, and wedged and entered between the final wrap plate $w^{407}$ and the cradle floor plate $S^{24}$ the final wrap of the wrapper being thereby accomplished while the loaf is being placed under the heater. During the greater part of this period all the other functioning members remain inactive, as above described, but just prior to its completion the cam $D^{51}$ becomes inactive and the paper feed and loaf transfer mechanism $P^{13}$ rests and at the same instant the knife and vise operating cam $D^{52}$ becomes active, and, almost immediately thereafter, the cam $D^{41}$ becomes inactive and the chuck cam $D^{42}$ becomes active. During the first portion of its activity and almost before the cam $D^{41}$ becomes inactive, the vise and knife-operating cam $D^{52}$, by its operation of the link $D^{27}$, levers $M^2$ and connected members, causes the vise V to begin its descent and unlocks the knife K, which snaps down, its cams $K^{17}$ lower the frame $M^4$ and press its retainers upon and thereby lock the paper P while a wrapper is being cut off by the knife; and immediately thereafter the continuation of such cam-actuated motion lifts the knife $K^1$, and stores energy (to quicken its subsequent stroke) in its snap-springs, $K^{10}$; and at the apex of said cam $D^{52}$ said snap springs are fully strained and stored with energy and the knife is fully lifted and locked, ready for its subsequent stroke. During this part of the activity of said cam the vise descends, grasping an inverted loaf, and pushes its spheroidal top down upon the wrapper $P^w$ (the anterior edge of which is still gripped by the mechanism $P^{43}$), forces a loop thereof between the loaf-top and the first stage wrap rods $w^s$ and thereby draws the free posterior edge of the wrapper toward the loaf and positions them to one another; and the continuation of such motions causes the loaf-top to extrude said rods, which (relatively) roll upon and draw the wrapper about the loaf (Fig. 40).

When the posterior wrapper edge is sufficiently advanced, at an adjusted location in the downward vise-stroke, a member connected and moving therewith (the roller $p^1$) releases the spring-actuated auxiliary wrapper-adjusting mechanism $p$, which functions with the paper feed mechanism $P^{19}$ and causes it to fully release the wrapper (release its anterior edge), so that the positioned wrapper can be fed down with and enveloping the loaf. During the first part of the descent of the vise its stretchers $V^{24}$ are extended (Fig. 32) and their rounded lower edges $V^{25}$ press lightly on the wrapper. Somewhat following the middle of the vise-stroke, the wrapper, which envelops the loaf (Fig. 40) encounters the second-stage wrap plates $w^{21}$, which, actuated firstly by the wrapper and subsequently by the loaf-top, relatively thereto, move orbitally and roll upon and wipe the wrapper into conformity with the spheroidal loaf-top and its ends and coacting with the stretchers $V^{25}$, position and form the end-folds, as illustrated in Fig. 41. The activity of the cam $D^{42}$ quickly follows that of the cam $D^{52}$ and their apexes are substantially angularly-coincident. Therefore shortly after the vise V begins to descend the cam $D^{42}$ initiates the posterior swing of the lever $D^{25}$ and the ascent of the chuck C, and the successive contacts of the pincers cams $C^{23}$ and $C^{43}$ with the pin $C^{66}$, and of the corresponding rollers $w^{68}$ of the wrap-mechanisms $w^{60}$ with the spiral faces of the cams $W^1$, respectively, cause the chuck jaws to open the first and anterior and subsequently the posterior third stage wrap-mechanisms $w^{60}$ to be extended; and before its cam apex is reached and the chuck is fully raised, said mechanisms $w^{60}$ are fully extended and the vise V feeds the partly-wrapped loaf into the chuck C; and instantly, during the completion of the vise descent and chuck ascent, positions the (inverted) loaf with its bottom flush with the top edges of the chuck jaws and its top pressing down the loaf-support $C^{50}$, and at the same time the bottom edges of the pincers cams $C^{23}$, $C^{43}$, on the chuck jaws, pass the horizontal diameter of the cam-operating pin $C^{66}$, act on an upper chord thereof and depress it, so that said cams can pass over it (Fig. 46 and Fig. 47) and the chuck jaws close on and grasp the partly-wrapped loaf. During this period all other functioning elements rest save for the above described, slight wrapper-release motion of the mechanisms P and $P^{19}$. When the cams $D^{52}$ and $D^{51}$ pass their apexes and reverse the motions of their connected members, the vise ascends and the chuck descends. The vise becomes completely raised, (Fig. 6) when the chuck is about half lowered and during this period all other functioning elements rest. After the vise is fully raised and the cam $D^{52}$ becomes inactive, that $D^{51}$ becomes active and initiates the posterior swing of the lever $D^{14}$ and the like movement of the mechanism $P^5$, which moves toward the knife mechanism and advanced roll paper edge, with its grip jaws, $P^{21}$, $P^{33}$ open, and carrying on its loaf-plate $P^{39}$ an inverted loaf, which shortly begins to extend the vise-opening plates $V^{22}$ and the vise jaws, so that said loaf can enter the latter; and simultaneously, the upward swing of the levers $M^2$ causes the rollers $p^3$ connected therewith to coact with and retract the auxiliary wrapper-positioning mechanism $p$ and store energy in its spring $p^{21}$. During this period the cam $D^{42}$ causes continued anterior swing of the lever $D^{25}$, which idly moves the tuck-timer $T^{51}$ (which holds the tuck-mechanism $w^t$ locked retracted) and continues to lower the chuck C. During the last part of the chuck's descent the rollers $w^{68}$ (in posterior and anterior pairs) successively pass the vertical timing faces $W^{60}$ and $W^{62}$ of the cams $W^1$ and as said rollers function with the locked cam faces, first the posterior pair and immediately subsequently the anterior pair of third stage wrap-mechanisms $w^{60}$ are enabled to be functioned (by their springs), their wrap-plates $w^{37}$ (in successive posterior and anterior pairs) roll upon and wipe the wrapper and vertical loaf corners and ends, and advance the wrap to the stage illustrated in Fig. 58; and as such motions are nearly completed, the lever D²⁵ lowers the tuck timer T⁵¹ to its release position relatively to and releases the tuck mechanism wt, which is fed in by its actuating spring T³³ so that its wrap plates w³⁰⁷ can make the end tucks and advance the wrap to the stage illustrated in Fig. 59; from which it is advanced to completion and sealed and the wrapped and sealed loaf delivered to the delivery chute as hereinbefore described. When the chuck is fully lowered it is positioned truly central and vertical and its anterior L-plate C⁴¹ is fixed by contact between the posterior face of its cam C⁴³ and the positioning finger $j^{10}$.

It will be observed that my machine has characteristic and distinguishing general features in that (a) the movements of the wrap-mechanisms relatively to the loaf are orbital, rolling, following and wiping instead of bending motions as has hitherto been usual.

(b) Wherever it is desirable or necessary, in order to conform the wrapper closely to the loaf, such relative wrapping movements are universal or spherical motions (within limits); and such wrap mechanisms can therefore move and force the wrapper to any point within a spherical zone or sector, the boundaries of which constitute the limits of such motion.

(c) The wrap-mechanisms are flexibly or spring-supported and yielding relatively to the loaf.

(d) Their functioning positions are automatically properly located by it.

(e) The wrap-motions of the wrap-mechanisms relatively to the loaf are automatically induced and controlled by their coaction with its surfaces and the feed and traversing motions necessary to pass it through the machine.

(f) I apply the principle of limits.

Having thus described my invention, I claim:—

1. A wrapping machine comprising wrapper-supply means, unit supply means, unit-grasping and feeding means adapted to grasp a unit and wrapper and impart feed motion thereto, and wrapping means adapted to contact and co-act with such unit and wrapper grasped in said grasping means, and by contact with and the ensuing feed-motion of said unit and wrapper, to be wrappingly positioned relatively thereto, said wrapping means being flexibly supported so as to engage around the irregular corners of the unit being wrapped.

2. A wrapping machine comprising wrapper-supply means, unit supply means, unit-grasping and feeding means adapted to grasp a unit and wrapper and impart feed motion thereto, and wrapping means adapted to contact and coact with such unit and wrapper grasped in said grasping means, and by contact with and the ensuing feed-motion of said unit and wrapper, to be wrappingly positioned relatively thereto, said wrapping means being elastically supported so as to engage around the irregular corners of the unit being wrapped.

3. In a wrapping machine, a wrapping plate, the edges of which are free to facilitate the passage thereof into sharp corners formed by the wrapping paper, and flexible means on which said plate is mounted to facilitate the free movement of said plate to slide in a path directed by the wrapper being wrapped.

4. In a wrapping machine, a rigid wrapping plate, the edges of which are free, and flexible means on which said plate is mounted.

5. In a wrapping machine, a rigid wrapping plate, the edges of which are free to facilitate the passage thereof into the sharp corners formed by the wrapping paper, and a pivotally mounted means, said plate being pivotally connected to said pivotally mounted means to facilitate the free movement of said plate to slide in a path directed by the wrapper being wrapped.

6. In a wrapping machine, a wrapping element, and a universally pivotally movable bearing on which said wrapping element is mounted, the element being thereby adapted to move orbitally relatively to and in contact with the wrapper of the unit being wrapped to conform the wrapper to said unit.

7. In a wrapping machine, a wrapping element, a universally pivotally movable bearing on which said wrapping element is mounted, and flexible means for connecting said element to said bearing.

8. In a wrapping machine, a wrapping element, a universally pivotally movable bearing on which said wrapping element is mounted, and elastic means for connecting said elements to said bearing.

9. In a wrapping machine, a non-parallel and a plurality of parallel cylindrical supports whose axes serve as axes of revolution, and a wrapping element pivotally mounted on said axes and disposed, when wrapping, to travel in a path directed by the unit being wrapped to conform to such unit.

10. In a wrapping machine, a non-parallel and a plurality of parallel cylindrical supports whose axes serve as axes of revolution, and a wrapping element pivotally mounted and flexibly supported on said axes and disposed, when wrapping, to travel in a path directed by the unit being wrapped to conform to such unit.

11. In a wrapping machine, a non-parallel and a plurality of parallel cylindrical supports whose axes serve as axes of revolution, and a wrapping element pivotally mounted and elastically supported on said axes and disposed, when wrapping, to travel in a path directed by the unit being wrapped to conform to such unit.

12. In a wrapping machine, a plurality of cylindrical supports adapted to serve as axes of revolution, a rigid wrapping plate pivotally mounted on said axes and disposed, relatively to a unit being wrapped, to slide about said unit in a path directed thereby, to conform a wrapper thereto.

13. In a wrapping machine, a plurality of cylindrical supports adapted to serve as axes of revolution, a rigid wrapping plate flexibly supported on said axes and disposed, relatively to a unit being wrapped, to slide about said unit in a path directed by such unit, to conform a wrapper thereto.

14. In a wrapping machine, a plurality of cylindrical supports adapted to serve as axes of revolution, a rigid wrapping plate elastically supported on said axes and disposed, relatively to a unit being wrapped, to slide about said unit in a path directed thereby, to conform a wrapper thereto.

15. In a wrapping machine, a non-parallel and a plurality of parallel cylindrical supports whose axes serve as axes of revolution, and a wrapping element pivotally mounted on said axes and disposed to travel in a path directed by a unit being wrapped, to roll about said unit, to conform a wrapper thereto.

16. In a wrapping machine, a non-parallel and a plurality of parallel cylindrical supports whose axes serve as axes of revolution, and a wrapping element pivotally mounted and flexibly supported on said axes and disposed to travel in a path directed by a unit being wrapped, to roll about said unit, to conform a wrapper thereto.

17. In a wrapping machine, a non-parallel and a plurality of parallel cylindrical supports whose axes serve as axes of revolution, and a wrapping element pivotally mounted and elastically supported on said axes and disposed to travel in a path directed by a unit being wrapped, to roll about said unit, to conform a wrapper thereto.

18. In a wrapping machine, a plurality of cylindrical supports whose axes serve as axes of revolution, a rigid wrapping element pivotally mounted on said axes and disposed to travel in a path directed by a unit being wrapped, into a conforming motion about the surface of said unit, to conform a wrapper thereto.

19. In a wrapping machine, a plurality of cylindrical supports whose axes serve as axes of revolution, a rigid wrapping element flexibly supported on said axes and disposed to travel in a path directed by a unit being wrapped, into a conforming motion about the surface of said unit, to conform a wrapper thereto.

20. In a wrapping machine, a plurality of cylindrical supports whose axes serve as axes of revolution, a rigid wrapping element elastically supported on said axes and disposed to travel in a path directed by a unit being wrapped, into a conforming motion about the surface of said unit, to conform a wrapper thereto.

21. In a wrapping machine, a non-parallel and a plurality of parallel cylindrical supports whose axes serve as axes of revolution, and a wrapping element pivotally mounted in said axes and disposed to travel in a path directed by a unit being wrapped, into a conforming motion about the surface of said unit, to conform a wrapper thereto.

22. In a wrapping machine, a non-parallel and a plurality of parallel cylindrical supports whose axes serve as axes of revolution, and a wrapping element pivotally mounted and flexibly supported on said axes and disposed to travel in a path directed by a unit being wrapped, into a conforming motion about the surface of said unit, to conform a wrapper thereto.

23. In a wrapping machine, a non-parallel and a plurality of parallel cylindrical supports whose axes serve as axes of revolution, and a wrapping element pivotally mounted and elastically supported on said axes and disposed to travel in a path directed by a unit being wrapped, into a conforming motion about the surface of said unit, to conform a wrapper thereto.

24. In a wrapping machine, a pivotally mounted rigid wrapper element, an elastical supporting means for supporting said wrapper element to co-act with a unit being wrapped to successively locate and relatively thereto, to revolve about instantaneous centers of revolution of the surface of said unit, to conform a wrapper thereto.

25. In a wrapping machine, a plurality of cylindrical supports whose axes serve as axes of revolution, a rigid wrapping element pivotally mounted on said axes and disposed thereby to co-act with a unit being wrapped to successively locate and relatively thereto, to revolve about instantaneous centers of revolution of the surface of said unit, to conform a wrapper thereto.

26. In a wrapping machine, a plurality of cylindrical supports whose axes serve as axes of revolution, a rigid wrapping element flexibly supported on said axes and disposed thereby to co-act with a unit being wrapped to successively locate and relatively thereto, to revolve about instantaneous centers of revolution of the surface of said unit, to conform a wrapper thereto.

27. In a wrapping machine, a plurality of cylindrical supports whose axes serves as axes of revolution, a rigid wrapping element elastically supported on said axes and disposed thereby to co-act with a unit being wrapped to successively locate and relatively thereto, to revolve about instantaneous centers of revolution of the surface of said unit, to conform a wrapper thereto.

28. In a wrapping machine, a non-parallel and a plurality of parallel cylindrical supports whose axes serve as axes of revolution, and a wrapping element pivotally mounted on said axes and disposed thereby to coact with and be directed by a unit being wrapped to successively locate and relatively thereto, to revolve about instantaneous centers of revolution of the surface of said unit, to conform a wrapper thereto.

29. In a wrapping machine, a non-parallel and a plurality of parallel cylindrical supports whose axes serve as axes of revolution, and a wrapping element pivotally mounted and flexibly supported on said axes and disposed thereby to co-act with a unit being wrapped to successively locate and relatively thereto, to revolve about instantaneous centers of revolution of the surface of said unit, to conform a wrapper thereto.

30. In a wrapping machine, a non-parallel and a plurality of parallel cylindrical supports whose axes serve as axes of revolution, and a wrapping element pivotally mounted and elastically supported on said axes and disposed thereby to co-act with a unit being wrapped to successively locate and relatively thereto, to revolve about instantaneous centers of revolution of the surface of said unit, to conform a wrapper thereto.

31. In a wrapping machine, a trammel motion element and a wrapping element mounted on said trammel element, and disposed to travel in a path directed by and about a unit being wrapped, to conform a wrapper thereto.

32. In a wrapping machine, a universal motion trammel element and a wrapping element mounted thereon and thereby directed in a path of movement to conform its motions to the surface of a unit being wrapped, to conform a wrapper thereto.

33. In a wrapping machine, wrapper supply means, unit supply means, unit-grasping and feeding means, wrapping means, and a transmission mechanism adapted to transmit power, the combination therewith of an automatic limit mechanism connected with said transmission and adapted to automatically limit the power-delivery to a predetermined maximum.

34. In combination with a wrapping machine comprising unit supply means, wrapping means and paper supply means, an automatic and compensating stress limiting mechanism connected with the paper supply means, said mechanism comprising a shaft on which the paper is wound, two parallel members pivotally connected to said shaft and independent of one another, a weighted member slidably mounted on said parallel members, the paper from said roll before passing to the unit to be wrapped extending under and over said weighted member.

35. In combination with a wrapping machine comprising unit supply means, wrapping means and paper supply means, an automatic and compensating stress limiting mechanism connected with the paper supply means, said mechanism comprising a shaft on which the paper is wound, two parallel members pivotally connected to said shaft and independent of one another, a tension roll slidably mounted on said parallel members, the paper from said roll before passing to the unit to be wrapped extending under and over said weighted member.

36. A wrapping machine comprising a transmission, unit supply means, unit grasping and feeding means, wrapping means, paper supply means adapted to supply paper for wrappers from a roll of paper, wrapper-cutting means adapted to cut wrappers from the roll of paper, paper-feed means adapted to feed the roll paper to its place of use, and an adjustable limit and timing mechanism connected with the wrapper-cutting means and adapted to limit and time the act of wrapper-cutting in the function cycle of the machine.

37. A wrapping machine comprising a transmission, unit supply means, unit grasping and feeding means, wrapping means, paper supply means adapted to supply paper for wrappers from a roll of paper, wrapper-cutting means adapted to cut wrappers from the roll of paper, paper-feed means adapted to feed the roll paper to its place of use, and an adjustable limit and adjusting mechanism connected with the paper-feed means and adapted to limit and adjust the feed of the paper feed means and the lengths of wrappers.

38. A wrapping machine comprising a transmission, unit supply means, unit grasping and feeding means, wrapping means, paper supply means adapted to supply paper for wrappers from a roll of paper, wrapper-cutting means adapted to cut wrappers from the roll paper, paper-feed means adapted to feed the roll paper to its place of use, and a limit and positioning mechanism connected with the paper-feed means and adapted to limit and position the stroke of the paper feed means relatively to the cutting plane of the wrapper cutting means.

39. A wrapping machine comprising a transmission, unit supply means, unit grasping and feeding means, wrapping means, paper supply means adapted to supply paper for wrappers from a roll of paper, wrapper-cutting means adapted to cut wrappers from the roll paper, paper-feed means adapted to feed the roll paper to its place of use, and wrapper-lap positioning means operably connected with the unit grasping and feeding means and the paper feed means, and adapted to position a lap of the wrapper on the unit.

40. A wrapping machine comprising a transmission, unit supply means, unit grasping and feeding means, wrapping means, paper supply means adapted to supply paper for wrappers from a roll of paper, wrapper-cutting means adapted to cut wrappers from the roll paper, paper-feed means adapted to feed the roll paper to its place of use, and an adjustable limit and positioning means operably connected with the paper feed means and adapted to limit and position the anterior position of rest thereof.

41. A wrapping machine comprising a transmission, unit supply means, wrapping means, paper supply means adapted to supply paper for wrappers from a roll of paper, wrapper-cutting means adapted to cut wrappers from the roll paper, paper-feed means adapted to feed the roll paper to its place of use, a pair of oppositely located unit-grasping and feeding means, and limit and positioning mechanism adapted to limit and locate the motions of said unit grasping and feeding means.

42. A wrapping machine comprising a plurality of mechanisms adapted to function severally and to co-act in successive stages of wrapping a unit, and an adjustable limit apparatus connected with one of said mechanisms and adapted to compensate variations in units to be wrapped.

43. A wrapping machine comprising a plurality of mechanisms adapted to function severally, and to co-act in successive stages of wrapping a unit, and a plurality of adjustable limit apparatuses severally connected with one or more of said mechanisms and adapted to compensate variations in units to be wrapped.

44. In combination with a wrapping machine, a mechanism having a member driven by power, an energy-storage spring adapted to be strained by said directly-driven member, a spring-actuated member operably connected with and adapted to be actuated by said spring, a returning gearing between said power driven member and said spring-actuated member adapted to return it to the position from which the spring moves it, and spring-retaining and release apparatus adapted to retain the strained spring and subsequently release it.

45. In combination with a wrapping machine, a mechanism having a member driven by power, an energy-storage spring adapted to be strained by said directly-driven member, a spring-actuated member operably connected with and adapted to be actuated by said spring, a returning and controlling gearing between said power driven member and said spring-actuated member adapted to return it to the position from which the spring moves it and to control its spring actuated motion, and spring-retaining and release apparatus adapted to retain the strained spring and subsequently release it.

46. In combination with a wrapping machine, a tucking mechanism having a member driven by power, an energy-storage spring adapted to be strained by said directly-driven member, a spring-actuated member operably connected with and adapted to be actuated by said spring, a returning gearing between said power driven member and said spring-actuated member adapted to return it to the position from which the spring moves it, and spring-retaining and release apparatus operably connected with a power-driven member other than that which returns the spring-actuated member and adapted to retain the strained spring and subsequently release it.

47. In combination with a wrapping machine, a wrapping mechanism having a member driven by power, an energy-storage spring adapted to be strained by said directly-driven member, a spring-actuated member operably connected with and adapted to be actuated by said spring through a part of one of its motions, said power-driven and spring actuated member having approach and recession motions relatively to one another, a returning and spring-straining gearing connecting said members and adapted to strain said spring and return the spring-actuated member, a supplemental oppositely-acting gearing connecting said members and adapted to cause a movement of said spring-actuated member supplemental to that caused by the spring in, and together therewith to complete, one of said motions of the spring-actuated member, and spring-retaining and release apparatus adapted to retain the strained spring and to subsequently release it.

48. In combination with a wrapping machine, a wrapping mechanism having a member driven by power, an energy-storage spring adapted to be strained by said directly-driven member, a spring-actuated member operably connected with and adapted to be actuated by said spring through a part of one of its motions, said power-driven and spring-actuated members having approach and recession motions relatively to one another, a returning and spring-straining gearing connecting said members and adapted to strain said spring and return the spring-actuated member, a supplemental oppositely-acting gearing connecting said members and adapted to cause a movement of said spring-actuated member supplemental to that caused by the spring in, and together therewith to complete, one of said motions of the spring-actuated member, and spring-retaining and release apparatus operably connected with a power-driven member other than that which returns said spring-actuated member and adapted to retain the strained spring and to subsequently release it.

49. In combination with a wrapping machine, a series of power driven members for actuating cutting, wrapping and tucking mechanisms of said wrapping machine, a series of energy-storage springs adapted to be severally strained by directly driven members, a series of spring-actuated members severally operably connected with and adapted to be actuated severally and successively by said springs, returning gearing between spring-actuated directly driven members, and spring-retaining and release apparatus adapted to retain each of said springs when strained and to release them successively.

50. In combination with a wrapping machine, a cam actuated by power, a cam driven member, an energy-storage spring adapted to be strained by said cam-driven member, a spring-actuated member operably connected with and adapted to be actuated by said spring, a returning gearing between said power driven member and said spring-actuated member adapted to return the latter to the position from which the spring moves it, and spring-retaining and release apparatus adapted to retain the strained spring and to subsequently release it.

51. In combination with a wrapping machine, a series of power driven members for actuating the cutting, wrapping and tucking mechanism of said wrapping machine, a cam actuated by power, a cam driven member, an energy-storage spring adapted to be strained by said cam-driven member, a spring actuated member operably connected with and adapted to be actuated by said spring, a returning and controlling gearing between said power driven member and said spring-actuated member adapted to return it to the position from which the spring moves it and to control its spring actuated motion, and spring-retaining and release apparatus adapted to retain the strained spring and subsequently release it.

52. The combination with a wrapping machine, of a tucking mechanism, a cam actuated by power, a member driven by said cam and connected to said tucking mechanism, an energy-storage spring adapted to be strained by said cam-driven member, a spring-actuated member operably connected with and adapted to be actuated by said spring, a returning gearing between said power driven member and said spring-actuated member adapted to return the latter to the position from which the spring moves it, and spring-retaining and release apparatus operably connected with a power-driven member other than that which returns the spring-actuated member and adapted to retain the strained spring and subsequently release it.

53. The combination with a wrapping machine, of a wrapping mechanism, a cam actuated by power, a member driven by said cam and connected to said wrapping mechanism, an energy-storage spring adapted to be strained by said cam-driven member, a spring-actuated member operably connected with and adapted to be actuated by said spring through a part of one of its motions, said power-driven and spring-actuated members having approach and recession motions relatively to one another, a returning and spring-straining gearing connecting said members and adapted to strain said spring and return the spring-actuated member, a supplemental oppositely-acting gearing connecting said members and adapted to cause a movement of said spring-actuated member supplemental to that caused by the spring in, and together therewith to complete, one of said motions of the spring-actuated member, and spring-retaining and release apparatus adapted to retain the strained spring and to subsequently release it.

54. The combination with a wrapping machine, of a wrapping mechanism, a cam actuated by power, a member driven by said cam and connected to said wrapping mechanism, an energy-storage spring adapted to be strained by said cam-driven member, a spring-actuated member operably connected with and adapted to be actuated by said spring through a part of one of its motions, said power-driven and spring-actuated members having approach and recessing motions relatively to one another, a returning and spring-straining gearing connecting said members and adapted to strain said spring and return the spring-actuated member, a supplemental oppositely-acting gearing connecting said members and adapted to cause a movement of said spring-actuated member supplemental to that caused by the spring in and together therewith to complete one of said motions of the spring-actuated member, and spring-retaining and release apparatus operably connected with a power-driven member other than that which returns the spring-actuated member and adapted to retain the strained spring and to subsequently release it.

55. A wrapping mechanism comprising wrapper-supply means, unit-supply means, unit grasping and feeding means, and wrapping means; said wrapping means comprising a series of wrapping members each adapted to be functioned by a feed-motion of the unit-grasping means; said grasping means comprising a primary grasping member having feed and return motions and a secondary grasping member located opposite, and having feed and return motions opposite to like motions of, the primary; the unit-supply means adapted to supply units to and locate them in the primary and the wrapper - supply means adapted to locate wrappers across the traverse of the primary; wrapping elements of said series located in the traverse of said primary and adapted to co-act with a unit therein and with a wrapper; wrapping elements mounted on said secondary and adapted to be functioned by the movements thereof; the primary adapted to feed a unit to the secondary and the secondary to grasp said unit and withdraw it from the primary; actuating means to actuate the several supply and unit-grasping means, and ejecting means adapted to eject a unit from the secondary.

56. A wrapping mechanism comprising wrapper-supply means, unit-supply means, unit-grasping and feeding means, and wrapping means; said wrapping means comprising a series of flexibly supported wrapping members each adapted to be functioned by a feed-motion of the unit-grasping means; said grasping means comprising a primary grasping member having feed and return motions and a secondary grasping member located opposite, and having feed and return motions opposite to like motions of, the primary; the unit-supply means adapted to supply units to and locate them in the primary and the wrapper-supply means adapted to locate wrappers across the traverse of the primary; flexibly supported wrapping elements of said series located in the traverse of said primary and adapted to co-act with a unit therein and with a wrapper; flexibly supported wrapping elements mounted on said secondary and adapted to be functioned by the movements thereof; the primary adapted to feed a unit to the secondary and the secondary to grasp said unit and withdraw it from the primary; actuating means to actuate the several supply and unit-grasping means, and ejecting means adapted to eject a unit from the secondary.

57. A wrapping mechanism comprising wrapper-supply means, unit-supply means, unit-grasping and feeding means, and wrapping means; said wrapping means comprising a series of elastically supported wrapping members each adapted to be functioned by a feed-motion of the unit-grasping means; said grasping means comprising a primary grasping member having feed and return motions and a secondary grasping member located opposite, and having feed and return motions opposite to like motions of, the primary; the unit-supply means adapted to supply units to and locate them in the primary and the wrapper-supply means adapted to locate wrappers across the traverse of the primary; elastically supported wrapping elements of said series located in the traverse of said primary and adapted to co-act with a unit therein and with a wrapper; elastically supported wrapping elements mounted on said secondary and adapted to be functioned by the movements thereof; the primary adapted to feed a unit to the secondary and the secondary to grasp said unit and withdraw it from the primary; actuating means to actuate the several supply and unit-grasping means, and ejecting means adapted to eject a unit from the secondary.

58. A wrapping machine comprising wrapper-supply means, unit-supply means, unit-grasping and feeding means, and wrapping means; said wrapping means comprising a series of wrapping members each adapted to be functioned by a feed-motion of the unit-grasping means; said grasping means comprising a primary grasping member having feed and return motions and a secondary grasping member located opposite, and having feed and return motions opposite to like motions of, the primary; the unit-supply means adapted to supply units to and locate them in the primary and the wrapper supply means adapted to locate wrappers across the traverse of the primary; wrapping elements of said series located in the traverse of said primary and adapted to co-act with a unit therein and with a wrapper; wrapping elements mounted on said secondary adapted to be functioned by the movements thereof; the primary adapted to feed a unit to the secondary; an opening and closing member connected with the secondary and adapted to be closed and grasp a unit and to hold it while it is withdrawn from the primary and to be opened to permit it to be ejected from the secondary; actuating means to actuate the several supply and unit-grasping means, and ejecting means adapted to eject a unit from the secondary.

59. A wrapping machine comprising wrapper-supply means, unit-supply means, unit-grasping and feeding means, and wrapping means; said wrapping means comprising a series of wrapping members each adapted to be functioned by a feed-motion of the unit-grasping means; said grasping means comprising a primary grasping member having feed and return motions and a secondary grasping member located opposite, and having feed and return motions opposite to like motions of, the primary; the unit-supply means adapted to supply units to and locate them in the primary and the wrapper supply means adapted to locate wrappers across the traverse of the primary; wrapping elements of said series located in the traverse of said primary and adapted to co-act with a unit therein and with a wrapper; wrapping elements mounted on said secondary and adapted to be functioned by the movements thereof; the primary adapted to feed a unit to the secondary; an opening and closing member connected with the secondary and adapted to be closed and grasp a unit and to hold it while it is withdrawn from the primary and to be opened to permit it to be ejected from the secondary; operating means to operate said opening and closing member, final wrapping means anterior to said secondary grasping member, operating means adapted to operate the said opening and closing member, ejecting means adapted to eject a unit from the secondary grasping member and connected with and operable by the final wrapping means, and actuating means to actuate the several supply and unit-grasping members and the final wrapping means.

60. A wrapping machine comprising wrapper-supply means, unit-supply means, unit-grasping and feeding means, and wrapping means; said wrapping means comprising a series of wrapping members each adapted to be functioned by a feed-motion of the unit-grasping means; said grasping means comprising a primary grasping member having feed and return motions and a secondary grasping member located opposite, and having feed and return motions opposite to like motions of, the primary; the unit-supply means adapted to supply units to and locate them in the primary and the wrapper-supply means adapted to locate wrappers across the traverse of the primary; wrapping elements of said series located in the traverse of said primary and adapted to co-act with a unit therein and with a wrapper; wrapping elements mounted on said secondary and adapted to be functioned by the movements thereof; the primary adapted to feed a unit to the secondary; an opening and closing member connected with the secondary and adapted to be closed and grasp a unit and to hold it while it is withdrawn from the primary and to be opened to permit it to be ejected from the secondary; operating means to operate said opening and closing member, final wrapping means anterior to said secondary grasping member, sealing means anterior to said final wrapping means and adapted to seal the laps of the wrapper, ejecting means adopted to eject a unit from the secondary grasping member and connected with and operable by the final wrapping means, and actuating means to actuate the several supply and unit-grasping members and the final wrapping means.

61. In a wrapping machine, unit-supply means comprising an open-ended chute adapted to contain units, an elastic wall section thereof adapted to position units therein, chute-closing means movably connected with the delivery end of said chute, a unit carrier adapted to extrude and replace said chute closing means, and means to actuate said carrier.

62. In a wrapping machine, unit-supply means comprising an open-ended chute adapted to contain units, an elastic wall section thereof adapted to position units therein, chute-closing means movably connected with the delivery end of said chute, an elastic unit-retaining member on said closing means adapted to retain upper loaves in the chute when said closing means is extruded, a unit carrier adapted to extrude and replace said chute closing means, and means to actuate said carrier.

63. In a wrapping machine, a unit carrier, means to actuate said carrier, unit-grasping and feeding means, elastically closable jaws thereon, and jaw-opening members operably connected with said jaws and operable by a unit on said carrier to open said jaws and position said unit between them.

64. In a wrapping machine, a unit carrier, means to actuate said carrier, unit-grasping and feeding means, elastically closable jaws thereon, and jaw-opening members operably connected with and converging toward said jaws and hinged at their opposite ends and operable by a unit on said carrier to open said jaws and position said unit between them.

65. In a wrapping machine, a unit carrier, means to actuate said carrier, unit-grasping and feeding means, elastically closable jaws thereon, jaw-opening members operably connected with and converging toward said jaws and hinged at their opposite ends and operable by a unit on said carrier to open said jaws and position said unit between them, a positioning plate parallel with the motion of the carrier and extending across the unit-grasping means, and a stop-flange on said plate adjacent to said unit-grasping means.

66. In a wrapping machine, a unit-grasping and feeding member, oppositely-located and movable jaws on said grasping member, and wrapper-stretching means operably connected with said jaws, said wrapper stretching means each comprising two parallel folding members disposed perpendicularly to the unit being wrapped, and an intermediate plate member perpendicular to the planes of said parallel members and adapted to operate between them.

67. In a wrapping machine, a unit-grasping and feeding member, oppositely-located and movable jaws on said grasping member, and wrapper-stretching means, said wrapper stretching means each comprising two parallel plate members pivotally mounted on said jaws, and an intermediate plate member disposed perpendicularly to the planes of said parallel members and alongside of the path of movement of said jaws to operate between said parallel members.

68. In a wrapping machine, a unit-grasping and feeding member, oppositely-located and movable jaws on said grasping member, and wrapper-stretching means, said wrapper-stretching means each comprising a pair of folding members disposed perpendicularly to the unit being wrapped and flexibly supported and pivotally mounted on said jaws, and an intermediate folding member disposed alongside of the path of movement of said jaws to operate between said pair of folding members.

69. In a wrapping machine, a unit-grasping and feeding member, oppositely-located and movable jaws on said grasping member, and wrapper-stretching means, said wrapper-stretching means each comprising a pair of folding members disposed perpendicularly to the unit being wrapped and elastically supported and pivotally mounted on said jaws, and an intermediate folding member disposed alongside of the path of movement of said jaws to operate between said pair of folding members.

70. In a wrapping machine, power-supply means, wrapping means, unit-grasping means, unit-grasping and feeding means, a primary unit-grasping and feeding member and a secondary unit-grasping and feeding member in said unit-grasping means, said primary and secondary members oppositely located and having opposite feed and return motions, movable jaws on said primary member, jaws on the secondary member movable in a direction perpendicular to the motion of the jaws of the primary member, one jaw member of the secondary member having an opening motion to permit the ejection of a unit from said secondary member and a closing and unit-grasping motion, and means to operate said opening-and-closing jaw member.

71. In a wrapping machine, a unit-grasping and feeding member having feed and return motions, pivotally-mounted elastically-supported jaw members thereon, universally pivotally-mounted elastically-supported wrapping members mounted on said jaws, and means to operate said jaw and wrapping members.

72. In a wrapping machine, a unit-grasping and feeding member having feed and return motions, movable jaw members thereon, wrapping members mounted on said jaws, a universal mounting for each of said wrapping members comprising three intersecting axes of revolution, and means to operate said jaw and wrapping members.

73. In a wrapping machine, a unit-grasping and feeding member having feed and return motions and comprising a carrier, jaw members pivotally mounted thereon, a jaw member having an opening motion to permit the ejection of a unit and a closing and unit-grasping motion, a jaw-operating cam connected with each of said jaw members, a plurality of universal-joint mountings connected with said jaw members, a like plurality of wrapping members each mounted on one of said universal joints, cams adapted to co-act with and cause the operation of said wrapping members, cam-operating means adapted to co-act with and cause the operation of the cams on said jaw members, means to operate the opening and closing jaw member, and means to impart motion to said unit-grasping and feeding member.

74. In a wrapping machine, a unit-grasping and feeding member having feed and return motions and comprising a carrier, a base mounted thereon, spring-closable jaw members pivotally mounted thereon, limit bolts adjustably connecting said base and each jaw member, a spring-closable opening and closing extension pivotally mounted on one of said jaw members, a spring-retained latch adapted to engage said opening and closing jaw extension, an axis of revolution at each end of each jaw member and perpendicular to the mounting axis thereof, a fork mounted on each of said axes of revolution, and, relatively thereto, a non-parallel axis in each of said forks, a wrapping member mounted on each of the last named axes, cams connected with the jaw members, jaw-cam operating means, cams operably connected with the wrapping members, means to open and close the opening-and-closing jaw extension, and means to operate the unit grasping and feeding member.

75. In a wrapping machine, a unit-grasping and feeding member having feed and return motions, operating means adapted to impart such motion thereto, tuck members having approach and recession motions relatively to said unit grasping member, means to operate said tuck members, and a lock and release means operably connected with said tuck members and with the operating means of the unit-grasping member and adapted to lock and release the former and to be timed by the latter.

76. In a wrapping machine, a unit-grasping and feeding member having feed and return motions, operating means adapted to impart such motion thereto, tuck members having approach and recession motions relatively to said unit-grasping member, means to operate said tuck members, an energy-storing spring connected therewith and with said tuck-members, lock-and-release means operably connected with said tuck-members and adapted to lock them receded and the spring strained, and a release-timing member operably connected with the unit-grasping member.

77. In a wrapping machine, a unit-grasping and feeding member having feed and return motions, operating means adapted to impart such motion thereto, a movable opening and closing jaw member on said unit-grasping member, wrapping members on opposite sides of and having opposite approach and recession motions relatively to said unit-grasping member, a unit ejector on the wrapping member opposite to said movable jaw member and, on the wrapping member adjacent thereto, jaw-operating means adapted to operate said movable jaw member, and unit-supporting means adapted to receive and support units.

78. In a wrapping machine, a unit-grasping and feeding member having feed and return motions, operating means adapted to impart such motions thereto, a movable opening and closing jaw-member on said unit-grasping member, tuck members on opposite sides of and having approach and recession motions relatively to said unit-grasping member, means to operate said tuck members, and at right angles therewith wrapping members on opposite sides of and having opposite approach and recession motions relatively to said unit-grasping member, a unit-ejector on the wrapping member opposite to said movable jaw-member and, on the wrapping member adjacent thereto, jaw-operating means adapted to operate said movable jaw member, and unit-supporting means adapted to receive and support units.

79. In a wrapping machine, a unit-grasping and feeding member having feed and return motions, operating means adapted to impart such motions thereto, a movable opening and closing jaw-member on said unit-grasping member, locking and timing means connected therewith and adapted to lock said movable jaw open and to time its closing, wrapping members on opposite sides of and having opposite approach and recession motions relatively to said unit-grasping member, a unit-ejector on the wrapping member opposite to said movable jaw-member and, on the wrapping member adjacent thereto, jaw-operating means adapted to operate said movable jaw member, and unit-supporting means adapted to receive and support units.

80. In a wrapping machine, a unit-grasping and feeding member having feed and return motions, operating means adapted to impart such motions thereto, wrapping members pivotally mounted on said unit-grasping member, unit-delivery means connected therewith, a movable opening and closing jaw-member on said unit-grasping member, wrapping members at opposite sides of and having opposite approach and recession motions relatively to said unit-grasping member, a unit-ejector on the wrapping member opposite to said movable jaw-member and, on the wrapping member adjacent thereto, jaw-operating means adapted to operate said movable jaw member, and unit-supporting means adapted to receive and support units.

81. In a wrapping machine, a unit-grasping and feeding member having feed and return motions, operating means adapted to impart such motions thereto, wrapping members pivotally mounted on said unit-grasping member, unit-delivery means connected therewith, a movable opening-and-closing jaw-member on said unit-grasping member, tuck members on opposite sides of and having approach and recession motions relatively to said unit-grasping member, means to operate said tuck members, and at right angles therewith wrapping members at opposite sides of and having opposite approach and recession motions relatively to said unit-grasping member, a unit-ejector on the wrapping member opposite to said movable jaw-member and, on the wrapping member adjacent thereto, jaw-operating means adapted to operate said movable jaw member, and unit-supporting means adapted to receive and support units.

82. In a wrapping machine, a unit-grasping and feeding member having feed and return motions, operating means adapted to impart such motions thereto, a movable opening and closing jaw-member on said unit-grasping member, a unit-ejector adapted to eject units from said unit-grasping member, a final-stage wrapping member having approach and recession motions relatively to said unit-grasping member and, on said wrapping member, jaw-operating means adapted to operate said movable jaw-member, unit-supporting means adapted to receive and support units, and sealing means adapted to seal the wrappers of units.

83. In a wrapping machine, a movable final wrapping member, a heater rockably mounted and spring-retained thereon, a unit-supporting member rockably mounted and spring-retained in operative position to co-act with said heater to grasp wrapped units, unit-delivery means adapted to co-act with said wrapping member to feed and position units relatively to said heater, and to extrude them therefrom, and means to operate said wrapping member.

84. In a wrapping machine, a movable final wrapping member, a heater rockably mounted and spring-retained thereon, a cooler, a unit-supporting member rockably mounted and spring-retained in operative position to co-act with said heater to grasp wrapped units, unit-delivery means adapted to co-act with said wrapping member to feed and position units relatively to said heater and cooler and to extrude them therefrom, and means to operate said wrapping member.

85. In a wrapping machine, a movable final wrapping member, a heater rockably mounted and spring-retained thereon, a unit-supporting member rockably mounted and spring-retained in operative position to co-act with said heater to grasp wrapped units, a tumble-head flexibly mounted thereon, unit-delivery means adapted to co-act with said wrapping member to feed and position units relatively to said heater and to extrude them therefrom, and means to operate said wrapping member.

86. In a wrapping machine adapted to wrap and seal units in waxed wrappers, sealing means comprising means to supply compressed air, a heater adapted to heat compressed air and direct it through outlets upon a determined portion of the lap of the wrappers of wrapped units to soften the wax thereon, a cooler adapted to subsequently direct unheated compressed air through outlets thereupon to harden the wax and seal the package, and unit-delivery means adapted to feed and position wrapped units relatively to the air outlets of and to extrude them from said heater and cooler.

87. In a wrapping machine, a heater comprising a metal envelop, mounting arms thereon, a heating element comprising a refractory plate and resistance-coils, a baffle plate in said heater, a compressed air inlet in its envelop and compressed air outlets in its face-plate, a source of compressed air connected with said heater, a source of electric energy connected with said coils, and unit-delivery means adapted to feed and position units relatively to the air outlets and to extrude them from the heater.

88. In a wrapping machine, a heater comprising a metal envelop, mounting arms thereon, a face-plate, an extension thereof constituting a wrap-plate, and a unit-retaining pawl hinged on said extension, a heating element comprising a refractory plate and resistance-coils, a baffle plate in said heater, a compressed air inlet in its envelop and compressed air outlets in its face-plate, a source of compressed air connected with said heater, a source of electric energy connected with said coils, and unit-delivery means adapted to feed and position units relatively to the air outlets and to extrude them from the heater.

89. In a wrapping machine, a heater comprising an envelop, a face-plate, and a face-plate extension constituting a wrap-plate, a unit retaining pawl on said extension, a heating element comprising a refractory plate and resistance coils and adapted to be connected with a source of electric energy and unit-delivery means adapted to feed and position units relatively to and to extrude them from said heater.

90. In a wrapping machine, a plurality of non-parallel cylindrical supports whose axes serve as axes of revolution and a wrapping element pivotally mounted on said axes and disposed to travel in a path directed by, and conforming to a unit being wrapped.

91. In a wrapping machine, a plurality of non-parallel cylindrical supports whose axes serve as axes of revolution and a wrapping element pivotally mounted and flexibly supported on and revoluble about all of said axes simultaneously and adapted to move orbitally relatively to a unit being wrapped.

92. In a wrapping machine, a plurality of non-parallel cylindrical supports whose axes serve as axes of revolution and a wrapping element pivotally mounted and elastically supported on said axes and disposed to travel in a path directed by, and conforming to a unit being wrapped.

93. In a wrapping machine, a plurality of non-parallel cylindrical supports whose axes serve as axes of revolution and a wrapping element pivotally mounted on said axes and disposed to travel in a path directed by a unit being wrapped, to roll about said unit, to conform a wrapper thereto.

94. In a wrapping machine, a plurality of non-parallel cylindrical supports whose axes serve as axes of revolution and a wrapping element pivotally mounted and flexibly supported on said axes and disposed to travel in a path directed by a unit being wrapped, to roll about said unit, to conform a wrapper thereto.

95. In a wrapping machine, a plurality of non-parallel cylindrical supports whose axes serve as axes of revolution and a wrapping element pivotally mounted and elastically supported on said axes and disposed to travel in a path directed by a unit being wrapped, to roll about said unit, to conform a wrapper thereto.

96. In a wrapping machine, a plurality of non-parallel cylindrical supports whose axes serve as axes of revolution and a wrapping element pivotally mounted on said axes and disposed to travel in a path directed by a unit being wrapped, into a conforming motion about the surface of said unit, to conform a wrapper thereto.

97. In a wrapping machine, a plurality of non-parallel cylindrical supports whose axes serve as axes of revolution and a wrapping element pivotally mounted and flexibly supported on said axes and disposed to travel in a path directed by a unit being wrapped, into a conforming motion about the surface of said unit, to conform a wrapper thereto.

98. In a wrapping machine, a plurality of non-parallel cylindrical supports whose axes serve as axes of revolution and a wrapping element pivotally mounted and elastically supported on said axes and disposed to travel in a path directed by a unit being wrapped, into a conforming motion about the surface of said unit, to conform a wrapper thereto.

99. In a wrapping machine, a plurality of non-parallel cylindrical supports whose axes serve as axes of revolution, and a wrapping element pivotally mounted and flexibly supported on said axes and disposed to travel in a path directed by a unit being wrapped, to roll about said unit, to conform a wrapper thereto.

100. In a wrapping machine, a plurality of non-parallel cylindrical supports whose axes serve as axes of revolution, and a wrapping element pivotally mounted and elastically supported on said axes and disposed to travel in a path directed by a unit being wrapped, to roll about said unit, to conform a wrapper thereto.

101. In a wrapping machine, a plurality of non-parallel cylindrical supports whose axes serve as axes of revolution, and a wrapping element pivotally mounted on said axes and disposed to travel in a path directed by a unit being wrapped into a conforming motion about the surface of said unit, to conform a wrapper thereto.

102. In a wrapping machine, a paper feed mechanism slidably mounted on parallel guides and comprising a yoke member, a loaf-carrier and a grip-jaw fixed on said yoke member, a co-acting active grip jaw pivotally mounted on said yoke member, an arm connected with said active grip jaw and traversing means connected with said active-jaw arm and adapted to traverse said paper-feed mechanism, and at reversals of its motion to operate said active jaw.

103. In a wrapping machine, a paper feed mechanism slidably mounted on parallel guides and comprising a yoke member, a grip jaw and a loaf carrier fixed on said yoke member, an apertured flange on said loaf-carrier adapted to retain a loaf thereon, an arm connected with said active grip jaw and traversing means connected with said active-jaw arm and adapted to traverse said paper-feed mechanism and at reversals of its motion to operate said active jaw.

104. In a wrapping machine, a traversing member having feed and return motions and a unit-grasping member flexibly mounted on said traversing member, said unit grasping member receiving a unit through one of its sides and ejecting through another side.

105. In a wrapping machine, a traversing member having feed and return motions and a unit-grasping member compensatively mounted on said traversing member, said unit grasping member receiving a unit through one of its sides and ejecting through another side.

106. In a wrapping machine, a plurality of non-parallel cylindrical supports whose axes serve as axes of revolution, and a wrapping element pivotally mounted and elastically supported on said axes and disposed thereby to coact with and be directed by a unit being wrapped to successively locate and relatively thereto, to revolve about instantaneous centers of revolution of a surface of said unit, to conform a wrapper thereto.

107. In a wrapping machine, a traversing member having feed and return motions, a unit-grasping member flexibly mounted on said traversing member, a plurality of pivotally mounted wrapping members on said unit-grasping member adapted to be operated by a motion thereof, and means to traverse said traversing and unit-grasping members.

108. In a wrapping machine, a unit-grasping member having feed and return motions, pivotally-mounted jaws on said member, a cam on each of said jaws, oppositely facing converging cam faces on said cams, a hinged pin and a spring adapted to extend said pin, said pin when extended being in the path of said cam-faces and clearing them when retracted.

109. In a wrapping machine, a unit-grasping member having feed and return motions, pivotally-mounted jaws on said member, a cam on each of said jaws, oppositely facing converging cam faces on said cams, a hinged pin, a spring adapted to extend said pin, said pin when extended being in the path of said cam-faces and clearing them when retracted, a second and positioning cam face on one of said cams, and a fixed positioning finger, said positioning cam-face and finger adapted to position said unit-grasping member near and at a limit of its motion.

110. In a wrapping machine, a unit-grasping member having feed and return motions, pivotally-mounted jaws on said member, a wrapping element pivotally mounted on said jaws and adapted to operatively engage a cam, and a cam adapted to cause the operation of said wrapping element during a motion of said unit-grasping member.

111. In a wrapping machine, a unit-grasping member having feed and return motions, pivotally mounted, spring-closed jaws on said member, means for opening said jaws, a pair of pivotally mounted, spring-supported wrapping elements on each of said jaws, a cam-engaging extension on each of said wrapping elements, a pair of fixed cams, and cam faces on said cams adapted severally to co-act with said cam-engaging extensions of one wrapping element, to cause the same to be opened during a motion, and to permit it to be spring-closed during an opposite motion of said unit-grasping member.

112. In a wrapping machine, a unit-grasping member having feed and return motions, pivotally mounted, spring-closed jaws on said member, means for opening said jaws, a pair of pivotally mounted, spring-supported wrapping elements on each of said jaws, a cam-engaging extension on each of said wrapping elements, a pair of fixed cams, parallel timing faces and a pair of helical faces on each cam, said helical faces of each pair being stepped relatively to one another, said parallel faces adapted to position said wrapping elements and said helical faces adapted to cause them to be opened and to permit them to be closed, by successive movements of said unit-grasping member.

113. In a wrapping machine, a unit-grasping member having feed and return motions, operating means adapted to impart such motions thereto, a slidably mounted tuck frame having approach and recession motions relatively to said unit-grasping member, a tuck-plate flexibly mounted on said tuck frame, means to move said tuck plates relatively to its frames, retracting means to retract said tuck-members, an energy-storing spring strained between said retracting means and said tuck-frame, lock-and-release means operably connected with said tuck frame and adapted to lock it retracted and the spring strained and a release-timing member operatively connected with the unit-grasping member.

114. In a wrapping machine, a unit-grasping member having feed and return motions, operating means adapted to impart such motions thereto, a movable tuck member having approach and recession motions relatively to said unit-grasping member, retracting means to retract said tuck-members, an energy-storing spring strained between said retracting means and said tuck-frame, lock-and-release means operably connected with said tuck-member and adapted to lock it and the spring strained, an extension on said tuck-member adapted to engage said lock-and-release means, an operative timing connection between the latter and said unit-grasping member, and, comprised in said lock-and-release mechanism, a movable stock or mounting member, and on said stock a fixed stop and a pivotally mounted latch whose operative face extends beyond the operative face of said stop.

115. In a wrapping machine, unit-supply and feeding means comprising a unit-grasping and feeding member, a belt conveyer adapted to supply units to a chute, a chute, chute-closing means, and a unit-transfer member adapted to extrude said chute-closing means, and itself temporarily close said chute, receive a unit and transfer it to said unit-grasping means.

116. In a wrapping machine comprising unit-wrapping means, a roll of wrapping paper, means for supporting said paper, and paper-feed mechanisms, the combination therewith of a floating tension roller, a support for said roller permitting endwise tilting of such roller whereby it is adapted to float adjacent to the paper roll in a loop of paper cast therefrom, to limit and distribute in a transverse direction the tension in the paper drawn therefrom by the paper feed mechanism.

117. In a wrapping machine comprising unit-wrapping means, a roll of wrapping paper, means for supporting said paper, and paper-feed mechanism, the combination therewith of a frame flexible in a transverse direction pivotally mounted adjacent to said roll and a floating tension roll whose extreme positions are limited by said frame but which floats adjacent to the paper roll in a loop of paper cast therefrom, to limit and distribute in a transverse direction the tension in the paper drawn therefrom by the paper-feed mechanism.

SIGMUND SCHIFF.

Witnesses:
H. D. PENNEY,
JOHN MORRIS.